(12) United States Patent
Mochizuki et al.

(10) Patent No.: US 10,959,283 B2
(45) Date of Patent: Mar. 23, 2021

(54) CELL RESELECTION RECOGNITION BY A TERMINAL IN A COMMUNICATION SYSTEM

(71) Applicant: Mitsubishi Electric Corporation, Chiyoda-ku (JP)

(72) Inventors: Mitsuru Mochizuki, Tokyo (JP); Kuniyuki Suzuki, Tokyo (JP); Masayuki Nakazawa, Tokyo (JP); Noriyuki Fukui, Tokyo (JP); Haruka Nozawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/432,148

(22) Filed: Jun. 5, 2019

(65) Prior Publication Data

US 2019/0289663 A1 Sep. 19, 2019

Related U.S. Application Data

(63) Continuation of application No. 15/543,853, filed as application No. PCT/JP2016/050362 on Jan. 7, 2016, now Pat. No. 10,362,624.

(30) Foreign Application Priority Data

Jan. 15, 2015 (JP) ................................. 2015-005900

(51) Int. Cl.
*H04W 76/28* (2018.01)
*H04W 48/00* (2009.01)
(Continued)

(52) U.S. Cl.
CPC ............. *H04W 76/28* (2018.02); *H04W 8/02* (2013.01); *H04W 48/00* (2013.01); *H04W 48/16* (2013.01);
(Continued)

(58) Field of Classification Search
CPC ... H04W 76/28; H04W 72/0453; H04W 8/02; H04W 48/16; H04W 48/20
See application file for complete search history.

(56) References Cited

U.S. PATENT DOCUMENTS

| | | | |
|---|---|---|---|
| 9,237,522 B2 | 1/2016 | Golitschek Edler Von Elbwart et al. | |
| 10,362,624 B2 * | 7/2019 | Mochizuki | H04W 48/00 |

(Continued)

FOREIGN PATENT DOCUMENTS

| | | |
|---|---|---|
| JP | 2005-072677 A | 3/2005 |
| JP | 2005-167749 A | 6/2005 |

(Continued)

OTHER PUBLICATIONS

International Search Report dated Mar. 22, 2016, in PCT/JP2016/050362, filed Jan. 7, 2016.

(Continued)

*Primary Examiner* — Wei Zhao

(74) *Attorney, Agent, or Firm* — Oblon, McClelland, Maier & Neustadt, L.L.P.

(57) ABSTRACT

A narrow-bandwidth terminal device performs radio communication at a bandwidth narrower than a system bandwidth. The narrow-bandwidth terminal device in an idle state camps on a cell, and performs discontinuous reception of a signal transmitted from the cell. The terminal device also determines a reception condition of the signal, for example, whether the signal can be received. When it is determined that the signal cannot be received, the narrow-bandwidth terminal device moves out of a coverage area of the cell while continuing to perform the discontinuous reception. When it is determined that a discontinuous recep- (Continued)

tion timer has been completed, the narrow-bandwidth terminal device continues to perform the discontinuous reception.

5 Claims, 22 Drawing Sheets

(51) Int. Cl.
*H04W 48/16* (2009.01)
*H04W 52/02* (2009.01)
*H04W 48/20* (2009.01)
*H04W 8/02* (2009.01)
*H04W 88/02* (2009.01)
*H04W 88/08* (2009.01)

(52) U.S. Cl.
CPC ........... *H04W 48/20* (2013.01); *H04W 52/02* (2013.01); *H04W 88/02* (2013.01); *H04W 88/08* (2013.01); *Y02D 30/70* (2020.08)

(56) References Cited

U.S. PATENT DOCUMENTS

| | | | |
|---|---|---|---|
| 2005/0157671 A1 | 7/2005 | Sugitani | |
| 2010/0105381 A1 | 4/2010 | Takeda | |
| 2010/0272004 A1 | 10/2010 | Maeda | |
| 2011/0110251 A1* | 5/2011 | Krishnamurthy ... | H04W 72/082 370/252 |
| 2011/0244800 A1* | 10/2011 | Bogestam ............. | G06Q 30/02 455/41.2 |
| 2013/0083753 A1* | 4/2013 | Lee ................... | H04W 72/0453 370/329 |
| 2013/0170435 A1 | 7/2013 | Dinan | |
| 2013/0308465 A1 | 11/2013 | Xu et al. | |
| 2014/0011498 A1 | 1/2014 | Aono | |
| 2014/0198685 A1 | 7/2014 | Xu et al. | |
| 2015/0296428 A1 | 10/2015 | Michel | |

FOREIGN PATENT DOCUMENTS

| | | |
|---|---|---|
| JP | 2010-035023 A | 2/2010 |
| JP | 2012-055025 A | 3/2012 |
| JP | 2014-017676 A | 1/2014 |
| WO | 2013/072222 A1 | 5/2013 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network,(E-UTRAN); Overall Description; Stage 2, 3GPP TS 36.300, V12.2.0, (Jun. 2014), 215 pages.
3rd Generation Partnership Project; Technical Specification Group Radio Access Network; Evolved Universal Terrestrial Radio Access (E-UTRA); User Equipment (UE) procedures in idle mode; 3GPP TS 36.304, V12.1.0 (Jun. 2014), 35 pages.
"LS on HNB/HeNB Open Access Mode", 3GPP TSG-SA1 #42, (S1-083461), 3GPP SA WG1, Oct. 13-17, 2008, 2 pages.
"LS on CSG cell identification", 3GPP TSG-RAN WG 2, R2-082899, RAN2, May 5-9, 2008, 2 pages.
3rd Generation Partnership Project; Technical Specification Group Radio Access Network; Evolved Universal Terrestrial Radio Access (E-UTRA); Further advancements for E-UTRA physical layer aspects, 3GPP TR 36.814 V9.0.0, (Mar. 2010), 104 pages.
3rd Generation Partnership Project; Technical Specification Group Radio Access Network; Feasibility study for Further Advancements for E-UTRA (LTE-Advanced); 3GPP TR 36.912 V10.0.0, (Mar. 2011), 273 pages.
3rd Generation Partnership Project; Technical Specification Group Radio Access Network; Coordinated multi-point operation for LTE physical layer aspects; 3GPP TR 36.819 V11.2.0, (Sep. 2013), 70 pages.
3rd Generation Partnership Project; Technical Specification Group Radio Access Network; Evolved Universal Terrestrial Radio Access (E-UTRA); Base Station (BS) conformance testing, 3GPP TS 36.141 V12.4.0, (Jun. 2014), 257 pages.
3rd Generation Partnership Project; Technical Specification Group Radio Access Network; Study on provision of low-cost Machine-Type Communications (MTC) User Equipments (UEs) based on LTE; 3GPP TR 36.888 V12.0.0, (Jun. 2013), 55 pages.
"SIB transmission for MTC", 3GPP TSG-RAN WG1, R1-144563; Ericsson, Nov. 17-21, 2014, 7 pages.
"Common control message enhancement for MTC", 3GPP TSG RAN WG1; R1-144662, Intel Corporation, Nov. 17-21, 2014, 8 pages.
"Control-centric transmission of common messages for Rel-13 UEs", 3GPP TSG RAN WG1; R1-145101, Huawei, HiSilicon, Nov. 17-21, 2014, 3 pages.
"UE complexity reduction", 3GPP TSG RAN WG1; R1-143992, Qualcomm Incorporated, Oct. 6-10, 2014, 3 pages.
3rd Generation Partnership Project; Technical Specification Group Radio Access Network; Evolved Universal Terrestrial Radio Access (E-UTRA); Physical layer procedures, 3GPP TS 36.213 V12.1.0 (Mar. 2014), 186 pages.
"Discussion on the comparison of LBE and FBE for LBT", 3GPP TSG RAN WG1; R1-145132, Coolpad, Nov. 17-21, 2014, 5 pages.
"Physical Layer options for LAA-LTE", 3GPP 3GPP TSG RAN WG1; R1-144236, Motorola Mobility, Oct. 6-10, 2014, 2 pages.
International Preliminary Report on Patentability and Written Opinion dated Jul. 27, 2017 in PCT/JP2016/050362 (with English translation).
Extended European Search Report dated Jul. 27, 2018 in Patent Application No. 16737286.1.
"Analysis of standardization impacts of MTCe UEPCOP solutions", Ericsson, 3GPP TSG-RAN WG2 #82, Tdoc R2-131691, 5.2.2, XP050699838, May 2013, 6 pages.
"Introduction to GSM", Rohde & Schwarz, vol. 2.2, XP055492126, 2007, 12 pages.
"Mobility for enhanced coverage MTC UE", Ericsson, 3GPP TSG-RAN WG1 Meeting #74, R1-133425, 7.2.4.2, XP050716533, Aug. 2013, 2 pages.
Office Action dated Aug. 20, 2019 in Japanese Patent Application No. 2016-569334 (with English translation).
Japanese Office Action dated Dec. 22, 2020 in Japanese Application No. 2019-219258 (with Computer Generated English Translation).

\* cited by examiner

F I G . 1
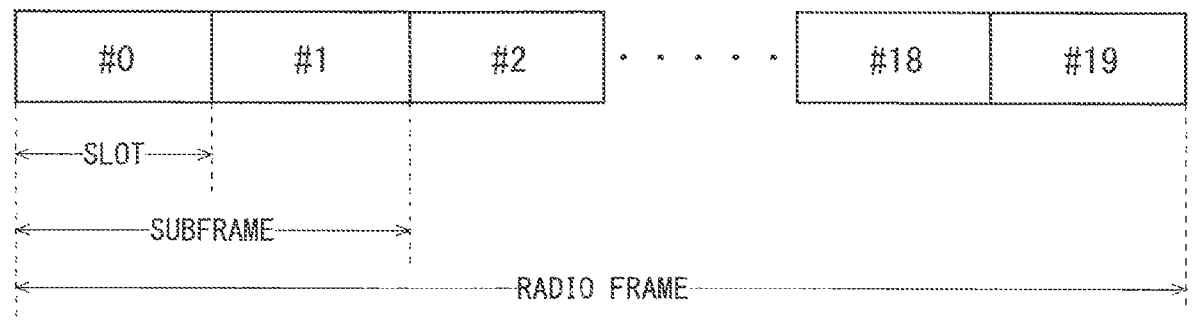

F I G. 1 6

```
Paging message
    - pagingRecordList
        - PagingRecord

- systemInfoModification
    - etws-Indication
    - cmas-Indication
    - eab-ParamModification
```

F I G. 1 7

```
Paging message
    - pagingRecordList
        - PagingRecord

- pagingRecordList_repetition#1
        - PagingRecord

- systemInfoModification
    - etws-Indication
    - cmas-Indication
    - eab-ParamModification
```

CELL RESELECTION RECOGNITION BY A TERMINAL IN A COMMUNICATION SYSTEM

CROSS-REFERENCE TO RELATED APPLICATIONS

The present application is a continuation of U.S. application Ser. No. 15/543,853, filed Jul. 14, 2017, which is a National Phase of PCT/JP2016/050362 filed Jan. 7, 2016 and claims priority to Japanese Patent Application No., 2015-005900, filed Jan. 15, 2015. The entire contents of each of which are incorporated herein by reference.

TECHNICAL FIELD

The present invention relates to a communication system in which radio communication is performed between a communication terminal device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 16). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station to a user equipment. A BCH transport block is mapped to four subframes within a 40 ms interval. There is no explicit signaling indicating 40 ms timing.

A physical control format indicator channel (PCFICH) is a channel for downlink transmission from a base station to a user equipment. The PCFICH notifies the number of orthogonal frequency division multiplexing (OFDM) symbols used for PDCCHs from the base station to the user equipment. The PCFICH is transmitted per subframe.

A physical downlink control channel (PDCCH) is a channel for downlink transmission from a base station to a user equipment. The PDCCH notifies of the resource allocation information for downlink shared channel (DL-SCH) being one of the transport channels described below, resource allocation information for a paging channel (PCH) being one of the transport channels described below, and hybrid automatic repeat request (HARD) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a user equipment. A downlink shared channel (DL-SCH) that is a transport channel and a PCH that is a transport channel are mapped to the PDSCH.

A physical multicast channel (PMCH) is a channel for downlink transmission from a base station to a user equipment. A multicast channel (MCH) that is a transport channel is mapped to the PMCH.

A physical uplink control channel (PUCCH) is a channel for uplink transmission from a user equipment to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a user equipment to a base station. An uplink shared channel (UL-SCH) that is one of the transport channels is mapped to the PUSCH.

A physical hybrid ARQ indicator channel (PHICH) is a channel for downlink transmission from a base station to a user equipment. The PHICH carries Ack/Nack that is a response signal to uplink transmission. A physical random access channel (PRACH) is a channel for uplink transmission from the user equipment to the base station. The PRACH carries a random access preamble.

A downlink reference signal (RS) is a known symbol in the LTE communication system. The following five types of downlink reference signals are defined: a cell-specific reference signal (CRS), an MBSFN reference signal, a data demodulation reference signal (DM-RS) being a UE-specific reference signal, a positioning reference signal (PRS), and a channel-state information reference signal (CSI-RS). The physical layer measurement objects of a user equipment include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARD) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power.

The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in the case where the user equipments have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel that transmits dedicated control information between a user equipment and a network on a point-to-point basis. The DCCH is used when the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by user equipments (UEs) for making access from CSG-related members easier.

The locations of user equipments are tracked based on an area composed of one or more cells. The locations are tracked for enabling tracking the locations of user equipments and calling user equipments, in other words, incoming calling to user equipments even in an idle state. An area for tracking locations of user equipments is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 3 discloses three different modes of the access to the HeNB and HNB. Specifically, an open access mode, a closed access mode, and a hybrid access mode are disclosed.

The individual modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is the cell that supports both of the open access mode and the closed access mode.

In 3GPP, among all physical cell identities (PCIs) is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to user equipments being served thereby. Being served by a base station means taking the base station as a serving cell.

Non-Patent Document 4 discloses the basic operation of a user equipment using PCI split. The user equipment that does not have the PCI split information needs to perform cell search using all PCIs, for example, using all 504 codes. On the other hand, the user equipment that has the PCI split information is capable of performing cell search using the PCI split information.

Further, 3GPP is pursuing specifications standard of long term evolution advanced (LTE-A) as Release 10 (see Non-Patent Documents 5 and 6). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 7.

Furthermore, 3GPP is studying the use of small eNBs configuring small cells to satisfy tremendous traffic in the future. In an example technique under study, etc., a large number of small eNBs will be installed to configure a large number of small cells, thus increasing spectral efficiency and communication capacity. The specific techniques include dual connectivity in which a UE communicates with two eNBs through connection thereto.

Furthermore, the need for machine-type communication (MTC) that enables communication even without any human manipulation of a UE is increasing. The MTC is used in many types of services including, for example, sensing, meter monitoring, and parcel tracking monitoring, etc.

It is assumed that the increasing need for the MTC will be followed by the use of excessive number of MTC user equipments (MTC UEs). Thus, the MTC UEs require lower cost and longer life. 3GPP is studying a technique for reducing the cost of the MTC UEs.

Furthermore, the need for systems using an unlicensed spectrum that is a spectrum that has not been licensed, as a tool for complementing a licensed spectrum that is a spectrum that has been licensed is increasing. Examples of the unlicensed spectrum include industrial, scientific and medical (ISM) bands used for wireless local area network (LAN), etc. 3GPP is studying Licensed-Assisted Access (LAA) using the unlicensed spectrum as a tool for complementing the licensed spectrum, with the LTE.

The traffic flow of a mobile network is on the rise, and the communication rate is also increasing. It is expected that the communication rate will be further increased when the operations of the LTE and the LTE-A are fully initiated, leading to an increase in traffic flow.

PRIOR-ART DOCUMENTS

Non-Patent Documents

Non-Patent Document 1: 3GPP TS36.300 V12.2.0
Non-Patent Document 2: 3GPP TS36.304 V12.1.0
Non-Patent Document 3: 3GPP S1-083461
Non-Patent Document 4: 3GPP R2-082899
Non-Patent Document 5: 3GPP TR 36.814 V9.0.0
Non-Patent Document 6: 3GPP TR 36.912 V10.0.0
Non-Patent Document 7: 3GPP TR 36.819 V11.2.0
Non-Patent Document 8: 3GPP TS 36.141 V12.4.0
Non-Patent Document 9: 3GPP TR36.888 V12.0.0
Non-Patent Document 10: 3GPP R1-144563
Non-Patent Document 11: 3GPP R1-144662
Non-Patent Document 12: 3GPP R1-145101
Non-Patent Document 13: 3GPP R1-143992
Non-Patent Document 14: 3GPP TS36.213 V12.1.0
Non-Patent Document 15: 3GPP R1-145132
Non-Patent Document 16: 3GPP R1-144236

SUMMARY OF INVENTION

Problems to be Solved by the Invention

Requirements for low cost MTC (LC-MTC) include reduced bandwidth, coverage enhancement, and power consumption reduction. LC-MTC UEs whose bandwidth is to be reduced have a problem with inability to receive system information broadcasted at the entire system bandwidth.

Furthermore, since the LC-MTC UEs whose coverage is to be enhanced suffer degradation in reception quality from cells in the enhanced areas, execution of repeated transmission (i.e., repetition of transmission) is being studied. However, since a paging and the system information, etc. have not conventionally undergone the repeated transmission, there is a problem with absence of a method for repeated transmission and reception.

Furthermore, when the unlicensed spectrum is used for the LTE, a fair coexistence method with the other systems using the unlicensed spectrum is necessary. Thus, the LAA requires, for example, a function of Listen-before-talk (clear channel assessment) before data transmission and a function of disabling continuous data communication for a long period. Furthermore, when nothing is transmitted from a cell, provision of a signal for synchronizing with or measuring the unlicensed spectrum has been proposed to enable a UE to synchronize with or measure the unlicensed spectrum.

However, such transmission of a signal requires avoidance of a collision and ensuring the fairness with the other systems to enable the coexistence. There is a problem with absence of such a fair coexistence method on the signal for synchronizing or measuring the unlicensed spectrum The present invention has an object of providing a communication system that enables improvement in communication performance of a communication terminal device when the communication system supports various services.

Means to Solve the Problems

A communication system of the present invention is a communication system including a communication terminal device and a base station device configuring at least one cell capable of radio communication with the communication terminal device. The communication terminal device includes a narrow-bandwidth terminal device that performs radio communication at a bandwidth narrower than a system bandwidth that can be used by the cell. The narrow-bandwidth terminal device performs discontinuous reception for intermittently receiving a signal transmitted from the cell and determines a reception condition of the signal when the narrow-bandwidth terminal device is in an idle state within a coverage area of the cell. The narrow-bandwidth terminal device moves out of the coverage area of the cell while continuing to perform the discontinuous reception, when the reception condition of the signal satisfies a predetermined moving condition.

Effects of the Invention

In the communication system of the present invention, when the narrow-bandwidth terminal device is in an idle state within a coverage area of a cell, it performs discontinuous reception of a signal transmitted from the cell, and determines a reception condition of the signal. When the reception condition of the signal satisfies a moving condition, the narrow-bandwidth terminal device moves out of the coverage area of the cell while continuing to perform the discontinuous reception. Accordingly, since the idle state can be maintained without information for reselecting a cell, the narrow-bandwidth terminal device can receive a paging signal. Furthermore, the power consumption of the narrow-bandwidth terminal device can be reduced. Furthermore, since the structure of the communication system can be simplified, a malfunction of the communication system can be reduced.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 16 illustrates an example paging message according to the conventional technique.

FIG. 17 illustrates an example paging message according to a fourth embodiment.

DESCRIPTION OF EMBODIMENTS

First Embodiment

Figure 2:
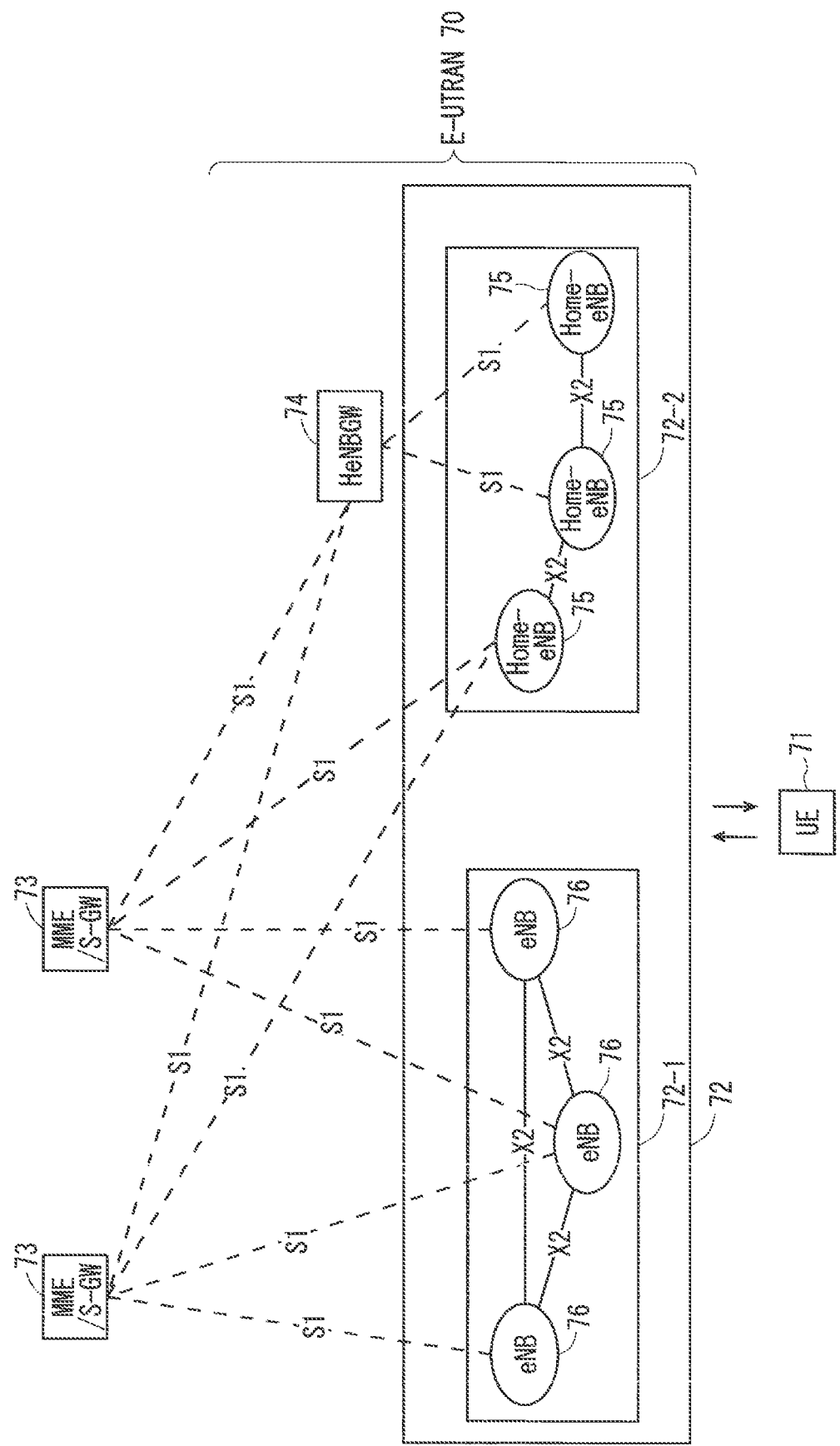
FIG. 2 is a block diagram showing the overall configuration of an LTE communication system 700 under discussion of 3GPP.

FIG. 2 is a block diagram showing an overall configuration of an LTE communication system 700, which is under discussion of 3GPP. FIG. 2 will be described. A radio access network is referred to as an evolved universal terrestrial radio access network (E-UTRAN) 70. A user equipment device (hereinafter, referred to as a "user equipment (UE)")

71 that is a communication terminal device is capable of radio communication with a base station device (hereinafter, referred to as a "base station (E-UTRAN Node B: eNB)") 72 and transmits and receives signals through radio communication.

The E-UTRAN is composed of one or a plurality of base stations 72, provided that a control protocol for a user equipment 71 such as a radio resource control (RRC), and user planes such as a packet data convergence protocol (PDCP), radio link control (RLC), medium access control (MAC), or physical layer (PHY) are terminated in the base station 72.

The control protocol radio resource control (RRC) between the user equipment 71 and the base station 72 performs broadcast, paging, RRC connection management, and the like. The states of the base station 72 and the user equipment 71 in RRC are classified into RRC_Idle and RRC Connected.

In RRC_Idle, public land mobile network (PLMN) selection, system information (SI) broadcast, paging, cell reselection, mobility, and the like are performed. In RRC Connected, the user equipment has RRC connection and is capable of transmitting and receiving data to and from a network. In RRC Connected, for example, handover (HO) and measurement of a neighbor cell are performed.

The base stations 72 are classified into eNBs 76 and Home-eNBs 75. The communication system 700 includes an eNB group 72-1 including a plurality of eNBs 76 and a Home-eNB group 72-2 including a plurality of Home-eNBs 75. A system, composed of an evolved packet core (EPC) being a core network and an E-UTRAN 70 being a radio access network, is referred to as an evolved packet system (EPS). The EPC being a core network and the E-UTRAN 70 being a radio access network may be collectively referred to as a "network".

The eNB 76 is connected to an MME/S-GW unit (hereinafter, also referred to as an "MME unit") 73 including a mobility management entity (MME), a serving gateway (S-GW), or an MME and an S-GW by means of an S1 interface, and control information is communicated between the eNB 76 and the MME unit 73. A plurality of MME units 73 may be connected to one eNB 76. The eNBs 76 are connected to each other by means of an X2 interface, and control information is communicated between the eNBs 76.

The Home-eNB 75 is connected to the MME unit 73 by means of an S1 interface, and control information is communicated between the Home-eNB 75 and the MME unit 73. A plurality of Home-eNBs 75 are connected to one MME unit 73. Or, the Home-eNBs 75 are connected to the MME units 73 through a Home-eNB gateway (HeNBGW) 74. The Home-eNB 75 is connected to the HeNBGW 74 by means of an S1 interface, and the HeNBGW 74 is connected to the MME unit 73 by means of an S1 interface.

One or a plurality of Home-eNBs 75 are connected to one HeNBGW 74, and information is communicated therebetween through an S1 interface. The HeNBGW 74 is connected to one or a plurality of MME units 73, and information is communicated therebetween through an S1 interface.

The MME units 73 and HeNBGW 74 are entities of higher layer, specifically, higher nodes, and control the connections between the user equipment (UE) 71 and the eNB 76 and the Home-eNB 75 being base stations. The MME units 73 configure an EPC being a core network. The base station 72 and the HeNBGW 74 configure an E-UTRAN 70.

Further, 3GPP is studying the configuration below. The X2 interface between the Home-eNBs 75 is supported. In other words, the Home-eNBs 75 are connected to each other by means of an X2 interface, and control information is communicated between the Home-eNBs 75. The HeNBGW 74 appears to the MME unit 73 as the Home-eNB 75. The HeNBGW 74 appears to the Home-eNB 75 as the MME unit 73.

The interfaces between the Home-eNBs 75 and the MME units 73 are the same, which are the S1 interfaces, in both cases where the Home-eNB 75 is connected to the MME unit 73 through the HeNBGW 74 and it is directly connected to the MME unit 73.

The base station device 72 may configure a single cell or a plurality of cells. Each cell has a range predetermined as a coverage in which the cell can communicate with a communication terminal device and performs radio communication with the communication terminal device within the coverage. In the case where one base station device configures a plurality of cells, every cell is configured so as to communicate with the user equipment.

Figure 3:
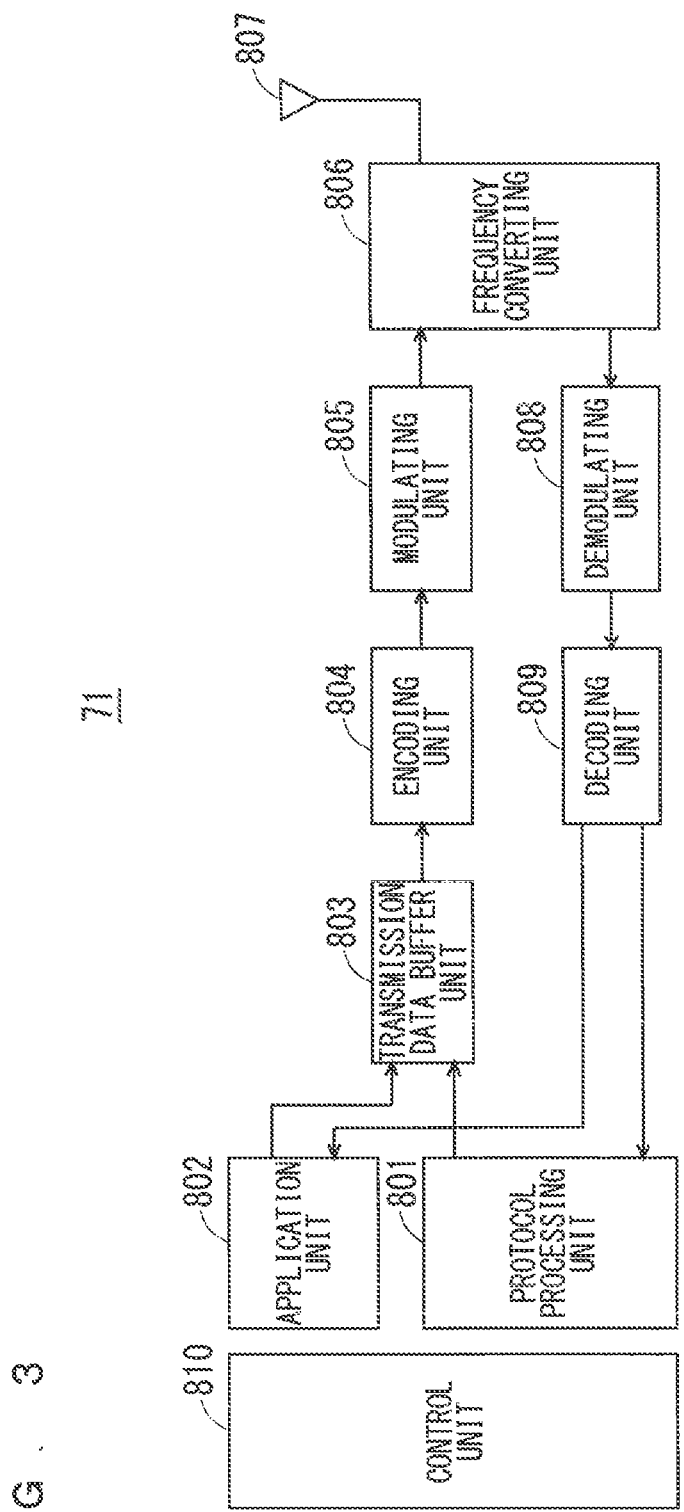
FIG. 3 is a block diagram showing the configuration of a user equipment 71 shown in FIG. 2, which is a user equipment according to the present invention.

FIG. 3 is a block diagram showing the configuration of the user equipment 71 of FIG. 2 that is a user equipment according to the present invention. The transmission process of the user equipment 71 shown in FIG. 3 will be described. First, a transmission data buffer unit 803 stores the control data from a protocol processing unit 801 and the user data from an application unit 802. The data stored in the transmission data buffer unit 803 is passed to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is converted into a baseband signal, and the baseband signal is output to a frequency converting unit 806 and is then converted into a radio transmission frequency. After that, a transmission signal is transmitted from an antenna 807 to the base station 72.

The user equipment 71 executes the reception process as follows. The radio signal from the base station 72 is received through the antenna 807. The received signal is converted from a radio reception frequency into a baseband signal by the frequency converting unit 806 and is then demodulated by a demodulating unit 808. The demodulated data is passed to a decoding unit 809 and is subjected to a decoding process such as error correction. Among the pieces of decoded data, the control data is passed to the protocol processing unit 801, and the user data is passed to the application unit 802. A series of processes by the user equipment 71 is controlled by a control unit 810. This means that, though not shown in FIG. 3, the control unit 810 is connected to the individual units 801 to 809.

Figure 4:
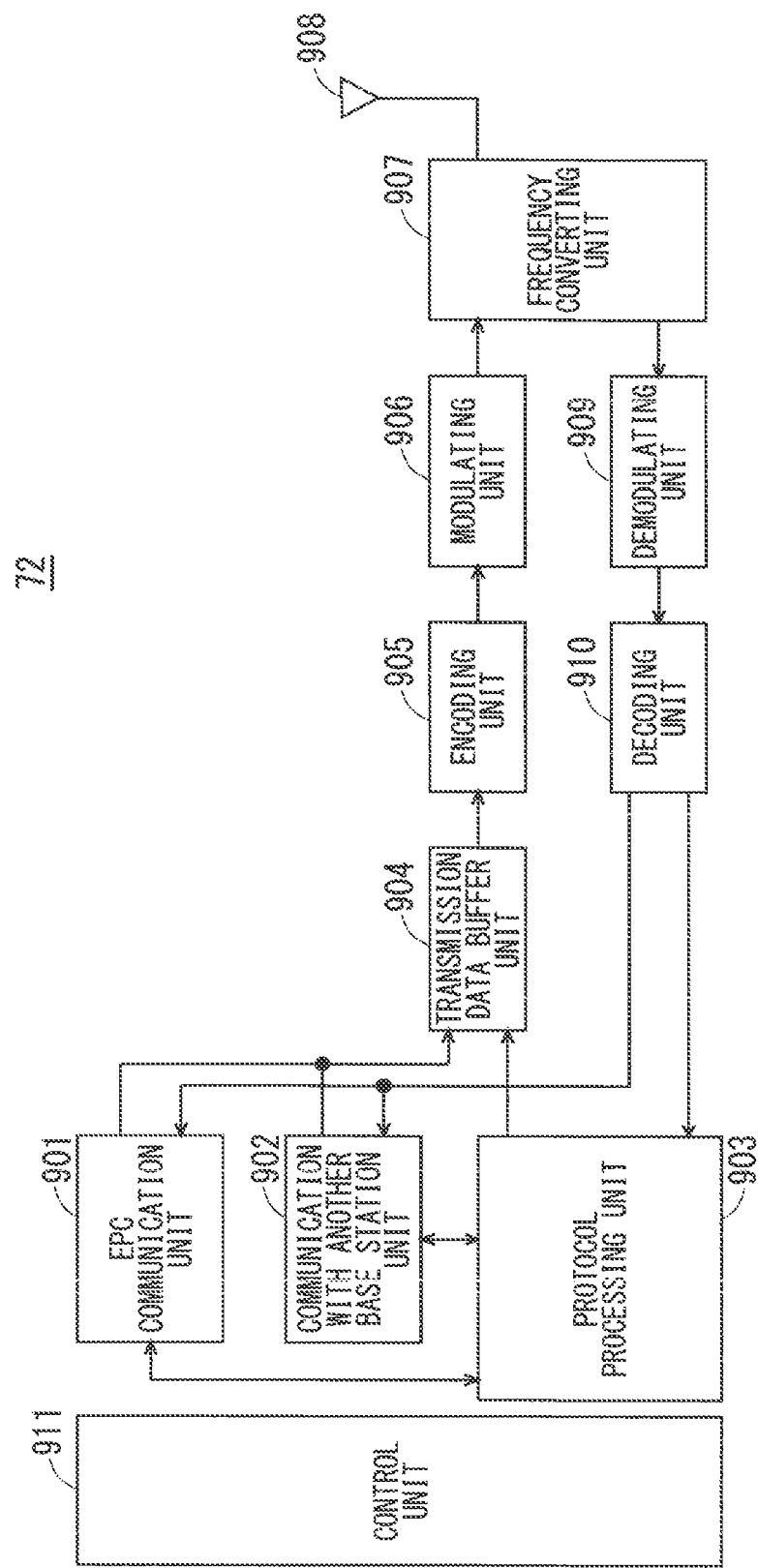
FIG. 4 is a block diagram showing the configuration of a base station 72 shown in FIG. 2, which is a base station according to the present invention.

FIG. 4 is a block diagram showing the configuration of the base station 72 of FIG. 2 that is a base station according to the present invention. The transmission process of the base station 72 shown in FIG. 4 will be described. An EPC communication unit 901 performs data transmission and reception between the base station 72 and the EPC (such as the MME unit 73), HeNBGW 74, and the like. A communication with another base station unit 902 performs data transmission and reception to and from another base station. The EPC communication unit 901 and the communication with another base station unit 902 each transmit and receive information to and from a protocol processing unit 903. The control data from the protocol processing unit 903, and the user data and the control data from the EPC communication unit 901 and the communication with another base station unit 902 are stored in a transmission data buffer unit 904.

The data stored in the transmission data buffer unit 904 is passed to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is converted into a baseband signal, and the baseband signal is output to a frequency converting unit 907 and is then converted into a radio transmission frequency. After that, a transmission signal is transmitted from an antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is passed to a decoding unit 910 and is then subjected to a decoding process such as error correction. Among the pieces of decoded data, the control data is passed to the protocol processing unit 903, the EPC communication unit 901, or the communication with another base station unit 902, and the user data is passed to the EPC communication unit 901 and the communication with another base station unit 902. A series of processes by the base station 72 is controlled by a control unit 911. This means that, though not shown in FIG. 4, the control unit 911 is connected to the individual units 901 to 910.

Figure 5:
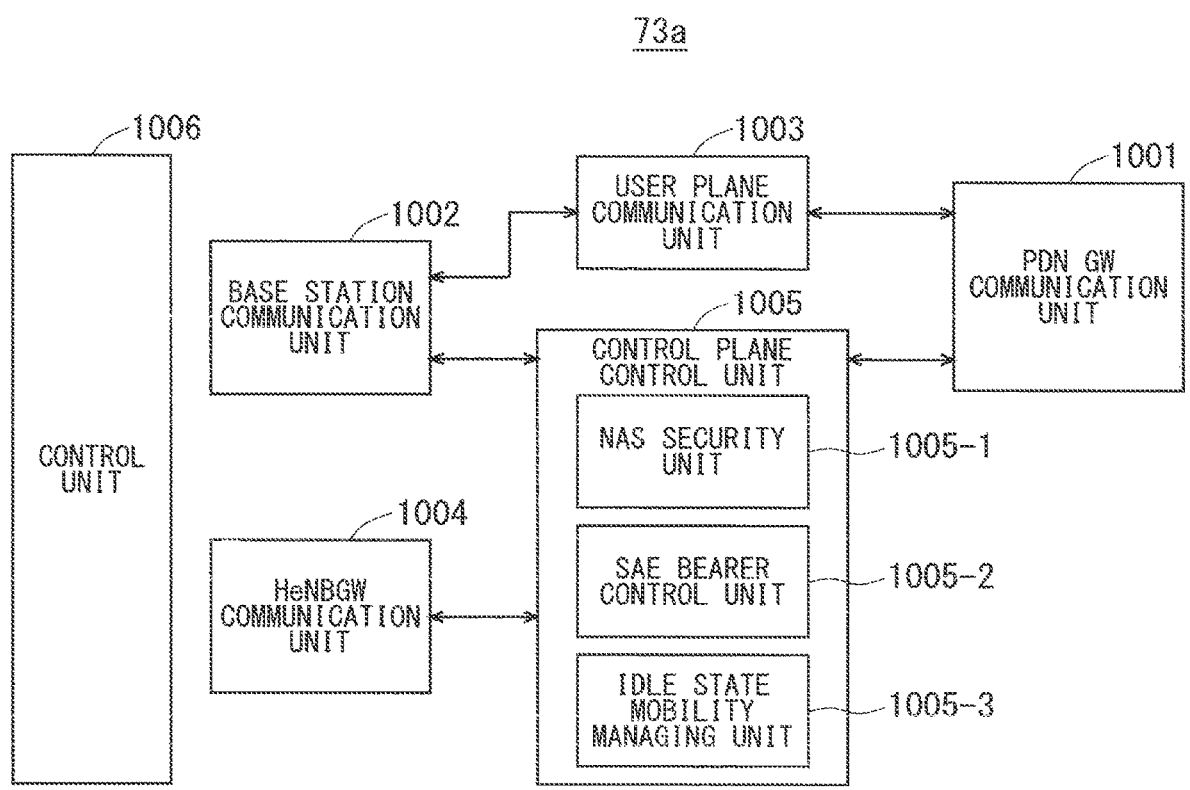
FIG. 5 is a block diagram showing the configuration of an MME according to the present invention.

FIG. 5 is a block diagram showing the configuration of the MME according to the present invention. FIG. 5 shows the configuration of an MME 73a included in the MME unit 73 shown in FIG. 2 described above. A PDN GW communication unit 1001 performs data transmission and reception between the MME 73a and the PDN GW. A base station communication unit 1002 performs data transmission and reception between the MME 73a and the base station 72 by means of the S1 interface. In the case where the data received from the PDN GW is user data, the user data is passed from the PDN GW communication unit 1001 to the base station communication unit 1002 via a user plane communication unit 1003 and is then transmitted to one or a plurality of base stations 72. In the case where the data received from the base station 72 is user data, the user data is passed from the base station communication unit 1002 to the PDN GW communication unit 1001 via the user plane communication unit 1003 and is then transmitted to the PDN GW.

In the case where the data received from the PDN GW is control data, the control data is passed from the PDN GW communication unit 1001 to a control plane control unit 1005. In the case where the data received from the base station 72 is control data, the control data is passed from the base station communication unit 1002 to the control plane control unit 1005.

A HeNBGW communication unit 1004 is provided in the case where the HeNBGW 74 is provided, which performs data transmission and reception between the MME 73a and the HeNBGW 74 by means of the interface (IF) according to an information type. The control data received from the HeNBGW communication unit 1004 is passed from the HeNBGW communication unit 1004 to the control plane control unit 1005. The processing results of the control plane control unit 1005 are transmitted to the PDN GW via the PDN GW communication unit 1001. The processing results of the control plane control unit 1005 are transmitted to one or a plurality of base stations 72 by means of the S1 interface via the base station communication unit 1002, and are transmitted to one or a plurality of HeNBGWs 74 via the HeNBGW communication unit 1004.

The control plane control unit 1005 includes a NAS security unit 1005-1, an SAE bearer control unit 1005-2, and an idle state mobility managing unit 1005-3, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in the idle state, addition, deletion, update, and search of a tracking area of one or a plurality of user equipments 71 being served thereby, and tracking area list management.

The MME 73a distributes a paging signal to one or a plurality of base stations 72. In addition, the MME 73a performs mobility control of an idle state. When the user equipment is in the idle state and an active state, the MME 73a manages a list of tracking areas. The MME 73a begins a paging protocol by transmitting a paging message to the cell belonging to a tracking area in which the UE is registered. The idle state mobility managing unit 1005-3 may manage the CSG of the Home-eNBs 75 to be connected to the MME 73a, CSG IDs, and a whitelist.

Figure 6:
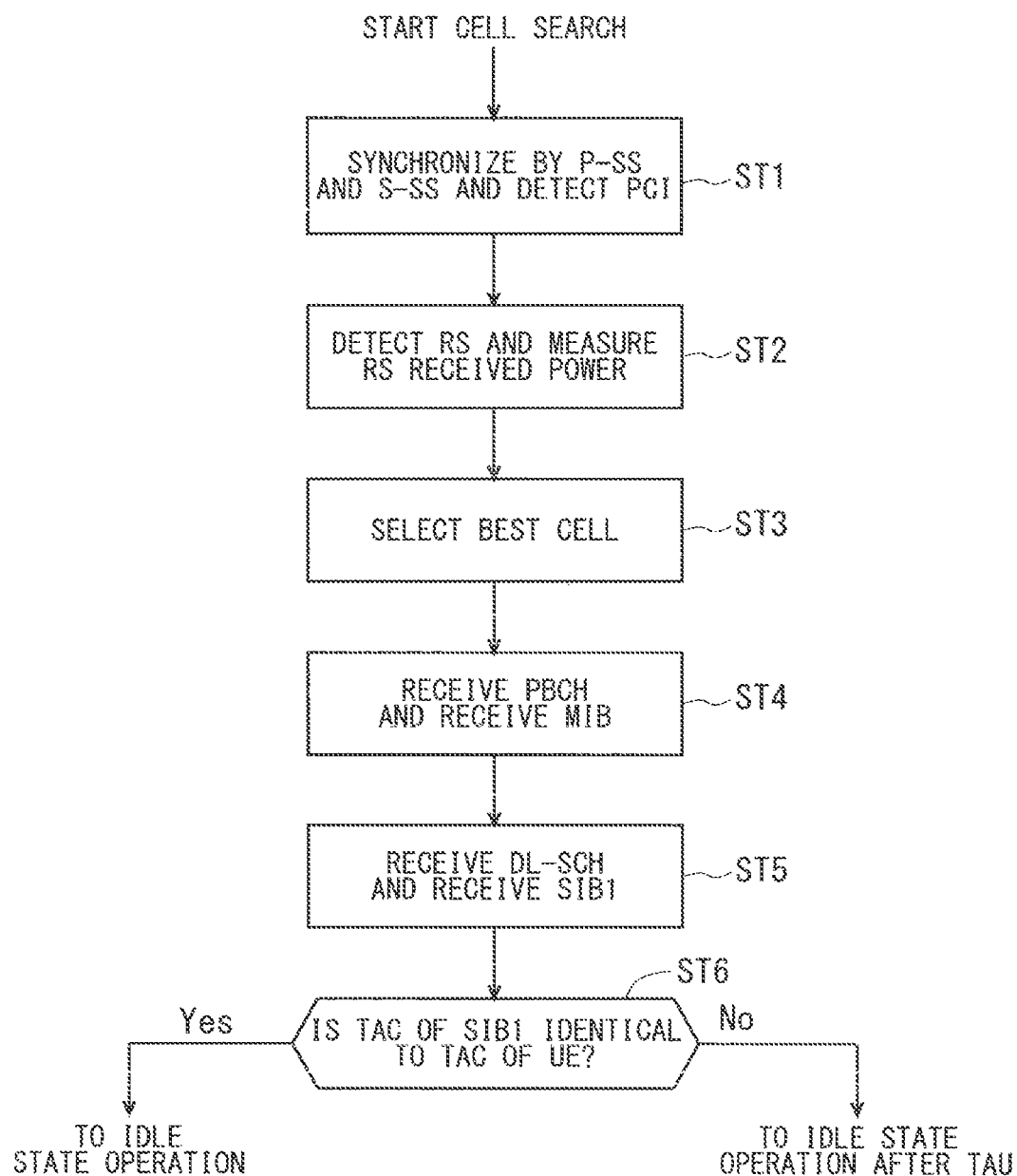
FIG. 6 is a flowchart showing an outline from a cell search to an idle state operation performed by a user equipment (UE) in the LTE communication system.

An example of a cell search method in a mobile communication system will be described next. FIG. 6 is a flowchart showing an outline from a cell search to an idle state operation performed by a user equipment (UE) in the LTE communication system. When starting a cell search, in Step ST1, the user equipment synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST2, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST1, so that the RS can be detected and the RS received power can be measured.

In Step ST3, next, the user equipment selects the cell having the best RS received quality, for example, the cell having the highest RS received power, that is, the best cell, from one or more cells that have been detected up to Step ST2.

In Step ST4, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST5, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST6, next, the user equipment compares the TAC of the SIB1 received in Step ST5 with the TAC portion of a tracking area identity (TAI) in the tracking area list that has already been possessed by the user equipment. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST6 shows that the TAC received in Step ST5 is identical to the TAC included in the tracking area list, the user equipment enters an idle state operation in the cell. If the comparison shows that the TAC received in Step ST5 is not included in the tracking area list, the user equipment requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a user equipment transmitted from the user equipment together with a TAU request signal. The core-network-side device transmits the updated tracking area list to the user equipment. The user equipment rewrites (updates) the TAC list of the user equipment based on the received tracking area list. After that, the user equipment enters the idle state operation in the cell.

Widespread use of smartphones and tablet terminals explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively-wide-range coverage, that is, a cell whose coverage area is relatively wide, such as a cell configured by a conventional eNB, and a "macro eNB" refers to an eNB configuring a macro cell. A "small cell" refers to a cell having a relatively-narrow-range coverage, that is, a cell whose coverage area is relatively narrow, such as a downsized cell, and a "small eNB" refers to an eNB configuring a small cell.

The macro eNB may be, for example, a "wide area base station" described in Non-Patent Document 8.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 8.

Figure 7:
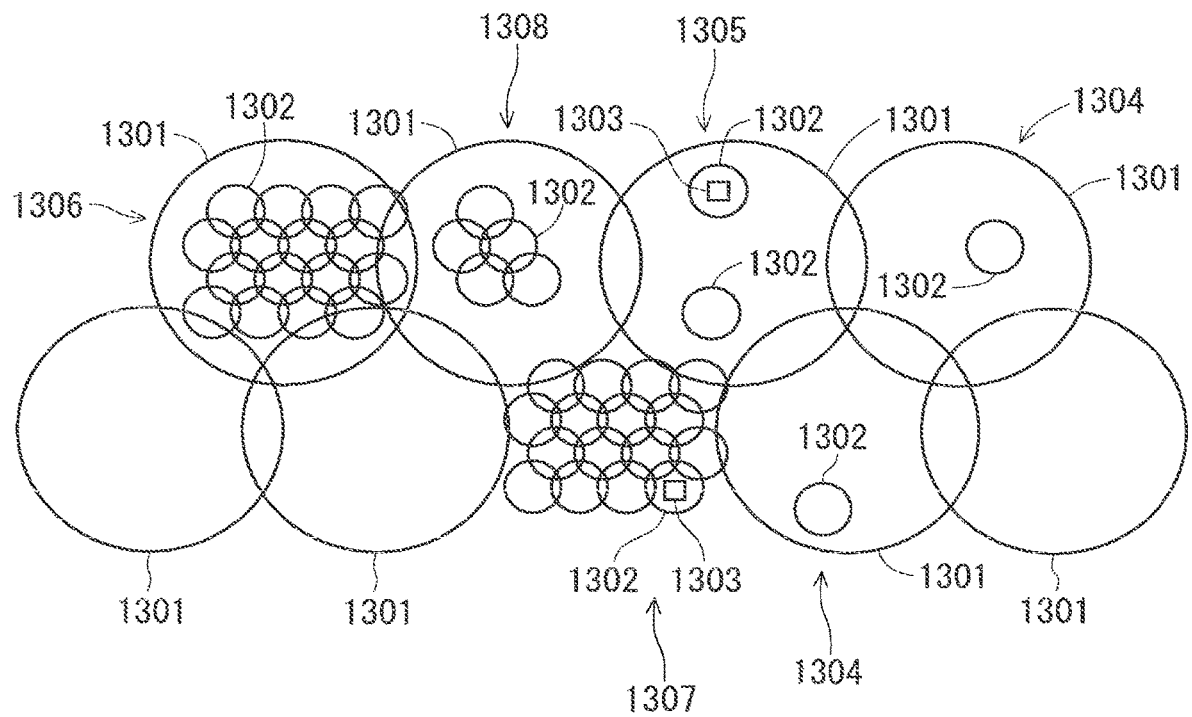
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 1301. A small cell configured by a small eNB has a coverage 1302 whose range is narrower than that of the coverage 1301 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "1304" or "1305", the coverage 1302 of the small cell configured by a small eNB may be included in the coverage 1301 of the macro cell configured by a macro eNB.

As indicated by a reference "1305", the coverages 1302 of a plurality of, for example, two small cells may be included in the coverage 1301 of one macro cell. A user equipment (UE) 1303 is included in, for example, the coverage 1302 of the small cell and performs communication via the small cell.

In the cell configuration shown in FIG. 7, as indicated by a reference "1306", the coverage 1301 of the macro cell configured by a macro eNB may overlap the coverages 1302 of the small cells configured by small eNBs in a complicated manner.

As indicated by a reference "1307", the coverage 1301 of the macro cell configured by a macro eNB may not overlap the coverages 1302 of the small cells configured by small eNBs.

Further, as indicated by a reference "1308", the coverages 1302 of a large number of small cells configured by a large number of small eNBs may be configured in the coverage 1301 of one macro cell configured by one macro eNB.

The need for machine-type communication (MTC) that enables communication even without any human manipulation of a UE is increasing. The MTC is used in many types of services, for example, sensing, meter monitoring, and parcel tracking monitoring, etc.

It is assumed that the increasing need for the MTC will be followed by the use of excessive number of MTC user equipments (MTC UEs). Thus, the MTC UEs require lower cost and longer life.

3GPP is studying a technique for reducing the cost of the MTC UEs (see Non-Patent Document 9). The following three requirements (1) to (3) are listed as requirements for low cost MTC (LC-MTC).
(1) Reduced bandwidth
(2) Coverage enhancement
(3) Power consumption reduction 3GPP is studying solutions for satisfying these requirements. The UEs for LC-MTC (hereinafter may be referred to as "LC-MTC UEs") that are low-cost MTC terminal devices will be described below.

Conventionally, system information (SI) is broadcasted at the entire system bandwidth using a PDCCH and a PDSCH. However, the LC-MTC UEs requiring reduction in a bandwidth to be supported cannot receive the SI broadcasted at the entire system bandwidth. Thus, new methods for notifying the LC-MTC UEs of the SI are being studied. Here, since the LC-MTC UEs requiring reduction in the bandwidth to be supported perform radio communication at a bandwidth narrower than the system bandwidth that can be used by cells, they equate to narrow-bandwidth terminal devices.

Since the SI needs to be repeatedly broadcasted, reduction in the SI to be notified to the LC-MTC UEs is required. The SI to be reduced includes parameters except for a SIB1, a SIB2, and a SIB14 that are SIBs for initial access (see Non-Patent Document 10). Thus, the parameters to be reduced contain system information for reselecting cells of a SIB3, a SIB4, a SIB5, and a SIB6.

However, the UEs in an RRC_Idle state need to perform a cell reselection process (see Non-Patent Document 2). Furthermore, the UEs in the RRC_Idle state move between cells if they are in the same tracking area, while maintaining the RRC_Idle state without establishing an RRC connection.

Figure 8:
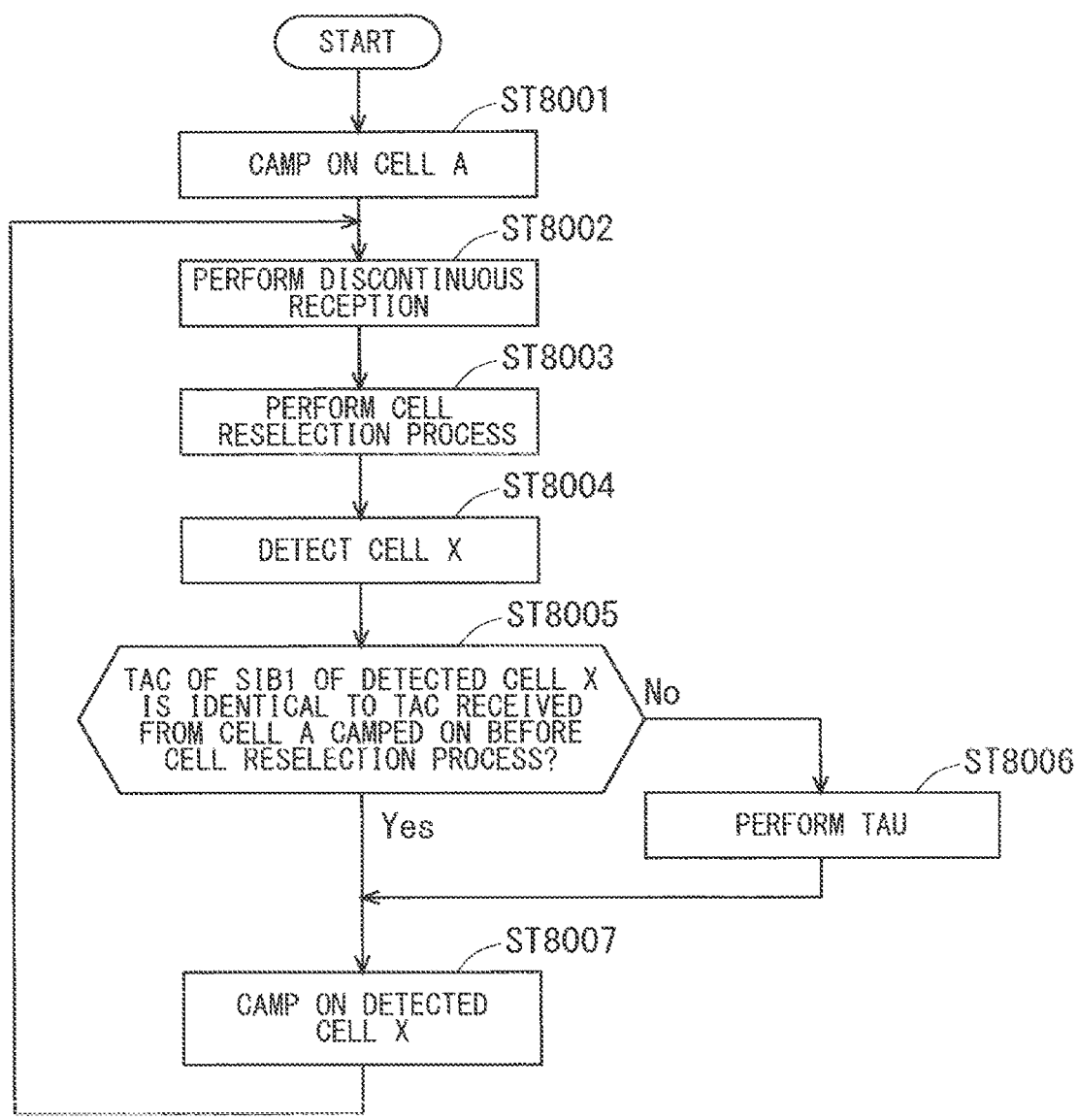
FIG. 8 is an example flowchart indicating processes of a UE in an RRC_Idle state according to a conventional technique.

FIG. 8 is a flowchart indicating processes of a UE in the RRC_Idle state according to a conventional technique. In Step ST8001, the UE in the RRC_Idle state camps on a cell A.

In Step ST8002, the UE in the RRC_Idle state that is camping on the cell A performs discontinuous reception (DRX).

In Step ST8003, the UE performs a cell reselection process. Specifically, the UE receives the system information on the cell reselection process (hereinafter may be referred to as "reselecting-cell system information") that is broadcasted by the cell A, and performs the cell reselection process using the reselecting-cell system information.

In Step ST8004, the UE detects a cell X as a result of the cell reselection process.

In Step ST8005, the UE receives broadcast information of the detected cell X, and determines whether a TAC of the SIB1 of the detected cell X is identical to a TAC received from the cell A on which the UE has been camping before the cell reselection process, on the basis of the received broadcast information. When the TAC of the SIB1 of the detected cell X is different from the TAC received from the cell A, the UE proceeds to Step ST8006. When the TAC of the SIB1 of the detected cell X is identical to the TAC received from the cell A, the UE proceeds to Step ST8007 while maintaining the RRC_Idle state.

In Step ST8006, the UE performs tracking area update (TAU) through the detected cell X. After performing the TAU process, the UE returns to the RRC_Idle state and proceeds to Step ST8007.

In Step ST8007, the UE camps on the detected cell X. After the UE camps on the detected cell X, it returns to Step ST8002, and performs the processes from Step ST8002 to Step ST8007 again at a discontinuous reception period of the detected cell X.

If the SI to be notified to the LC-MTC UEs has been reduced and the LC-MTC UEs cannot obtain the system information for reselecting the cells, a problem in that the UE in the RRC_Idle state cannot perform the cell reselection process occurs.

When the UE cannot perform the cell reselection process and the reception quality of a serving cell on which the UE is camping has decreased, a problem in that the UE moves out of a coverage area occurs.

Furthermore, when the UE moves from the RRC_Idle state to the out-of-coverage area, a problem in that the UE cannot receive a paging message occurs through resetting of a configuration of, for example, the discontinuous reception (DRX) period.

The first embodiment will disclose a method for solving these problems. Upon completion of a discontinuous-reception-period timer (hereinafter may be referred to as a "discontinuous reception timer"), the LC-MTC UE synchronizes with a serving cell, and performs an operation for detecting a paging message. Even when moving out of the coverage area, the LC-MTC UE sets the discontinuous reception timer active. In other words, the LC-MTC UE maintains the discontinuous reception timer. A state in which the LC-MTC UE maintains the discontinuous reception timer while being out of the coverage area may be a new state. Alternatively, such a state may be one of the RRC_Idle states.

The LC-MTC UE does not have to receive the system information for reselecting a cell from a cell. The cell does not have to notify the LC-MTC UE of the system information for reselecting a cell. The LC-MTC UE does not have to perform the cell reselection process in the RRC_Idle state.

Accordingly, the LC-MTC UE can perform discontinuous reception even without the system information for reselecting a cell, and receive the paging message.

Figure 9:
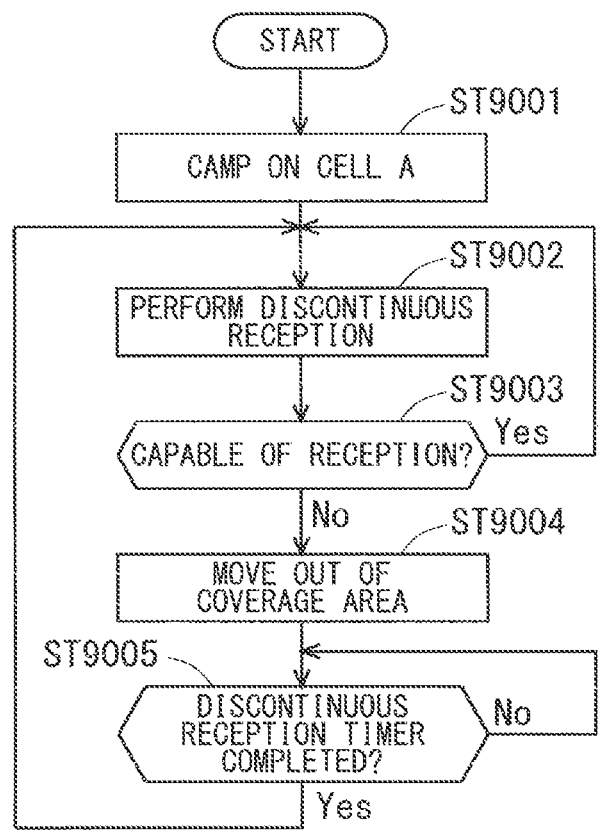
FIG. 9 is an example flowchart indicating processes of an LC-MTC UE in the RRC_Idle state according to a first embodiment.

FIG. 9 is an example flowchart indicating processes of the LC-MTC UE in the RRC_Idle state according to the first embodiment.

In Step ST9001, the LC-MTC UE in the RRC_Idle state camps on, for example, the cell A.

In Step ST9002, the LC-MTC UE in the RRC_Idle state that is camping on the cell A performs discontinuous reception. The LC-MTC UE neither receives the system information for reselecting a cell from the cell A nor performs the cell reselection process.

In Step ST9003, the LC-MTC UE determines a reception condition of a signal transmitted from the cell A on which the LC-MTC UE is camping. Specifically, the LC-MTC UE determines whether the reception quality of the cell is not degraded and it is capable of reception. When it is determined to be capable of reception, the LC-MTC UE returns to Step ST9002 and continues discontinuous reception. When it is determined not to be capable of reception, that is, when it is determined to be incapable of reception, the LC-MTC UE proceeds to Step ST9004 by determining that a predetermined moving condition is satisfied.

In Step ST9004, the LC-MTC UE moves out of the coverage area. When, for example, the reception quality of the serving cell is lower than or equal to a predetermined threshold, it may be determined that the LC-MTC UE moves out of the coverage area as a criterion for the determination.

The predetermined threshold may be statically predetermined, for example, in a standard, newly created and broadcasted by a cell as a parameter for the SI of the LC-MTC UE, or notified by a cell separately to the LC-MTC UEs through RRC signaling. The predetermined threshold may be determined according to the terminal capability of the LC-MTC UE.

Even when being out of the coverage area, the LC-MTC UE maintains the discontinuous reception (DRX) timer. Even when being out of the coverage area, the LC-MTC UE can determine the discontinuous reception timing by maintaining at least the discontinuous reception timer.

In Step ST9005, the LC-MTC UE determines whether the discontinuous reception timer has been completed. When it is determined that the discontinuous reception timer has not been completed, that is, the discontinuous reception timer has been incomplete, the process of Step ST9005 will be performed until the discontinuous reception timer is completed. When it is determined that the discontinuous reception timer has been completed, the processes return to Step ST9002, the LC-MTC UE synchronizes with the cell A on which the LC-MTC UE has been camping before moving out of the coverage area, and performs discontinuous reception.

The LC-MTC UE may hold information for synchronization with a cell on which the LC-MTC UE has been camping before moving out of the coverage area, and the system information received from the cell. Examples of the information for synchronization include a cell identifier.

The flowchart in FIG. 9 shows that the LC-MTC UE synchronizes with the cell on which the LC-MTC UE has been camping and performs discontinuous reception when it is determined that the discontinuous reception timer has been completed. Thus, the discontinuous reception timer may be set in consideration of a time necessary to start the discontinuous reception, for example, a time necessary for the synchronization. The discontinuous reception timer may be set, for example, to a time earlier than a time at which one discontinuous reception period has elapsed or to a time shorter than the discontinuous reception period.

Since the LC-MTC UE according to the first embodiment does not perform the cell reselection process, it moves out of the coverage area when the reception quality of a serving cell, for example, the reception quality of a reference signal (RS) of a cell such as reference signal received power (RSRP) and reference signal received quality (RSRQ) is degraded.

When the UE moves out of the coverage area, conventionally, it leaves the RRC_Idle state and resets the configuration for the cell on which the UE has been camping. Thus, the discontinuous reception timer is also reset.

However, the discontinuous reception timer is maintained even when the UE moves out of the coverage area according to the first embodiment. Accordingly, even when the UE temporarily moves out of the coverage area, it can perform discontinuous reception again with the cell on which the UE has been camping, using the discontinuous reception timer. Since the cell notifies the LC-MTC UE of a paging message in the discontinuous reception period if the paging message exists, the LC-MTC UE can receive the paging message notified from the cell.

With the method disclosed in the first embodiment, the LC-MTC UE can maintain the RRC_Idle state even without the information for reselecting a cell. Thus, the LC-MTC UE can receive the paging message. Accordingly, the LC-MTC UE can receive a command and data that are notified from, for example, an MTC operator or an MTC server, etc.

Furthermore, since the cell does not have to broadcast the information for reselecting a cell to the LC-MTC UE, it is possible to reduce an amount of the SI to be broadcasted. Furthermore, since the LC-MTC UE does not perform a cell reselection process and a cell selection process, the power consumption thereof can be reduced. Furthermore, since the number of processes can be reduced, the structure is simplified and a malfunction of the system can be reduced.

Although provision of a state of maintaining the discontinuous reception timer in an out-of-coverage area, that is, provision of one of the RRC_Idle states is disclosed, the process of moving to the conventional out-of-coverage area cannot be performed.

Here, the process of moving to the conventional out-of-coverage area may be newly provided. When the LC-MTC UE fails discontinuous reception a predetermined number of times, it moves to the conventional out-of-coverage area. When the LC-MTC UE can neither synchronize with a cell nor receive a control signal or a control channel with the discontinuous reception timing, it may be determined that the discontinuous reception has failed. A failure in the discontinuous reception may be a case where the LC-MTC UE cannot receive any signal due to degradation in the reception quality in Step ST9003 in FIG. 9.

The predetermined number of times of failure may be a case where the LC-MTC UE consecutively fails discontinuous reception for a predetermined number of times or a case where the LC-MTC UE fails discontinuous reception a predetermined number of times over a predetermined period of time. The information necessary for the LC-MTC UE to move to the conventional out-of-coverage area such as the predetermined number of times and the predetermined period may be predetermined, for example, in a standard or broadcasted as the SI for the LC-MTC UE. Alternatively, the information may be notified by the cell upon establishment of the RRC connection in the initial access.

Accordingly, the LC-MTC UE does not permanently continue the state of maintaining the discontinuous reception timer and repeating the discontinuous reception. Thus, the power consumption of the LC-MTC UE can be reduced.

First Modification of First Embodiment

A first modification will disclose another method for solving the problems described in the first embodiment. The LC-MTC UE performs the cell selection process when moving out of the coverage area. Examples of triggers for starting the cell selection process may include a time when the LC-MTC UE moves out of the coverage area and a time when the discontinuous reception timer has been completed after the LC-MTC UE moves out of the coverage area.

The LC-MTC UE does not have to receive the system information for reselecting a cell from a cell. The cell does not have to notify the LC-MTC UE of the system information for reselecting a cell. The LC-MTC UE does not have to perform the cell reselection process in RRC_Idle.

Accordingly, the LC-MTC UE can perform discontinuous reception and receive a paging message even without the information for reselecting a cell.

In the case where the time when the LC-MTC UE moves out of the coverage area is a trigger for starting the cell selection process, the cell selection process can be promptly performed. Accordingly, a favorable cell can be promptly detected and communication with the favorable cell can be promptly performed, according to variations in radio propagation environment.

In the case where the time when the discontinuous reception timer has been completed is a trigger for starting the cell selection process, a cell cannot be promptly detected and a delay may occur because cell detection is performed in accordance with the discontinuous reception period. However, when the cell on which the LC-MTC UE has been camping before moving out of the coverage area is selected in the cell selection process, it is possible to avoid wasteful reception. Thus, the power consumption of the LC-MTC UE can be reduced.

In the case where the time when the discontinuous reception timer has been completed is a trigger for starting the cell selection process, the LC-MTC UE may maintain the discontinuous reception timer in moving out of the coverage area. A state in which the discontinuous reception timer is maintained in the out-of-coverage area may be a new state. Alternatively, such a state may be one of the RRC_Idle states.

The LC-MTC UE may not necessarily perform an RRC connection establishment process when it selects a cell in the cell selection process.

After the cell is selected, when the selected cell belongs to the same TA as that of a cell before the selection, the LC-MTC UE enters the RRC_Idle state according to the broadcast information of the selected cell without the RRC connection establishment process.

After the cell is selected, when the selected cell does not belong to the same TA as that of the cell before the selection, the LC-MTC UE performs the RRC connection establishment process and the TAU.

Accordingly, since the RRC connection establishment process after selecting the cell can be omitted as necessary, the power consumption of the LC-MTC UE can be reduced.

Although it is disclosed that the LC-MTC UE may not necessarily perform the RRC connection establishment process when a cell is selected in the cell selection process, the LC-MTC UE may perform a periodic TAU. The RRC connection establishment process for the periodic TAU may be performed. Accordingly, a core network side can perform mobility management of the LC-MTC UE.

When a cell cannot be selected through the cell selection process, the LC-MTC UE moves to the conventional out-of-coverage area.

The process of moving to the conventional out-of-coverage area as disclosed in the first embodiment may be applied. When the LC-MTC UE performs the cell selection process instead of the discontinuous reception and fails the cell selection process a predetermined number of times, it may move to the conventional out-of-coverage area. Accordingly, when the radio propagation environment temporarily worsens, a cell can be selected.

Figure 10:
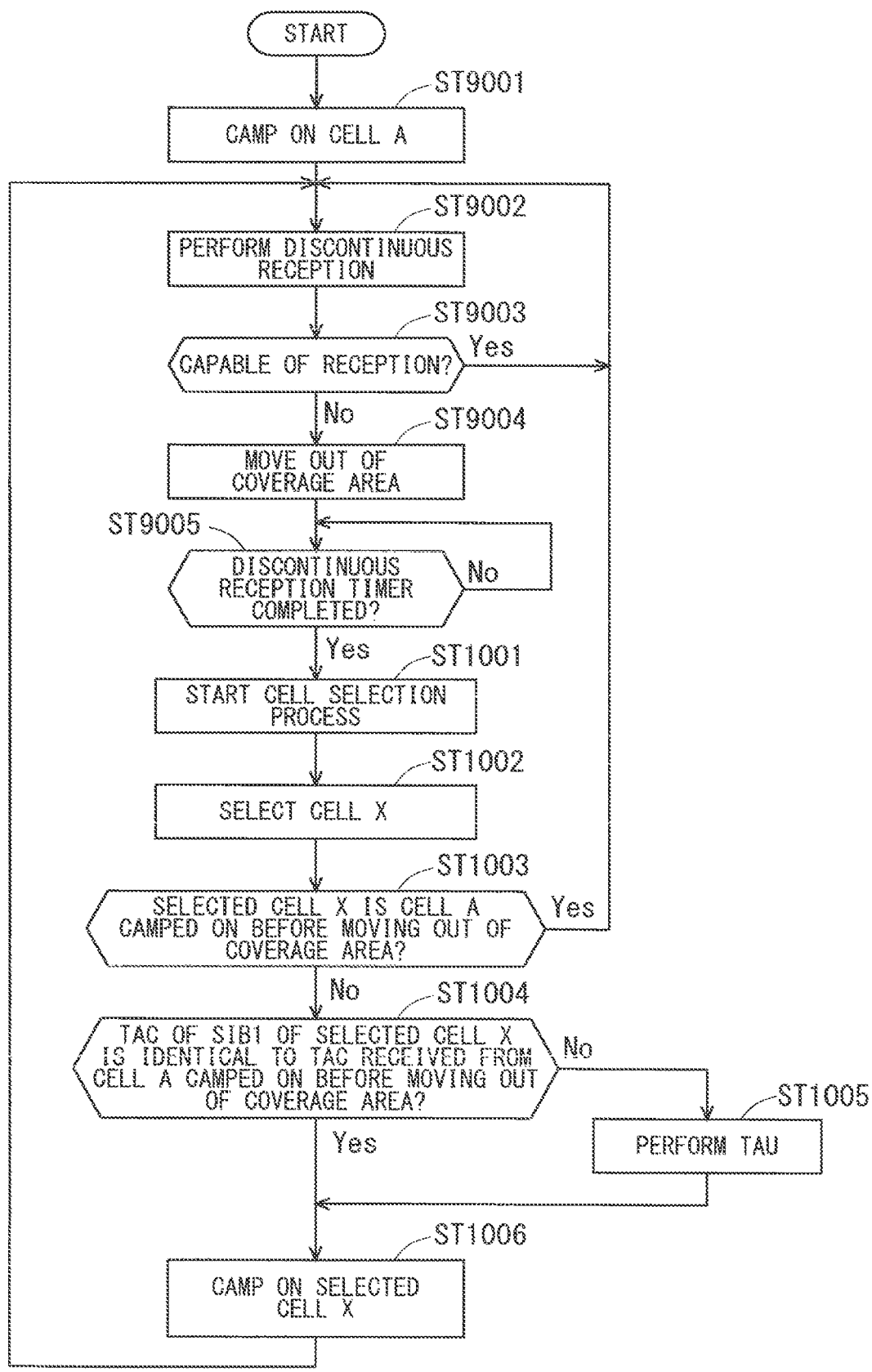
FIG. 10 is an example flowchart indicating processes of the LC-MTC UE in the RRC_Idle state according to a first modification of the first embodiment.

FIG. 10 is an example flowchart indicating processes of the LC-MTC UE in RRC_Idle according to the first modification of the first embodiment. Since the flowchart of FIG. 10 is similar to the flowchart of FIG. 9 as described above, the same step numbers will be assigned to the same Steps and the common description thereof will be omitted.

FIG. 10 shows an example in that completion of the discontinuous reception timer is a trigger for starting the cell selection process. Even when moving out of the coverage area, the LC-MTC UE maintains the discontinuous reception timer.

In Step ST9005 after Steps ST9001 to ST9004, the LC-MTC UE determines whether the discontinuous reception timer has been completed. When the discontinuous reception timer has not been completed yet, the process of Step ST9005 will be performed until the discontinuous reception timer is completed. When the discontinuous reception timer has been completed, the processes proceed to Step ST1001.

In Step ST1001, the LC-MTC UE starts the cell selection process.

In Step ST1002, the LC-MTC UE selects the cell X through the cell selection process.

In Step ST1003, it is determined whether the selected cell X is a cell on which the LC-MTC UE has been camping before moving out of the coverage area. When it is determined in Step ST1003 that the selected cell X is the cell on which the LC-MTC UE has been camping before moving out of the coverage area, the processes return to Step ST9002 and the discontinuous reception is performed. Since the discontinuous reception timer is set active in the cell on which the LC-MTC UE has been camping before moving out of the coverage area, after it is determined that the discontinuous reception timer has been completed, the discontinuous reception can be immediately performed with the cell.

When the selected cell X is the cell on which the LC-MTC UE has been camping before moving out of the coverage area, the processes from Steps ST1004 to ST1006 that are processes after the LC-MTC UE selects the cell can be omitted. Thus, the power consumption of the LC-MTC UE can be reduced.

When it is determined in Step ST1003 that the selected cell X is not the cell on which the LC-MTC UE has been camping before moving out of the coverage area, the processes proceed to Step ST1004.

In Step ST1004, the UE receives broadcast information of the selected cell X, and determines whether the TAC of the SIB1 of the selected cell X is identical to the TAC received from the cell A on which the UE has been camping before moving out of the coverage area, on the basis of the received broadcast information. When the TAC of the SIB1 of the selected cell X is different from the TAC received from the cell A, the processes proceed to Step ST1005. When the TAC of the SIB1 of the selected cell X is identical to the TAC received from the cell A, the UE proceeds to Step ST1006 while maintaining the RRC_Idle state.

In Step ST1005, the UE performs the TAU through the selected cell X. After performing the TAU process, the UE returns to the RRC_Idle state and proceeds to Step ST1006.

In Step ST1006, the UE camps on the selected cell X. After the UE camps on the selected cell X, it returns to Step ST9002 at the discontinuous reception period of the selected cell X, and performs the processes from Step ST9002 to Step ST1006 again.

When a cell cannot be selected through the cell selection process in Step ST1002, the UE moves to the conventional out-of-coverage area.

When the cell on which the UE has been camping before moving out of the coverage area is selected through the cell selection process in Step ST1002, the processes may proceed to Step ST1004 without proceeding to the discontinuous reception in Step ST9002. The determining process in Step ST1003 may be omitted.

When the cell on which the UE has been camping before moving out of the coverage area is selected, the discontinuous reception cannot be immediately performed. However, since the process in Step ST1003 can be omitted, the control can be simplified.

The LC-MTC UE may hold information for synchronization with the cell on which the LC-MTC UE has been camping before moving out of the coverage area, and the system information received from the cell. Examples of the information for synchronization include a cell identifier.

In the case where the time when the discontinuous reception timer has been completed is a trigger for starting the cell selection process, the discontinuous reception timer may be set in consideration of a time necessary to start the discontinuous reception, for example, a time necessary for the cell selection process. The discontinuous reception timer may be set, for example, to a time earlier than a time at which one discontinuous reception period has elapsed or to a time shorter than the discontinuous reception period.

The method disclosed in the first modification can produce the same advantages as described in the first embodiment. Furthermore, since the cell reselection process is not performed, the power consumption of the LC-MTC UE can be reduced. Furthermore, since the number of processes can be reduced, the structure is simplified and a malfunction of the system can be reduced.

When a cell is temporarily selected in the initial access, the serving cell will not be changed from then on in the method disclosed in the first embodiment. In contrast, since the cell selection process is started when the LC-MTC UE moves out of the coverage area according to the first modification, the serving cell can be changed.

Accordingly, even when the radio propagation environment of the cell on which the LC-MTC UE has been camping before moving out of the coverage area is degraded, a new cell can be selected. Thus, a stable communication system can be built.

A new discontinuous reception timer may be set as the discontinuous reception timer. The discontinuous reception timer is enabled while being maintained in the out-of-coverage area.

The new discontinuous reception timer may be used in common in a system, in MTC, or among the LC-MTC UEs, or provided for each cell. Alternatively, the new discontinuous reception timer may be used in common in a predetermined group. Alternatively, the new discontinuous reception timer may be provided for each of the LC-MTC UEs.

The following five examples (1) to (5) will be disclosed as specific examples of methods for recognizing the new discontinuous reception timer by the LC-MTC UE.

(1) The new discontinuous reception timer is statically predetermined, for example, in a standard. The method is effective when the new discontinuous reception timer is used in common in a system or among the LC-MTC UEs. Accordingly, an amount of information to be notified from the cell to the LC-MTC UE can be reduced.

(2) The new discontinuous reception timer is notified by an MIB. The method is effective when the new discontinuous reception timer is provided for each cell. Since the MIB is notified by six resource blocks (6 RBs) at the center of the system bandwidth, even the LC-MTC UE in which the bandwidth has been reduced can receive the new reception timer.

(3) The new discontinuous reception timer is notified by the SI for the LC-MTC UE. The method is effective when the new discontinuous reception timer is provided for each cell or each of the LC-MTC UEs. The new discontinuous reception timer can be received irrespective of an RRC state (RRC_Idle, RRC Connected) of the LC-MTC UE.

(4) The new discontinuous reception timer is notified by RRC signaling. Here, the new discontinuous reception timer may be notified in the initial access. The method may be applied when the new discontinuous reception timer is provided for each cell or each of the LC-MTC UEs. A larger amount of parameters can be notified than that when the new discontinuous reception timer is notified by the MIB or the SI. Conversely, the amount of information to be notified by the MIB or the SI can be reduced.

(5) Timer values are statically predetermined, for example, in a standard to provide indications corresponding to the respective timer values. The MIB or the SI for the LC-MTC UE with the indications may be notified to the LC-MTC UE. The method is effective when the new discontinuous reception timer is provided for each cell or each of the LC-MTC UEs. Thus, the amount of information in the MIB or the SI can be reduced.

Second Modification of First Embodiment

A second modification will disclose another method for solving the problems described in the first embodiment. The LC-MTC UE performs the cell selection process in RRC_Idle. The cell selection process may be performed before moving out of the coverage area. The cell selection process may be performed instead of the conventional cell reselection process.

The LC-MTC UE does not have to receive the system information for reselecting a cell from a cell. The cell does not have to notify the LC-MTC UE of the system information for reselecting a cell. The LC-MTC UE does not have to perform the cell reselection process in RRC_Idle.

Accordingly, the LC-MTC UE can perform discontinuous reception and receive a paging message even without the information for reselecting a cell.

Since there is no criterion for the cell selection process in RRC_Idle, criteria for the cell selection process are established in the second modification. Particularly, a criterion for starting the cell selection process in RRC_Idle is established. Specifically, a parameter for the criterion for starting the cell selection process is defined. A cell notifies the LC-MTC UE of the parameter for the criterion. Examples of the parameter for the criterion include a period for measuring the reception quality of a serving cell, a measurement filter coefficient, and a threshold, etc.

Only a threshold for the reception quality may be provided as the parameter for the criterion. The period for measuring the reception quality and the measurement filter coefficient may be compliant with the conventional cell selection process. Setting only the threshold for the reception quality enables reduction in the amount of information to be notified from the cell to the LC-MTC UE. When the threshold for the reception quality is set and the reception quality of the serving cell is lower than the threshold for the cell selection process, the LC-MTC UE may start to select a cell.

Accordingly, the LC-MTC UE can start the cell selection process in RRC_Idle.

The threshold for starting the cell selection process may be higher than the value of the reception quality for moving to the conventional out-of-coverage area. Alternatively, the threshold may be higher than the reception quality for moving out of the coverage area or a threshold for moving out of the coverage area which is disclosed in the first embodiment or in the first modification of the first embodiment. Accordingly, the LC-MTC UE can start the cell selection process before moving out of the coverage area.

Conventionally, the cell reselection process has been started using the system information for the cell reselection process. However, the LC-MTC UE that cannot obtain the system information for the cell reselection process cannot perform the cell reselection process. Thus, the LC-MTC UE may perform the cell selection process.

However, the cell selection process has been conventionally started by a non-access stratum (NAS). Since determination by the NAS is necessary in RRC_Idle, the processes become complicated. Thus, the LC-MTC UE may perform the cell selection process without requiring an instruction of the NAS in RRC_Idle. The LC-MTC UE may perform the cell selection process through determination by an access stratum (AS) in RRC_Idle.

The parameter for the criterion for starting the cell selection process in RRC_Idle may be used in common in a system, in MTC, or among the LC-MTC UEs, or provided for each cell. Alternatively, the parameter for the criterion may be used in common in a predetermined group. Alternatively, the parameter for the criterion may be provided for each of the LC-MTC UEs. Furthermore, the parameter for the criterion may be obtained by combination of these.

The following five examples (1) to (5) will be disclosed as specific examples of methods for recognizing the parameter for the criterion by the LC-MTC UE.

(1) The parameter is statically predetermined, for example, in a standard. The method is effective when the parameter is used in common in a system or among the LC-MTC UEs. Accordingly, an amount of information to be notified from the cell to the LC-MTC UE can be reduced.

(2) The parameter is notified by an MIB. The method is effective when the parameter is provided for each cell. Since the MIB is notified by six resource blocks at the center of the system bandwidth, even the LC-MTC UE in which the bandwidth has been reduced can receive the parameter.

(3) The parameter is notified by the SI for the LC-MTC UE. The method is effective when the parameter is provided for each cell or each of the LC-MTC UEs. The parameter can be received irrespective of an RRC state (RRC_Idle, RRC Connected) of the LC-MTC UE.

(4) The parameter is notified by RRC signaling. Here, the parameter may be notified in the initial access. The method may be applied when the parameter is provided for each cell or each of the LC-MTC UEs. A larger amount of parameters can be notified than that when the parameter is notified by the MIB or the SI. Conversely, the amount of information to be notified by the MIB or the SI can be reduced.

(5) Parameter groups are statically predetermined, for example, in a standard to provide indications corresponding to the respective parameter groups. The MIB or the SI for the LC-MTC UE with the indications may be notified to the LC-MTC UE. The method is effective when the parameter is provided for each cell or each of the LC-MTC UEs. Thus, the amount of information in the MIB or the SI can be reduced.

Figure 11:
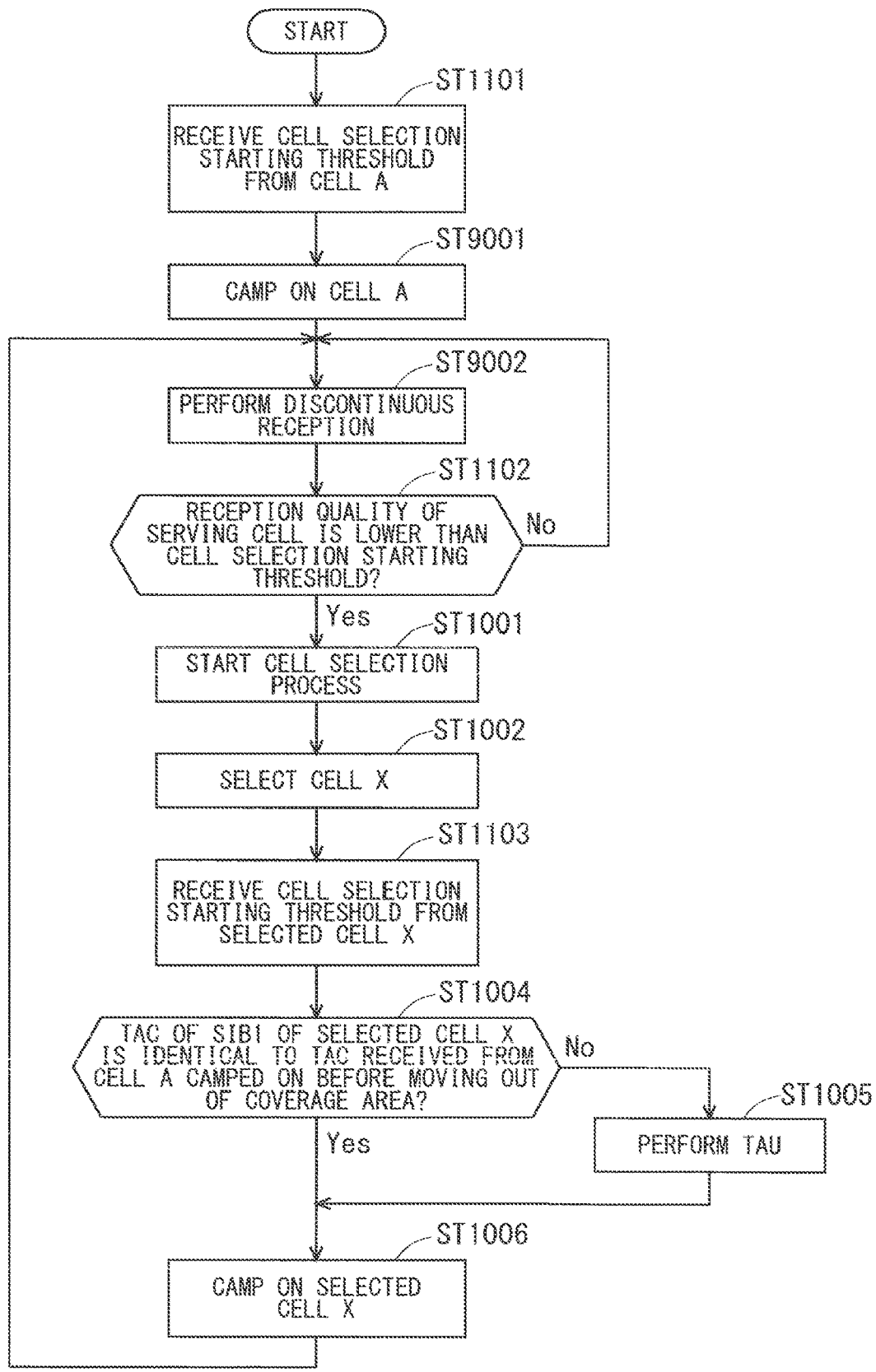
FIG. 11 is an example flowchart indicating processes of the LC-MTC UE in the RRC_Idle state according to a second modification of the first embodiment.

FIG. 11 is an example flowchart indicating processes of the LC-MTC UE in RRC_Idle according to the second modification of the first embodiment. Since the flowchart of FIG. 11 is similar to the flowchart of FIG. 10, the same step numbers will be assigned to the same Steps and the common description thereof will be omitted.

In Step ST1101, the LC-MTC UE receives a threshold for starting the cell selection process (hereinafter may be referred to as "cell selection starting threshold") from the cell A.

In Step ST9001, the LC-MTC UE in the RRC_Idle state camps on the cell A.

In the example of FIG. 11, the cell A notifies the LC-MTC UE of the cell selection starting threshold as system information for the LC-MTC UE.

In Step ST9002, the LC-MTC UE that is camping on the cell A performs discontinuous reception.

In Step ST1102, the LC-MTC UE determines, using the cell selection starting threshold received from the cell A, whether the reception quality of the serving cell is lower than the cell selection starting threshold. When it is determined that the reception quality of the serving cell is lower than the cell selection starting threshold, the processes proceed to Step ST1001. When it is determined that the reception quality of the serving cell is not lower than the cell selection starting threshold, the processes return to Step ST9002 and the discontinuous reception operation is performed.

In Step ST1001, the cell selection process is started. In Step ST1002, the LC-MTC UE selects the cell X through the cell selection process.

In Step ST1103, the UE receives the system information notified from the selected cell X. This system information includes the cell selection starting threshold for starting the cell selection process of the cell X. In other words, the UE receives the cell selection starting threshold by receiving the system information from the selected cell X.

The LC-MTC UE that has received the cell selection starting threshold of the cell X in Step ST1103 determines in Step ST1004 whether the TAC of the SIB1 of the selected cell X is identical to the TAC received from the cell A on which the LC-MTC UE has been camping until just before, that is, the cell A on which the LC-MTC UE has been camping before moving out of the coverage area. When the TAC of the SIB1 of the selected cell X is different from the TAC received from the cell A, the processes proceed to Step ST1005. When the TAC of the SIB1 of the selected cell X is identical to the TAC received from the cell A, the UE proceeds to Step ST1006 while maintaining the RRC_Idle state.

In Step ST1005, the UE performs the TAU through the selected cell X. After performing the TAU process, the UE returns to the RRC_Idle state and proceeds to Step ST1006.

In Step ST1006, the UE camps on the selected cell X. After the UE camps on the cell X, it returns to Step ST9002 at the discontinuous reception period of the selected cell X, and performs the processes from Step ST9002 to Step ST1006 again.

Accordingly, the LC-MTC UE can perform the cell selection process in RRC_Idle. The cell selection process enables selection of a cell with superior reception quality. With the cell selection process, a state in which the LC-MTC UE in the RRC_Idle state moves out of the coverage area can be eliminated as much as possible.

Thus, even when change in the radio propagation environment prolongs the worse reception quality of the serving cell, another cell can be selected and communication can be performed through the cell. Accordingly, a stable communication system can be built.

The LC-MTC UE maintains the RRC_Idle state when selecting a cell. The configuration in RRC_Idle is maintained. The LC-MTC UE may not necessarily perform the RRC connection establishment process when a cell is selected in the cell selection process.

After the cell is selected, when the selected cell belongs to the same TA as that of the cell before the selection, the RRC_Idle state is maintained according to the broadcast information of the selected cell without the RRC connection establishment process.

After the cell is selected, when the selected cell does not belong to the same TA as that of the cell before the selection, the RRC connection establishment process and the TAU are performed.

Accordingly, since the RRC connection establishment process after selecting the cell can be omitted as necessary, the power consumption of the LC-MTC UE can be reduced.

The LC-MTC UE moves to the conventional out-of-coverage area when a cell cannot be selected through the cell selection process. The process of moving to the conventional out-of-coverage area as disclosed in the first embodiment may be applied. When the LC-MTC UE performs the cell selection process instead of the discontinuous reception and fails the cell selection process a predetermined number of times, it may move to the conventional out-of-coverage area. Accordingly, when the radio propagation environment temporarily worsens, a cell can be selected.

The other methods for triggering the start of the cell selection process may include predetermined timing and periodical execution. The LC-MTC UE performs the cell selection process at a predetermined period or with predetermined timing. The predetermined period may be asynchronous to the discontinuous reception period, or an integer multiple or an integral submultiple of the discontinuous reception period. Accordingly, start of the cell selection process can be set separately from the discontinuous reception period. Accordingly, the cell selection process can be flexibly started according to an installation environment and an operational environment of the LC-MTC UE.

The method on the new discontinuous reception timer disclosed in the first modification of the first embodiment may be applied to a method for setting predetermined timing or a predetermined period. A combination of predetermined timing or a predetermined period with a threshold may be used as a trigger for starting the cell selection process.

Accordingly, the cell selection process can be more flexibly started according to the installation environment, the operational environment, and the radio propagation environment of the LC-MTC UE.

Third Modification of First Embodiment

A third modification will disclose another method for solving the problems described in the first embodiment. The LC-MTC UE performs the cell reselection process in RRC_Idle. The problem here is how the LC-MTC UE recognizes a parameter necessary for the cell reselection process (hereinafter may be referred to as a "cell reselection process parameter"). A method for configuring a cell reselection process parameter of the LC-MTC UE and a method for recognizing the cell reselection process parameter by the LC-MTC UE will be disclosed.

The cell reselection process parameter of the LC-MTC UE may be used in common in a system, in MTC, or among the LC-MTC UEs, or provided for each cell. The cell reselection process parameter may be used in common in a predetermined group. Alternatively, the cell reselection process parameter may be provided for each of the LC-MTC UEs. Furthermore, the cell reselection process parameter may be obtained by combination of these.

The following five examples (1) to (5) will be disclosed as specific examples of methods for recognizing the cell reselection process parameter by the LC-MTC UE.

(1) The parameter is statically predetermined, for example, in a standard. The method is effective when the parameter is used in common in a system or among the LC-MTC UEs. Accordingly, an amount of information to be notified from the cell to the LC-MTC UE can be reduced.

(2) The parameter is notified by an MIB. The method is effective when the parameter is provided for each cell. Since the MIB is notified by six resource blocks at the center of the system bandwidth, even the LC-MTC UE in which the bandwidth has been reduced can receive the parameter.

(3) The parameter is notified by the SI for the LC-MTC UE. The method is effective when the parameter is provided for each cell or each of the LC-MTC UEs. The parameter can be received irrespective of an RRC state (RRC_Idle, RRC Connected) of the LC-MTC UE.

(4) The parameter is notified by RRC signaling. Here, the parameter may be notified in the initial access. The method may be applied when the parameter is provided for each cell or each of the LC-MTC UEs. A larger amount of parameters can be notified than that when the parameter is notified by the MIB or the SI. Conversely, the amount of information to be notified by the MIB or the SI can be reduced.

(5) Parameter groups for cell reselection process are statically predetermined, for example, in a standard to provide indications corresponding to the respective groups. The MIB or the SI for the LC-MTC UE with the indications may be notified to the LC-MTC UE. The method is effective when the parameter is provided for each cell or each of the LC-MTC UEs. Thus, the amount of information in the MIB or the SI can be reduced.

The method above may be applied to every parameter or every parameter group. The cell reselection process parameter of the LC-MTC UE may be used in common among cells in a TA. Alternatively, the cell reselection process parameter of the LC-MTC UE may be used in common in MTC or in a predetermined group of the LC-MTC UEs.

Accordingly, when the cell reselection process parameter is notified by RRC signaling in the specific example of (4), the LC-MTC UE reselects cells in RRC_Idle and selects a cell in the same TA, the LC-MTC UE can continue to use the cell reselection process parameter. When the LC-MTC UE selects the cell in the same TA, it does not have to establish the RRC connection with the cell.

Thus, the LC-MTC UE can continue to perform the cell reselection process. Furthermore, notification of the parameter by RRC signaling in the specific example of (4) enables reduction in the amount of information to be notified by the MIB or the SI.

The RRC connection may be certainly established when the LC-MTC UE changes a cell as an alternative method. The notification method by RRC signaling in the specific example of (4) may be applied thereto. Accordingly, even when the LC-MTC UE reselects cells in RRC_Idle and selects a cell in the same TA, it can obtain a cell reselection parameter for the cell by RRC signaling through establishment of the RRC connection.

When it is necessary to notify the LC-MTC UE of not only the cell reselection parameter but also the system information by RRC signaling, in the case where the LC-MTC UE changes the cell, it may establish the RRC connection. The system information may be notified to the LC-MTC UE during the RRC connection.

Fourth Modification of First Embodiment

The first embodiment has disclosed that the reduction in the SI to be notified to the LC-MTC UEs is required and the SI to be reduced includes parameters except for a SIB1, a SIB2, and a SIB14 that are SIBs for initial access.

The fourth modification will disclose another method for reducing the SI. The SI for the cell reselection process that is included in the conventional SI is partly reduced. The conventional SI for the cell reselection process is partly reduced to the SI for the cell reselection process of the LC-MTC UE. A cell notifies the LC-MTC UE of the SI for cell reselection process of the LC-MTC UE.

The following (1) to (7) will be disclosed as example parameters to be reduced among the conventional cell reselection parameters.

(1) Parameters on speed, for example, "speedStateReselectionPars" and parameters included in "speedStateReselectionPars", etc.; the LC-MTC UE that moves within a predetermined cell or does not move does not need the parameters on speed. Thus, even when the parameters on speed are reduced, the LC-MTC UE can perform the cell reselection process.

(2) Parameters on inter-frequency, for example, "cellReselectionServingFreqInfo" and parameters included in "cellReselectionServingFreqInfo", and the SIB5 and parameters included in the SIB5, etc.; the LC-MTC UE that operates at a predetermined carrier frequency does not need the parameters on inter-frequency. Thus, even when the parameters on inter-frequency are reduced, the LC-MTC UE can perform the cell reselection process.

(3) Parameters on inter radio access technology (inter-RAT), for example, "cellReselectionServingFreqInfo" and parameters included in "cellReselectionServingFreqInfo", and the SIB6 and parameters included in the SIB6, etc.; the LC-MTC UE that operates under predetermined RAT does not need the parameters on inter-RAT. Thus, even when the parameters on inter-RAT are reduced, the LC-MTC UE can perform the cell reselection process.

(4) Parameters on priority, for example, "cellReselectionPriority", etc.; the LC-MTC UE that operates at a predetermined carrier frequency does not need the parameters on priority. Thus, even when the parameters on priority are reduced, the LC-MTC UE can perform the cell reselection process.

(5) Parameters on measurement bandwidth, for example, "q-QualMinWB", etc.; the measurement bandwidth for the LC-MTC UE that operates at a reduced bandwidth may be determined in advance as the reduced bandwidth. Here, the parameters on measurement bandwidth are unnecessary. Thus, even when the parameters on measurement bandwidth are reduced, the LC-MTC UE can perform the cell reselection process.

(6) Parameters on RSRQ, for example, "s-IntraSearchQ" and "q-QualMinWB", etc.; the LC-MTC UE may predetermine the reception quality as RSRP. Here, the parameters on RSRQ are unnecessary. Thus, even when the parameters on the RSRQ are reduced, the LC-MTC UE can perform the cell reselection process.

(7) A part or the entire of the parameters (1) to (6) may hold.

The following six examples (1) to (6) will be disclosed as example parameters that are not to be reduced among the conventional cell reselection parameters.

(1) Parameters on start of the cell reselection process, for example, "s-IntraSearchP" and "s-IntraSearchQ", etc.; the parameters on start of the cell reselection process are parameters necessary for starting the cell reselection process. Retaining the parameters on start of the cell reselection process enables the LC-MTC UE to start the cell reselection process.

(2) Parameters on measurement of a cell in the cell reselection process, for example, "t-ReselectionEUTRA", etc.; the parameters on measurement of the cell in the cell reselection process are parameters necessary for measuring the reception quality of the cell in the cell reselection process. Retaining the parameters on measurement of the cell in the cell reselection process enables the LC-MTC UE to recognize how to measure the cell.

(3) Parameters on selection of a cell in the cell reselection process, for example, "q-Hyst", etc.; the parameters on selection of the cell in the cell reselection process are parameters necessary for fulfilling the criterion for reselecting a cell. Retaining the parameters on selection of the cell in the cell reselection process enables the LC-MTC UE to recognize how to select a cell.

(4) Parameters on intra-frequency, for example, the SIB3 and parameters included in the SIB3, etc.; the parameters on intra-frequency are parameters necessary for the LC-MTC UE that operates at a predetermined carrier frequency. Retaining the parameters on intra-frequency enables the LC-MTC UE to perform a cell reselection process on a cell at the intra-frequency.

(5) Parameters on particular cell lists, for example, "intraFreqNeighCellList", "intraFreqBlackCellList", and "csg-PhysCellIdRange", etc.; the parameters on particular cell lists are parameters indicating whether a cell reselection can be performed on a predetermined cell. Furthermore, the parameters on particular cell lists are parameters necessary for the LC-MTC UE that operates in a predetermined cell. Retaining the parameters on particular cell lists enables the LC-MTC UE to perform the cell reselection process on the predetermined cell.

(6) A part or the entire of the parameters (1) to (5) may hold.

When the conventional SI for the cell reselection process is partly reduced to the SI for the cell reselection process of the LC-MTC UE, all the parameters necessary for the criteria for the cell reselection process cannot be obtained. Here, criteria for the cell reselection process in which the reduced parameters are not used may be newly established. To put it the simplest, criteria in which the reduced parameters are omitted may be established.

For example, a case where the SI for the cell reselection process of the LC-MTC UE is limited to the parameters on start of the cell reselection process will be disclosed. A cell notifies the LC-MTC UE of a parameter "s-IntraSearchP" as the SI. The LC-MTC UE measures the reception quality of the serving cell, that is, the RSRP herein. When the measurement value is lower than or equal to the parameter "s-IntraSearchP", the cell reselection process is started. The criteria for the cell reselection process are indicated below.

$$Rs=Qmeas, s, Rn=Qmeas, n$$

A cell with the highest reception quality is selected from among Rs and Rn. Here, Qmeas, s is a measurement value of the reception quality of the serving cell, and Qmeas, n is a measurement value of the reception quality of the adjacent cell.

The method disclosed in the third modification of the first embodiment may be applied to a method for recognizing, by the LC-MTC UE, the SI for the cell reselection process of the LC-MTC UE that is obtained by partly reducing the conventional SI for the cell reselection process.

Accordingly, even when the conventional SI for the cell reselection process is partly reduced to the SI for the cell reselection process of the LC-MTC UE, the cell reselection process can be performed. The cell reselection can be more flexibly started according to the installation environment, the operational environment, and the radio propagation environment of the LC-MTC UE. With the cell reselection process, a state in which the LC-MTC UE in the RRC_Idle state moves out of the coverage area can be eliminated as much as possible. Furthermore, partial reduction of the SI enables reduction in necessary resources even when the SI is repeatedly notified.

Second Embodiment

The LC-MTC UE may select a far cell depending on a radio environment in the cell selection process. As described in the first embodiment, when the SI for reselecting a cell is reduced to meet the demand for reduction in the SI of the LC-MTC UE, unless something is done, the cell reselection process of the LC-MTC UE is not performed.

Here, until the next cell selection process is performed, it is necessary to camp on the far cell that has been temporarily selected. Accordingly, it is highly probable that the reception quality in the LC-MTC UE is degraded and the LC-MTC UE moves out of the coverage area. When moving out of the coverage area, the LC-MTC UE newly performs a cell selection process according to an instruction of the NAS, establishes the RRC connection, and performs an attach process or the TAU process. Accordingly, a problem with increase in power consumption of the LC-MTC UE occurs.

The cell selection process has a stored information cell selection function (see Non-Patent Document 2). Even with this function, when a far cell is initially selected and no cell reselection process is performed, information on the first far cell is merely stored and the far cell is then selected in the following cell selection processes. Thus, even with the stored information cell selection function, a problem with increase in power consumption of the UE occurs.

The second embodiment will disclose a method for solving these problems. Priorities are assigned in the cell selection process.

The following three examples (1) to (3) will be disclosed as examples of information to which the priorities are assigned.

(1) Carrier frequency information; the information may be indicated by an absolute radio-frequency channel number (ARFCN).
(2) Cell information; the information may be a cell identifier or a PCI.
(3) A combination of (1) and (2) above The information may be set with a priority. Accordingly, carrier information or cell information for selecting a cell in priority can be recognized. The priorities may be assigned in common in a system, in MTC, or among the LC-MTC UEs, or for each cell. The priorities may be assigned in common in a predetermined group. Alternatively, the priorities may be assigned for each of the LC-MTC UEs. Furthermore, the priorities may be assigned according to the combination above.

The method for recognizing the new discontinuous reception timer by the LC-MTC UE that is disclosed in the first modification of the first embodiment may be applied to a method for recognizing the priorities by the LC-MTC UE. The priorities may be stored in a SIM as an alternative method. The priorities may be stored for each operator to be registered. The priorities may be stored in association with UE capability. Accordingly, the LC-MTC UE can recognize the priorities in the cell selection process. The maximum number of the priorities may be set. Accordingly, the amount of information to be notified to the LC-MTC UE can be reduced.

The following three examples (1) to (3) will be disclosed as example subjects to which the priorities are assigned.
(1) eNBs (cell)
(2) MMEs; here, the MMEs notify an eNB of the priority. The priority may be notified using an S1 interface.
(3) Operators; here, the operators notify an eNB of the priority. The priority may be notified through an MME. Furthermore, the operators may write the priority in a SIM of the LC-MTC UE.

An example method for deriving the priorities will be hereinafter disclosed. The priorities are determined according to an installation location of the LC-MTC UE. An eNB may obtain the installation location of the LC-MTC UE using a location system. Alternatively, the eNB may obtain the installation location of the LC-MTC UE using a function of minimization of drive tests (MDT). Alternatively, an operator may obtain information on the installation location of the LC-MTC UE.

The installation location is determined according to a result of a measurement report by the LC-MTC UE as an alternative method. For example, the eNB that has received a measurement report on the serving cell of the LC-MTC UE or on the neighbor cells averages or filters the measurement results for a predetermined period of time. The eNB may derive a carrier frequency or a cell having the best reception quality from a result of the averaging or the filtering and assign the highest priority to the carrier frequency or the cell. The priorities may be assigned in descending order of the reception quality.

Although the cells with the best reception quality are selected in the conventional cell selection process, the cells can be selected according to the priorities with the method disclosed in the second embodiment. Accordingly, even when the LC-MTC UE does not perform the cell reselection process, the power consumption of the LC-MTC UE can be reduced. Since a cell with the higher priority can be selected in performing the cell selection process, the power consumption of the LC-MTC UE can be reduced.

First Modification of Second Embodiment

A first modification will disclose another method for solving the problems described in the second embodiment. Cell selection candidates are provided. One or more cell selection candidates are provided. The method disclosed in the second embodiment may be applied to example information for providing the cell selection candidates, a method for recognizing the cell selection candidates by the LC-MTC UE, and a subject that determines the cell selection candidates. A predetermined number of the cell selection candidates may be determined in descending order of the priorities.

A method for deriving a cell to be selected from the cell selection candidates will be hereinafter disclosed. The LC-MTC UE detects cells in the cell selection candidates in selecting a cell. Not only the carrier frequency information or the cell information of the detected cells but also the reception quality thereof, specifically, at least one of the RSRP and the RSRQ as the RS reception quality are stored. The LC-MTC UE assigns priorities to cells in descending order of the reception quality, and selects the cells in the descending order.

Accordingly, the priorities of the cell selection candidates are updated on each occasion. Thus, it is possible to flexibly respond to change in the radio propagation environment and reduce the power consumption of the LC-MTC UE.

Third Embodiment

The paging repetitions are being studied for LC-MTC requiring coverage enhancement. The repeated transmission improves the reception quality in the LC-MTC UEs in the enhanced coverage areas.

Since the paging repetitions are not conventionally performed, 3GPP is studying new methods for the paging repetitions. Non-Patent Document 11 discloses a method for repeated paging transmission across subframes as a method for the paging repetitions.

However, none of the details of the structure of the subframes for paging transmission is disclosed. Thus, it becomes unclear which subframe the LC-MTC UE should receive, and the LC-MTC UE cannot receive pagings including repetitions.

The third embodiment will disclose a detailed method for the paging repetitions. The paging transmission including the repetitions are performed across radio frames. The transmission may be performed through consecutive radio frames. An initial paging may be transmitted on radio frames and subframes that are derived by the conventional method for deriving paging frames (PFs) and paging occasions (POs) (see Non-Patent Document 2).

The PFs and the POs are derived using a discontinuous reception parameter such as a discontinuous reception (DRX) period notified by upper-layer signaling, and a UE identifier (UE-ID). The POs are limited to the subframes whose subframe numbers are 0, 4, 5, and 9 for frequency division duplex (FDD), whereas the POs are limited to the subframes whose subframe numbers are 0, 1, 5, and 9 for time division duplex (TDD).

The pagings are consecutively transmitted across radio frames for repeated transmission from the initial radio frame. The subframes for repeated paging transmission have the same subframe numbers as those derived at the initial transmission. The LC-MTC UE may receive the pagings for initial transmission and repeated transmission across the radio frames and the subframes that are derived in such a manner.

Accordingly, the LC-MTC UE can receive the pagings including the repetitions. Thus, the LC-MTC UEs in the enhanced coverage areas can receive the pagings.

The LC-MTC UE may finish receiving the repeated transmission once securing a desired reception quality, without receiving all the initial transmission and the repeated transmission. Accordingly, since the reception operations of the LC-MTC UE can be reduced, the power consumption can be reduced. Furthermore, since the paging reception can be finished earlier and operations after the paging reception can be started earlier, a delay time can be shortened.

Figure 12:
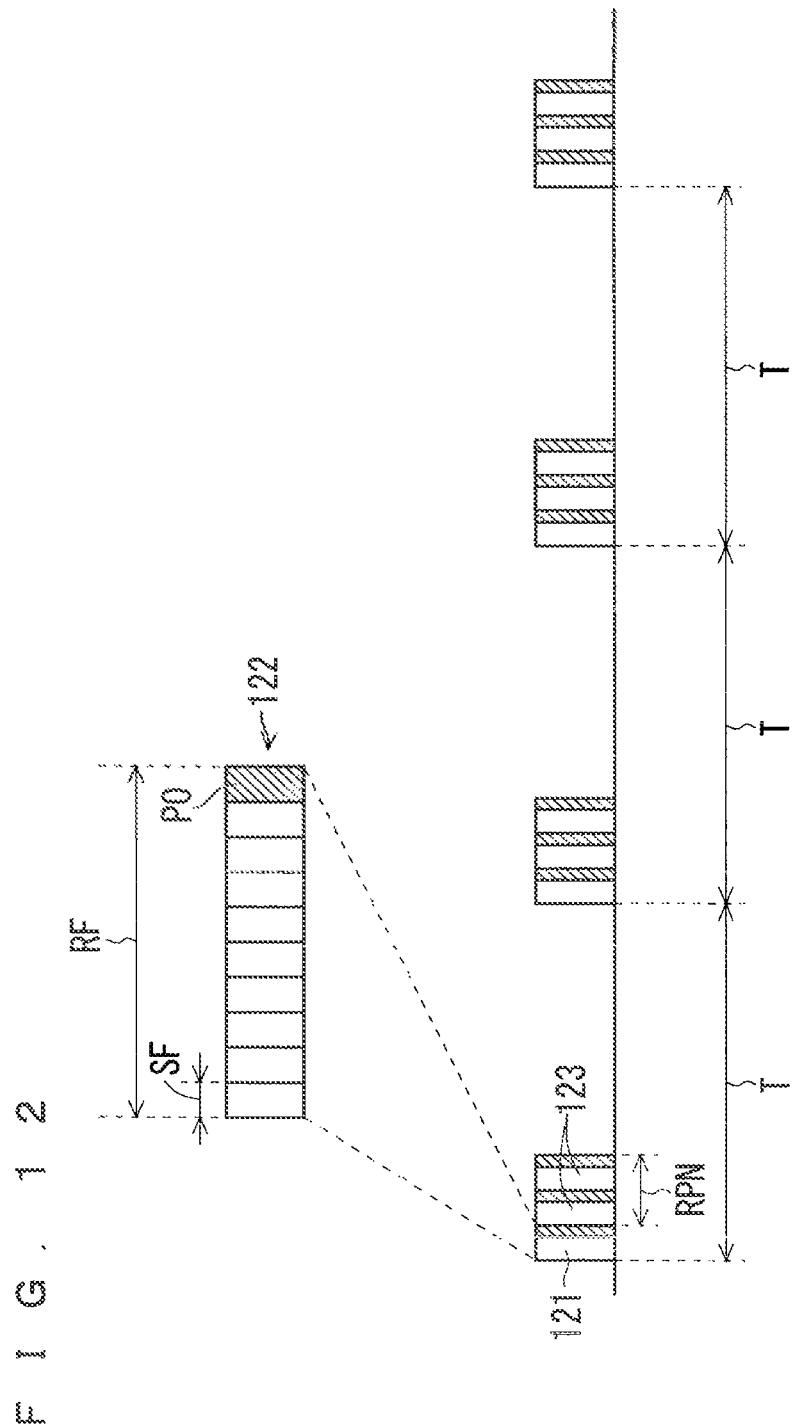
FIG. 12 illustrates an example method for repeated paging transmission according to a third embodiment.

FIG. 12 is a conceptual diagram illustrating an example method for repeated paging transmission according to the third embodiment. In FIG. 12, a reference numeral "121" denotes a paging frame (PF) that is a radio frame RF for initial paging transmission. Furthermore, a reference numeral "122" denotes a structure of subframes SF in the radio frame RF.

The radio frame RF consists of the ten subframes SF whose subframe numbers range from 0 to 9. The diagonally hatched subframe SF is a paging occasion (PO) that is the subframe SF for initial paging transmission. The PO that is the subframe SF for initial paging transmission has the subframe number "9".

In FIG. 12, a reference numeral "123" denotes the radio frame RF for repeated paging transmission. The pagings for repeated transmission as many as the number of repetitions are consecutively transmitted from the PF that is the radio frame RF for initial paging transmission. The number of repetitions is "2" herein. The structure of the subframes SF within the radio frames RF that are for repeated paging transmission is the same as that of the subframes SF in the PF that is the radio frame RF for initial paging transmission.

Thus, the subframes for repeated paging transmission have the subframe number "9". The PFs/POs for initial paging transmission, and the radio frames RF and the subframes SF for repeated paging transmission are repeatedly transmitted on a discontinuous reception period T.

The number of paging repetitions may be determined for each cell or for each of the LC-MTC UEs. The number of repetitions may be determined by a cell. The cell may determine the number of repetitions using, for example, a reception quality, a CQI, or CSI in the LC-MTC UE. Furthermore, the cell may obtain the capability of the LC-MTC UE and determine the number of repetitions using the capability. The following two examples (1) and (2) will be disclosed as specific examples of a method for recognizing the number of paging repetitions by the LC-MTC UE.

(1) The number of paging repetitions is notified by the SI for the LC-MTC UE. The method is effective when the number of paging repetitions is notified for each cell or each of the LC-TC UEs. Accordingly, the number of paging repetitions can be received irrespective of an RRC state (RRC_Idle, RRC Connected) of the LC-MTC UE.

(2) The number of paging repetitions is notified by RRC signaling. Here, the number of paging repetitions may be notified in the initial access. The method may be applied when the number of paging repetitions is notified for each cell or each of the LC-MTC UEs. A larger amount of parameters can be notified than that when the number of paging repetitions is notified by the MIB or the SI. Furthermore, the amount of information to be notified by the MIB or the SI can be reduced.

Accordingly, the LC-MTC UE can receive the pagings for initial transmission and repeated transmission.

Although the method for repeated paging transmission on the radio frames that are consecutive from the initial transmission is described above, another method will be disclosed. The repeated paging transmission may be performed at predetermined radio frame intervals from the initial transmission.

For example, when the number of paging repetitions is 2, the predetermined radio frame intervals are 3, and the radio frame number of the radio frame for initial paging transmission is 25, the first repetition is transmitted by the radio frame whose radio frame number is 28, and the second repetition is transmitted by the radio frame whose radio frame number is 31. When the predetermined radio frame intervals are 1, the radio frames may be consecutive.

Accordingly, even in the paging repetitions, the resources can be flexibly scheduled.

The predetermined radio frame intervals may be statically predetermined, for example, in a standard. Furthermore, the intervals may be predetermined for each cell or for each of the LC-MTC UEs. The method for recognizing the number of paging repetitions may be applied to a method for recognizing the predetermined radio frame intervals by the LC-MTC UE. Accordingly, the LC-MTC UE can recognize the predetermined radio frame intervals and receive the pagings for initial transmission and repeated transmission.

A period derived from the number of repetitions and the radio frame intervals at which the paging is transmitted may be set smaller than the discontinuous reception period T. Accordingly, only the same paging is transmitted within the same discontinuous reception period, and the LC-MTC UE never receives more pagings within the same discontinuous reception period. Accordingly, the paging process in the LC-MTC UE can be simplified.

Since the LC-MTC UE can receive the pagings repeatedly transmitted, using the method disclosed in the third embodiment, it can receive the pagings while satisfying the demand for coverage enhancement. Accordingly, a stable communication system can be built.

Furthermore, the subframes for repeated transmission can be replaced with subframes for the conventional paging transmission by repeating the paging transmission across the consecutive radio frames or at predetermined radio frame intervals. Accordingly, the paging transmission can be repeated without influencing the configuration of MBSFN subframes.

Although FIG. 12 illustrates that the subframes for repeated paging transmission are identical to the subframes for initial paging transmission, a case where the subframes for repeated paging transmission are different from the subframes for initial paging transmission will be disclosed. The subframes for repeated paging transmission may be derived from the number of repetitions. Taking FDD as an example, when the number of repetitions is 2, the first repeated transmission is performed by the subframe whose subframe number is 0, and the second repeated transmission is performed by the subframe whose subframe number is 4.

In an alternative example, a subframe for the n-th repeated transmission (n is a natural number) may have a subframe number associated with a value obtained from "n mod 4".

Taking FDD as an example, the subframe may be: a subframe whose subframe number is 0 when the value obtained from "n mod 4" is 0; a subframe whose subframe number is 4 when the value obtained from "n mod 4" is 1; a subframe whose subframe number is 5 when the value obtained from "n mod 4" is 2; or a subframe whose subframe number is 9 when the value obtained from "n mod 4" is 3.

Here, "n mod 4" indicates a remainder left when "n" is divided by 4 that is the number of subframes for repeated pagings. The number of subframes for repeated pagings may be not limited to 4 but is defined as 1 at minimum and 10 at maximum.

As such, setting the subframe for repeated paging transmission to the subframe whose subframe number is associated with the value obtained from "n mod 4" enables the subframe for repeated paging transmission to be dispersed into subframes and be more flexibly scheduled. These deriving methods may be statically predetermined, for example, in a standard.

The subframe number associated with the value obtained from "n mod 4" may be a subframe number with which the conventional paging transmission is possible. Accordingly, since the subframes for repeated paging transmission can be replaced with the subframes for the conventional paging transmission, the paging transmission can be repeated without influencing the configuration of the MBSFN subframes.

First Modification of Third Embodiment

With the method disclosed in the third embodiment, the paging transmission is repeated across radio frames according to the number of paging repetitions. Consequently, an amount of delay until the LC-MTC UE receives the pagings increases. Accordingly, a delay in receiving, for example, the incoming call information, SI modification, an earthquake and tsunami warning system (ETWS) indication, a commercial mobile alert system (CMAS) indication that are included in the pagings, and a control delay occur.

The first modification will disclose a method for reducing this control delay. The paging transmission is repeated across the consecutive subframes from a subframe for initial paging transmission. The initial paging may be transmitted across the radio frames and the subframes that are derived by the conventional method for deriving the PFs and the POs, similarly as the method disclosed in the third embodiment.

Accordingly, the LC-MTC UE can receive the pagings including the repetitions with a smaller amount of delay.

Figure 13:
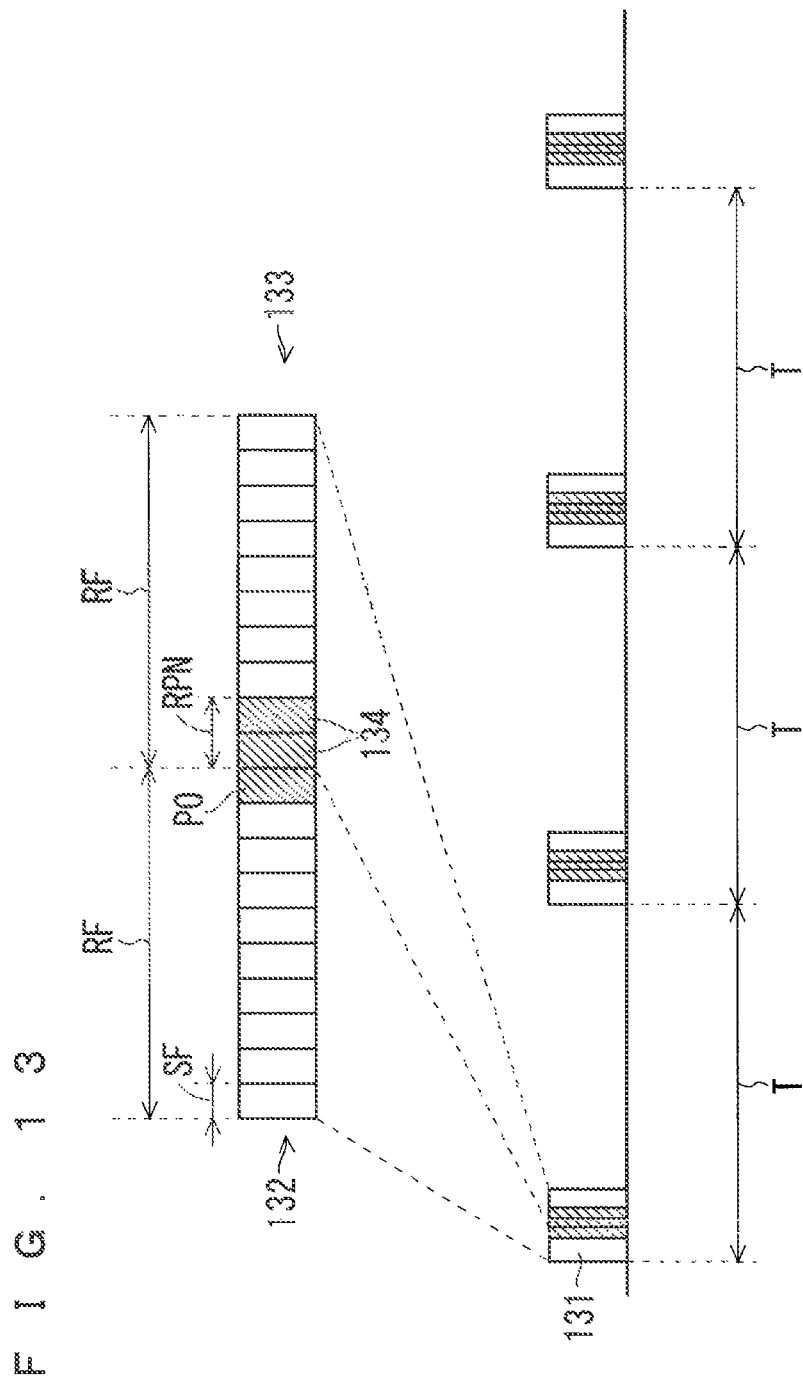
FIG. 13 illustrates an example method for repeated paging transmission according to a first modification of the third embodiment.

FIG. 13 is a conceptual diagram illustrating an example method for repeated paging transmission according to the first modification of the third embodiment. In FIG. 13, a reference numeral "131" denotes a PF that is a radio frame RF for initial paging transmission. Furthermore, a reference numeral "132" denotes a structure of subframes SF in the PF that is the radio frame RF for initial paging transmission. The first diagonally-hatched subframe SF is a PO that is the subframe SF for initial paging transmission. The PO that is the subframe SF for initial paging transmission has the subframe number "9".

In FIG. 13, a reference numeral "133" denotes the radio frames RF for repeated paging transmission. Furthermore, a reference numeral "134" denotes a subframe SF for repeated paging transmission. The pagings for repeated transmission as many as the number of repetitions (i.e., repetition number abbreviated as RPN) are consecutively transmitted from the PO that is the subframe SF for initial paging transmission. The repetition number (RPN) is "2" herein.

The subframes SF for repeated paging transmission may extend over radio frames RF. Among subframes SF of a radio frame RF that is next to the radio frame RF131 for initial paging transmission, the repeated paging transmission is performed on subframes SF whose subframe numbers are 0 and 1. The PFs/POs for initial paging transmission, and the radio frames RF and the subframes SF for repeated paging transmission are repeatedly transmitted at the discontinuous reception period T.

Although the repeated paging transmission is performed on the consecutive subframes from the initial transmission in the method described above, the repeated paging transmission may be performed at predetermined subframe intervals from the initial transmission as an alternative method.

For example, when the number of paging repetitions is 2, the predetermined subframe intervals are 3, and for initial paging transmission, the radio frame number of the radio frame is 25 and the subframe number of the subframe is 9, the first repetition is transmitted by the subframe whose subframe number is 2 in the radio frame whose radio frame number is 26. The second repetition is transmitted by the subframe whose subframe number is 5 in the radio frame whose radio frame number is 26. When the predetermined subframe intervals are 1, the subframes may be consecutive.

Accordingly, even in the paging repetitions, the resources can be flexibly scheduled.

The predetermined radio frame intervals may be statically predetermined, for example, in a standard. Furthermore, the intervals may be predetermined for each cell or for each of the LC-MTC UEs. The method for recognizing the number of paging repetitions that is disclosed in the third embodiment may be applied to a method for recognizing the predetermined radio frame intervals by the LC-MTC UE. Accordingly, the LC-MTC UE can recognize the predetermined radio frame intervals and receive the pagings for initial transmission and repeated transmission.

Furthermore, the subframes for repeated paging transmission may be limited to the subframes for the conventional paging transmission as an alternative method. Examples of the subframes for FDD include subframes whose subframe numbers are 0, 4, 5, and 9.

For example, when the number of paging repetitions is 2, the predetermined subframe intervals are 1, and for initial paging transmission, the radio frame number of the radio frame is 25 and the subframe number of the subframe is 9, the first repetition is transmitted by the subframe whose subframe number is 0 in the radio frame whose radio frame number is 26. The second repetition is transmitted by the subframe whose subframe number is 4 in the radio frame whose radio frame number is 26.

Accordingly, since the subframes for paging repetitions can be replaced with the subframes for the conventional paging transmission, the paging transmission can be repeated without influencing the configuration of the MBSFN subframes.

Since the LC-MTC UE can receive the pagings repeatedly transmitted, using the method disclosed in the first modification, it can receive the pagings while satisfying the demand for coverage enhancement. Accordingly, a stable communication system can be built.

Furthermore, the LC-MTC UE can receive the pagings including the repetitions with a smaller amount of delay than that by the method disclosed in the third embodiment. Accordingly, a control delay for notifying the pagings can be reduced. Particularly, the method herein is effective at notifying the urgent ETWS indication.

Second Modification of Third Embodiment

When the MBSFN subframes are configured in a cell, a new problem arises. Since the MBSFN subframes cannot receive and transmit the pagings, the POs on which the pagings have been conventionally transmitted are restricted to subframes in which MBSFN subframes cannot be configured.

Under a circumstance in which subframes capable of configuring the POs are restricted, the subframes for repeated transmission sometimes collide with the MBSFN subframes when the paging repetitions as disclosed in the first modification of the third embodiment are performed. When the subframes for repeated transmission collide with the MBSFN subframes, pagings cannot be transmitted on the MBSFN subframes. Thus, the LC-MTC UEs have a problem with incapability of receiving the pagings.

The second modification will disclose a method for solving this problem. Transmission of the pagings on the MBSFN subframes is enabled. The downlink control information (DCI) for paging is transmitted on the MBSFN subframes to enable the paging transmission. Hereinafter, the downlink control information for paging may be referred to as the paging downlink control information.

The paging downlink control information is mapped to an enhanced physical downlink control channel (EPDCCH) or a PDCCH. The EPDCCH or the PDCCH to which the paging downlink control information has been mapped is transmitted on the MBSFN subframes. The PDSCH to which the paging is mapped is transmitted on a subframe identical to that on which the paging downlink control information is transmitted.

The paging downlink control information may contain subframe information to which the paging-mapped PDSCH is mapped as an alternative method. Accordingly, the paging-mapped PDSCH and the paging downlink control information can be transmitted on different subframes.

The paging downlink control information is masked by a paging indication-radio network temporary identifier (PI-RNTI). Through detection of the PI-RNTI, the LC-MTC UE can recognize the existence of the paging and receive the paging downlink control information. The LC-MTC UE can receive scheduling information on the paging-mapped PDSCH upon receipt of the paging downlink control information. The LC-MTC UE receives the PDSCH according to the scheduling information on the paging-mapped PDSCH, and then receives the paging.

The pagings not only for repeated transmission but also for initial transmission may be transmitted on the MBSFN subframes. Here, the configuration of the subframes (POs) on which the pagings are transmitted may be provided in addition to the conventional subframe numbers. Accordingly, since the subframes capable of configuring the POs increase, it is possible to support a case where Ns that is the number of MTC UEs is increased to match the tremendous number of MTCs.

Not the paging downlink control information but the paging-mapped PDSCH may be transmitted on the MBSFN subframes as an alternative method. Assuming that only the repeated transmission is performed on the MBSFN subframes, the downlink control information for paging repetitions may be identical to that for initial transmission. The scheduling information on the PDSCH to which the initial transmission is mapped may be identical to that of the PDSCH to which the repeated transmission is mapped. The LC-MTC UE can receive the PDSCH to which the repeated transmission is mapped by obtaining the scheduling information on the PDSCH to which the initial transmission is mapped.

Alternatively, the downlink control information for initial paging transmission may contain the downlink control information for paging repetitions. The downlink control information for initial paging transmission contains not only the scheduling information on the PDSCH to which the initial transmission is mapped but also the scheduling information on the PDSCH to which the repeated transmission is mapped. Upon receipt of the downlink control information for initial paging transmission, the LC-MTC UE can obtain the scheduling information on the PDSCH to which the repeated transmission is mapped, and receive the PDSCH.

Alternatively, the downlink control information for initial paging transmission may contain subframe information for repeated paging transmission. Examples of the subframe information include information indicating subframe numbers and information indicating radio frame numbers. The scheduling information on the PDSCH to which the initial paging transmission is mapped may be identical to that of the PDSCH to which the repeated paging transmission is mapped.

Upon obtainment of the scheduling information on the PDSCH to which the initial transmission is mapped, the LC-MTC UE can recognize the subframes for repeated transmission, and receive, on the subframes, the PDSCH to which the repeated transmission is mapped.

The MBSFN subframes for paging transmission may be limited to the subframes on which the PMCH is not transmitted. Accordingly, even when the MBSFN subframes include subframes to which the PMCH that is a physical channel for MBMS is mapped, the pagings can be transmitted thereon. Here, the method for designating, by an eNB, a subframe for repeated transmission may be used, for example. A subframe to which the PMCH is not mapped from among the MBSFN subframes may be designated as the subframe for repeated transmission.

According to the method disclosed in the second modification, the pagings can be transmitted on the MBSFN subframes. Thus, it is possible to solve a problem with the collision of the subframes for repeated paging transmission with the MBSFN subframes and a problem of the LC-MTC UE with incapability of receiving the pagings. Accordingly, since the LC-MTC UE can receive the pagings repeatedly transmitted, it can receive the pagings while satisfying the demand for coverage enhancement. Accordingly, a stable communication system can be built.

Furthermore, the LC-MTC UE can receive the pagings including the repetitions with a smaller amount of delay than that by the method disclosed in the third embodiment. Accordingly, a control delay for notifying the pagings can be reduced. Particularly, the method is effective at notifying the urgent ETWS indication.

The method disclosed in the second modification may be applied to subframes for transmitting the system information (SI) to be disclosed in the fifth embodiment later. The pagings may be replaced with the system information. The DCI for SI may be masked by a system information-radio network temporary identifier (SI-RNTI). Accordingly, the SI can be transmitted on the MBSFN subframes. The LC-MTC UE can receive the SI. The same advantages as described above can be produced.

Furthermore, the method disclosed in the second modification may be applied to subframes for transmitting a random access response (RAR). The pagings may be replaced with the RAR. The DCI for RAR may be masked by a random access-radio network temporary identifier (RA-RNTI). Accordingly, the RAR can be transmitted on the MBSFN subframes. The LC-MTC UE can receive the RAR. The same advantages as described above can be produced.

It is expected that the number of the LC-MTC UEs will be tremendous. Thus, the number of subframes on which the pagings are transmitted may be increased. Although the conventional number of such subframes is four as described above, it may be increased to 5 or more. Furthermore, the subframes on which the POs are generated may be provided across radio frames. The method to be disclosed later may be applied thereto.

Another method for solving the problems disclosed in the second modification will be hereinafter disclosed. The subframes for repeated paging transmission are determined from among the subframes excluding the MBSFN subframes.

Figure 14:
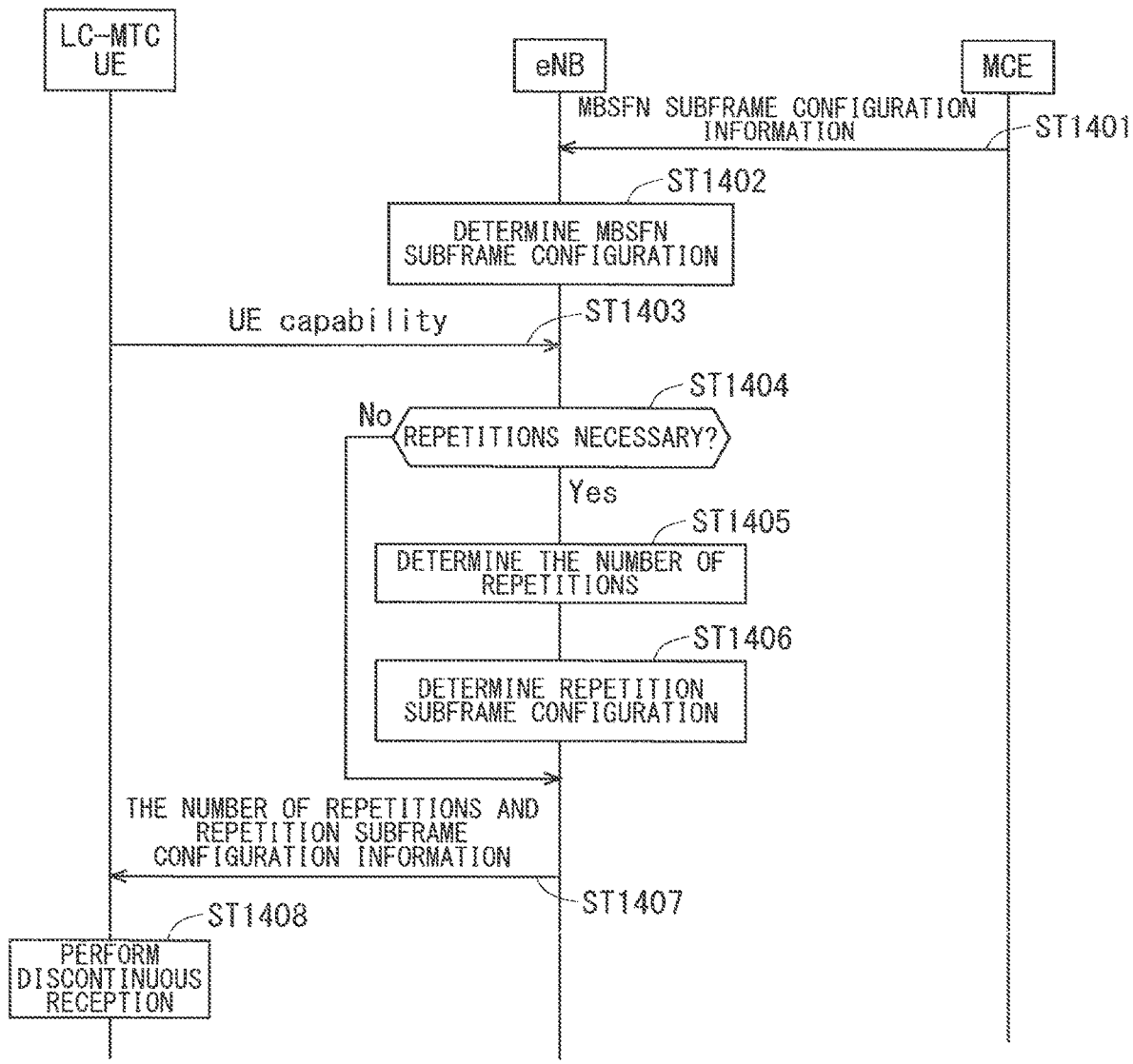
FIG. 14 is an example sequence diagram when a subframe for repeated paging transmission is determined from among subframes excluding MBSFN subframes according to a second modification of the third embodiment.

FIG. 14 is an example sequence diagram when the subframes for repeated paging transmission according to the second modification of the third embodiment are determined from among the subframes excluding the MBSFN subframes.

In Step ST1401, an MCE notifies an eNB of MBSFN subframe configuration information.

In Step ST1402, the eNB determines an MBSFN subframe configuration. Here, the eNB may determine the MBSFN subframe configuration also in consideration of the MBSFN subframes necessary to be used except for MBMS for each cell. Accordingly, the MBSFN subframe configuration for the cell is determined.

In Step ST1403, the LC-MTC UE notifies the eNB of UE capability information. The UE capability information is notified through dedicated RRC signaling. The eNB that has received the UE capability information recognizes that the UE is an LC-MTC UE.

In Step ST1404, the eNB determines whether repetitions are necessary on the basis of a downlink reception quality report from the LC-MTC UE and an uplink reception quality in the LC-MTC UE. Whether the repetitions are necessary may be determined by setting a predetermined threshold and using the threshold. When it is determined that the repetitions are necessary, the processes proceed to Step ST1405. When it is determined that the repetitions are unnecessary, the processes proceed to Step ST1407.

In Step ST1405, the eNB determines the number of repetitions. Here, the number of repetitions also may be determined by setting a threshold according to the number of repetitions and using the threshold. A combined process of Step ST1404 and Step ST1405 may be performed.

In Step ST1406, the eNB determines a repetition subframe configuration. The subframes corresponding to the number of repetitions may be selected from among subframes excluding the subframes configured as the MBSFN subframes.

In Step ST1407, the eNB notifies the LC-MTC UE of the number of repetitions and the repetition subframe configuration information.

The LC-MTC UE that has received the number of repetitions and the repetition subframe configuration information performs the discontinuous reception in Step ST1408. The LC-MTC UE receives the pagings as many as the number of repetitions. The LC-MTC UE determines that the initial paging transmission is performed on a PF/PO and that the repetitions are performed on the repetition subframes as many as the number of repetitions notified in Step ST1407.

On which one of the repetition subframes the paging repetition is performed may be predetermined, for example, in a standard. It may be determined, for example, that the repeated transmission is performed in ascending order of the subframe numbers in the repetition subframes from the subframe (PO) for initial paging transmission. Alternatively, the eNB may associate repetition numbers with the repetition subframes having the repetition numbers, and notify the UE of the association in Step ST1407. When the number of the repetition subframes is small and less than the number of repetitions, repetition subframes in the next radio frame may be used.

Accordingly, the UE can receive the paging repetitions. Furthermore, a collision between the repeated paging transmission and the MBSFN subframes can be avoided. Furthermore, the subframes that are not actually used as the MBSFN subframes can be used for repeated transmission. Thus, the earlier paging transmission can be performed, the UE can receive the pagings earlier, and a delay in the paging process can be reduced.

After determination on the repetition subframe configuration, when the configuration of the MBSFN subframes is changed, the repetition subframe configuration may be re-determined. The re-determined repetition subframe configuration may be notified to the LC-MTC UE. Accordingly, flexible operations of MBMS and the other uses using MBSFN subframes become possible.

Furthermore, when the eNB configures the MBSFN subframes for each cell for other uses except for the MBMS, the MBSFN subframes may be configured for each cell for such use in consideration of the number of repetitions necessary for the LC-MTC UE. The subframes as many as the number of repetitions necessary for the LC-MTC UE may be reserved, and the other subframes may be determined as the MBSFN subframes. Since the repeated transmission to the LC-MTC UE can be prioritized, a delay in the paging process can be further reduced.

Third Modification of Third Embodiment

Conventionally, the paging has been received in the following manner. A PDCCH of a subframe (PO) in a radio frame (PF) derived using an identifier of a UE is received, and a PI-RNTI masked by the paging downlink control information is detected to receive the paging downlink control information. The LC-MTC UE receives a PDSCH to which the paging is mapped, according to the received paging downlink control information.

It is necessary to perform on the LC-MTC UEs supporting the coverage enhancement not only the repeated paging transmission but also the repeated transmission of the PDCCH to which the paging downlink control information is mapped. The repeated transmission improves the reception quality of the PDCCH of the LC-MTC UE in an extended coverage area and enable the LC-MTC UE to receive the paging downlink control information.

The methods disclosed from the third embodiment to the second modification thereof may be applied to a method for repeatedly transmitting the PDCCH to which the paging downlink control information is mapped and to a method for receiving the PDCCH by the LC-MTC UE.

The following two examples (1) and (2) will be disclosed as example relationships between the method for repeatedly transmitting the PDCCH to which the paging downlink control information is mapped and the repeated paging transmission method.

(1) After the initial transmission and the repeated transmission of the PDCCH, the pagings for initial transmission and repeated transmission are transmitted. The initial paging transmission is performed on the subframes identical to those on which the last repetition of transmission of the PDCCH is performed or on subframes after k subframes (k is an integer larger than or equal to 1).

(2) The initial transmission of the PDCCH and the initial paging transmission are performed on the same subframe, and the repeated transmissions of the PDCCH and repeated paging transmissions are performed on the respective same subframes.

In the method (1) above, the LC-MTC UE can start receiving the pagings after being able to receive the PDCCH to which the paging downlink control information is mapped including the repetitions. Thus, the LC-MTC UE can obtain the paging downlink control information, for example, scheduling information on a resource to which the paging is mapped, etc. by receiving the PDCCH including the repetitions. The LC-MTC UE can receive the PDSCH to which the paging is mapped, using the obtained information.

When compared with the method (2) above, the method (1) above does not require storage of information on the subframes on which the initial and repeated transmissions of the PDCCH are performed. Since there is no need to prepare a memory, a buffer, etc. for storing the information, the configuration of the LC-MTC UE can be simplified.

According to the method (2) above, the PDCCH to which the paging downlink control information is mapped and the paging are transmitted on the same subframe. Here, the LC-MTC UE may store the receiving information on subframes for the total number of the subframes for initial transmission and the maximum number of repetitions. When the LC-MTC UE can receive the PDCCH to which the paging downlink control information is mapped, the paging transmitted on the same subframe can be received using the paging downlink control information. The LC-MTC UE may have a memory, a buffer, etc. for storage. Since the LC-MTC UE can receive the pagings earlier than by the method (1) above, a control delay time can be shortened.

The LC-MTC UEs that support the reduced bandwidth cannot receive the conventional PDCCH transmitted across the system bandwidth. Thus, the LC-MTC UEs cannot receive the pagings in the conventional paging transmitting and receiving methods.

The third modification will disclose a method for solving this problem. A paging of the LC-MTC UE is mapped to the PDSCH. The paging downlink control information of the LC-MTC UE, for example, the scheduling information on the PDSCH to which the paging is mapped, etc. is mapped to an EPDCCH. The EPDCCH is mapped to a predetermined number of resource blocks (RBs) in a PDSCH region within one subframe. Since the resources to which the paging downlink control information is mapped can be set to narrow bandwidths, the LC-MTC UEs that support the reduced bandwidth can receive the paging.

An RNTI for masking the paging downlink control information on the EPDCCH may be a PI-RNTI. Alternatively, the RNTI may be newly provided for the LC-MTC UEs. The RNTI may be, for example, an MTC-PI-RNTI. Distinction from the conventional UEs is enabled by newly providing the RNTI for the LC-MTC UEs. With use of the MTC-PI-RNTI in detecting control information, the control information can be identified as that for the LC-MTC UEs, and a malfunction can be reduced.

The paging downlink control information for the conventional UEs (legacy UEs) may be transmitted using the PDCCH, and the paging downlink control information for the LC-MTC UEs may be transmitted using the EPDCCH. Here, the paging downlink control information to be mapped to the EPDCCH may be masked by the MTC-PI-RNTI. The LC-MTC UE receives the EPDCCH on subframes of the PFs/POs derived for paging. Upon detection of the paging downlink control information masked by the MTC-PI-RNTI, the LC-MTC UE receives the PDSCH according to the paging downlink control information to receive the paging.

When the EPDCCH is used for transmitting the paging downlink control information as described above, an additional problem occurs. Since the EPDCCH is transmitted on predetermined resource blocks (RBs), the LC-MTC UE does not know on which resource the EPDCCH is transmitted on the subframes of the PFs/POs derived for paging. Thus, the LC-MTC UE cannot receive the EPDCCH.

Non-Patent Document 12 discloses a method for solving this problem. Specifically, Non-Patent Document 12 discloses a method for scheduling an EPDCCH for paging. The method is a method for mapping, into six resource blocks at the center of the carrier, an EPDCCH for common message that includes SIBs, pagings, and RAR, or a method for including, in an MIB, information indicating whether the resource blocks of the EPDCCH are allocated at predetermined positions or frequency hopping is performed.

However, when the resources to which the EPDCCH for paging is mapped are fixed to the six resource blocks at the center of the carrier, a problem with degradation in reception quality occurs due to the susceptibility to the frequency fading. Furthermore, when the frequency hopping is performed, how to notify a frequency hopping pattern comes into question. When the information is included in the MIB and notified, an amount of information in the MIB increases. Furthermore, since the MIB is repeatedly notified, the amount of resources required for the notification will become excessive. Thus, a problem with decrease in efficiency of resource usage occurs.

The third modification will disclose a method for solving this problem. The resources on which the EPDCCH is transmitted are predetermined, for example, in a standard. Here, the paging downlink control information is mapped to the EPDCCH.

The following seven examples (1) to (7) are disclosed as examples of information on the resources on which the EPDCCH is transmitted.
(1) The number of resource blocks (RBs)
(2) Allocation of the RBs; the first RB number may be used.
(3) A configuration of a reference signal (RS); a sequence of the RSs or the sequence number thereof may be used.
(4) The number of repetitions
(5) The frequency hopping mode
(6) A frequency hopping pattern
(7) A combination of (1) to (6) above The information on the resources on which the EPDCCH is transmitted may be any as long as the LC-MTC UE can identify a resource to which the EPDCCH is mapped. The information may be scheduling information on the EPDCCH. As such, predetermining the information, for example, in a standard can prevent increase in the amount of information in the MIB and decrease in the efficiency of resource usage.

The information on the resources of the EPDCCH to which the paging downlink control information is mapped may have multiple options. Information groups on the resources on which the EPDCCH is transmitted may have multiple options. The information on the resources of the EPDCCH to which the paging downlink control information is mapped or the information groups on the resources on which the EPDCCH is transmitted are made to have multiple options, so that cells can change the resources on which the EPDCCH is transmitted, depending on a radio propagation state. Here, the paging downlink control information is mapped to the EPDCCH.

Accordingly, a communication system resilient to change in the radio propagation state can be built. Furthermore, when the repetition of reception of the EPDCCH to which a paging control signal is mapped is performed, the number of the repetitions can be reduced. Thus, the power consumption of the LC-MTC UE can be reduced.

However, mere provision of the groups does not allow the LC-MTC UE to recognize which one of the groups is to be used. Here, the resources on which the EPDCCH for all of the groups is transmitted may be received and detected with the MTC-PI-RNTI, according to the information on all of the groups. However, reception of the EPDCCHs for all of the groups complicates the operations of the LC-MTC UE and increases the power consumption.

In order to solve such a problem, an indicator associated with the information on the resource of each of the EPDCCHs may be provided. An indicator associated with each of the information groups on the resources on which the EPDCCH is transmitted may be provided. The indicators and information on the resources of the EPDCCH for each of the groups are predetermined in a table, for example, in a standard. The LC-MTC UEs stores the table.

A cell may use the indicators to notify the LC-MTC UE of which information on the resource of the EPDCCH is valid. The cell notifies the LC-MTC UE of the indicators.

The following three examples (1) to (3) are disclosed as specific examples of methods for notifying the indicators.
(1) The indicators are included in the MIB and broadcasted.
(2) The indicators are included in the SIB including SI for the LC-MTC UE and notified.

The LC-MTC UE can recognize to which resource the EPDCCH to which the valid paging downlink control information is mapped is allocated, by receiving the MIB or the SIB for the LC-MTC UE to obtain the indicators. The information included in the MIB or the SIB for the LC-MTC UE may be only the indicators, thus enabling notification with a smaller amount of information. Accordingly, a communication system that can prevent decrease in the efficiency of resource usage to a minimum and that is resilient to change in the radio propagation state can be built.

(3) The indicators are notified by RRC signaling; here, the indicators may be notified in the initial access. The method may be applied when the indicators are provided for each cell or each of the LC-MTC UEs. A larger amount of parameters can be notified than that when the indicators are notified by the MIB or the SI. Furthermore, the amount of information to be notified by the MIB or the SI can be reduced. Using the same indicators within the same TAC may be predetermined, for example, in a standard.

The third modification will disclose another method for solving the problems. A method for deriving information on the resources on which the EPDCCH is transmitted is predetermined. Here, the paging downlink control information is mapped to the EPDCCH. The deriving method may be predetermined, for example, in a standard. A derivation function may be provided. The derivation function may be a function using at least one of a PF, a PO, and an UE identifier (UE-ID) as an input parameter. The output parameter may be information on the resources on which the EPDCCH is transmitted. Alternatively, the output parameter may be the indicators. The indicators and information on the resources on which the EPDCCH is transmitted may be predetermined in a table, for example, in a standard. The LC-MTC UE stores the table.

Accordingly, since there is no need to include the indicators in the MIB or the SIB for the LC-MTC UE, it is possible to prevent decrease in the efficiency of resource usage. Furthermore, through determination of at least one of a PF and a PO as the input parameter of the derivation function, a different resource is allocated when at least one of the PF and the PO is different. Accordingly, concentration on a particular resource can be prevented. Furthermore, since a different resource is allocated to each UE using the UE-ID as the input parameter of the derivation function, the concentration on a particular resource can be prevented.

If the concentration on a particular resource occurs, it is possible to prevent any one of the paging downlink control information items from being mapped to the EPDCCH. The paging downlink control information item may be mapped to the EPDCCH for the next PF/PO. However, a problem with a delay in notifying the paging occurs. Such a problem can be solved by preventing the concentration on a particular resource as the method above.

With the method according to the third modification, the LC-MTC UE can receive the EPDCCH to which the paging downlink control information is mapped and detect the presence or absence of the paging. If the paging exists, the paging can be received.

Although mapping the paging downlink control information for the LC-MTC UE to the EPDCCH is disclosed, the paging downlink control information for the LC-MTC UE may be mapped not only to the EPDCCH but to a physical downlink control channel using a narrow-bandwidth resource. The physical downlink control channel may be any physical downlink control channel configured within a bandwidth at which the LC-MTC UEs that support the reduced bandwidth are capable of reception.

The relationship between the method for repeatedly transmitting the PDCCH to which the paging downlink control information is mapped and the repeated paging transmission method as described above may be applied to a relationship between the method for repeatedly transmitting the EPDCCH to which the paging downlink control information is mapped and the repeated paging transmission method. The LC-MTC UEs that support the coverage enhancement can receive the paging downlink control information, and the pagings using the paging downlink control information.

Fourth Embodiment

The subframes for initial paging transmission are sometimes identical to the subframes for repeated paging transmission.

Figure 15:
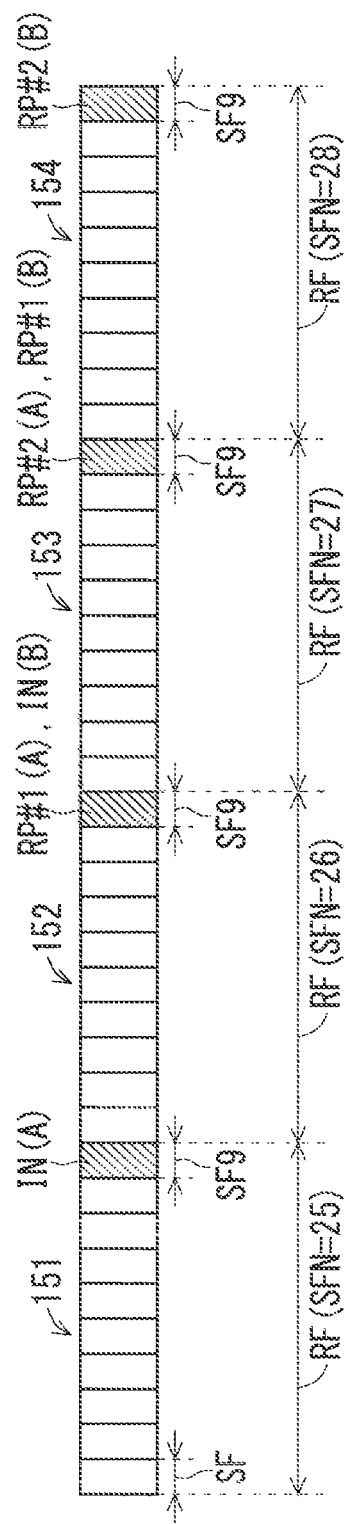
FIG. 15 illustrates an example frame configuration when subframes for initial transmission of an EPDCCH are identical to subframes for repeated transmission thereof.

FIG. 15 is a conceptual diagram when the subframes for initial paging transmission are identical to the subframes for repeated paging transmission. An example case where the repeated transmission is performed on the same subframes in consecutive radio frames as disclosed in the first modification of the third embodiment will be described.

Assume that a SFN of a radio frame is 25 (SFN=25), the subframe number of the subframe is 9 for initial paging transmission by an LC-MTC UE A, and the number of repetitions is 2. For example, an initial transmission (IN(A)) is performed on a radio frame (RF) 151 whose SFN is 25. The repeated transmission is performed on subframes whose subframe number is the same as that of the initial transmission, specifically, the subframes (SF9) whose subframe number is 9, in two radio frames 152 and 153 that are consecutive from the radio frame 151 for initial transmission (RP #1(A) and RP #2(A)).

The PFs/POs for paging transmission are determined by an identifier of an LC-MTC UE. Thus, different UEs may have different PFs/POs. Assume that a SFN of a radio frame is 26 (SFN=26), the subframe number of the subframe is 9 for initial paging transmission by an LC-MTC UE B, and the number of repetitions is 2.

For example, an initial transmission (IN(B)) is performed on the radio frame (RF) 152 whose SFN is 26. The repeated transmission is performed on subframes whose subframe number is the same as that of the initial transmission, specifically, the subframes (SF9) whose subframe number is 9, in two radio frames 153 and 154 that are consecutive from the radio frame 152 for initial transmission (RP #1(B) and RP #2(B)).

Here, the initial transmission of the LC-MTC UE B and the repeated transmission of the LC-MTC UE A are performed on the radio frame 152 whose SFN is 26 and on the subframe whose subframe number is 9. It is unclear how to multiplex the paging for repeated transmission of the LC-MTC UE A and the paging for initial transmission of the LC-MTC UE B.

The fourth embodiment will disclose a method for solving such a problem. A paging message may be created by multiplexing the paging for initial transmission and the paging for repeated transmission in the same paging message, and mapped to the PDSCH. The mapping may be performed per repetition number.

The LC-MTC UE detects the EPDCCH to which the paging DCI is mapped, using the PI-RNTI or the MTC-PI-RNTI to receive the paging DCI. The LC-MTC UE receives the PDSCH according to the received paging DCI to obtain the paging message created by multiplexing the paging for initial transmission and the paging for repeated transmission.

The LC-MTC UE to which the paging for initial transmission is transmitted on the subframe receives the paging for initial transmission in the paging message. The LC-MTC UE to which the pagings for repeated transmission are transmitted on the subframes receives the pagings for repeated transmission corresponding to the repetition number in the paging message.

FIG. 16 illustrates an example paging message according to the conventional technique. The paging message includes paging record list information for incoming call (pagingRecordList), SI modification information (systemInfoModification), ETWS information (etws-Indication), CMAS information (cmas-Indication), and EAB parameter modification information (eab-ParamModification).

The paging record list information for incoming call (pagingRecordList) includes one or more paging record information items (pagingRecord). The paging record information items include a UE identifier indicating an UE to be called by an incoming call. The paging record information items may include core network domain (CN domain) information. Examples of the UE identifier include a serving-temporary mobile subscriber identity (s-TMSI) and an international mobile subscriber identity (IMSI).

FIG. 17 illustrates an example paging message according to the fourth embodiment. The paging message includes pagings for initial transmission and for repeated transmission. A portion enclosed by a dashed rectangle in FIG. 17 is a paging for repeated transmission. The paging is a paging whose repetition number is 1. The paging for repeated transmission may be limited to the paging record list information for incoming call (pagingRecordList repetition #1).

The paging record list information for incoming call that is intended for repeated transmission includes one or more paging record information items for repeated transmission. The paging record information items include a UE identifier indicating an UE to be called by an incoming call. The paging record information items may include the CN domain information. Examples of the UE identifier include a s-TMSI and an IMSI.

The paging for repeated transmission may exclude information to be transmitted not separately for each of the LC-MTC UEs. Examples of such information include the SI modification information, the ETWS information, and the CMAS information. The EAB parameter modification information may be applied not to each of the UEs but all the LC-MTC UEs. If the EAB parameter modification information is applied to all the LC-MTC UEs, the paging for repeated transmission may exclude the information. The paging for repeated transmission may include the EAB parameter modification information for each of the UEs.

Accordingly, even when the subframes for initial paging transmission are identical to the subframes for repeated paging transmission, the cell can transmit both the initial transmission and the repeated transmission. Thus, the LC-MTC UE can receive the initial transmission or the repeated transmission as appropriate.

Furthermore, the DCI for initial paging transmission can be identical to the DCI for repeated paging transmission. Thus, the resource of the EPDCCH to which the DCI for initial transmission is mapped may be identical to that of the EPDCCH to which the DCI for repeated transmission is mapped.

Since the LC-MTC UE can receive the paging upon receipt of the paging PDSCH according to the DCI for paging transmission to be mapped to the EPDCCH, it can obtain the initial transmission or the repeated transmission as appropriate.

In the previous description, the paging for initial transmission and the paging for repeated transmission are multiplexed into a paging message. The number of pagings for repeated transmission may be one or more. The pagings for repeated transmission may be multiplexed into a paging message. The pagings may be provided per repetition number. Accordingly, multiple repetition numbers can be supported.

Transport channels may be multiplexed as an alternative method. A cell may multiplex a PCH for initial transmission and a PCH for repeated transmission, map a resulting PCH to the same PDSCH, and notify the PCH. The cell may code the PCH for initial transmission and the PCH for repeated transmission together, and map the resultant to a PDSCH. The LC-MTC UE can receive the initial transmission or the repeated transmission by receiving the multiplexed PCH in the PDSCH.

First Modification of Fourth Embodiment

A first modification will disclose another method for solving the problems disclosed in the fourth embodiment. The method disclosed in the fourth embodiment causes a problem. An example case where the initial transmission and the repeated transmission are performed when the SFN is 26 and the subframe number is 9 as according to the previous example will be described.

Assume herein that the initial transmission is not actually performed and only the repeated transmission is performed when the SFN is 26 and the subframe number is 9. The LC-MTC UE B to which the initial transmission may be performed receives the EPDCCH through detection with the MTC-PI-RNTI. Then, the LC-MTC UE B receives the PDSCH to which the paging is mapped, according to the paging DCI of the EPDCCH. However, since the initial transmission is not actually performed, the paging mapped to this PDSCH is the one for repeated transmission to the LC-MTC UE A.

Thus, the LC-MTC UE B to which the initial transmission may be performed has to receive the PDSCH to obtain the paging, even when no actual initial transmission is performed. The reception operation is wasteful if no actual initial transmission is performed. In other words, a problem with increase in power consumption of the LC-MTC UE occurs.

The first modification will disclose a method for solving this problem. The RNTI to be used for the EPDCCH for repeated transmission is made different from the RNTI to be used for the EPDCCH for initial transmission. The DCI for repeated transmission and the DCI for initial transmission are masked by the different RNTIs.

In the example paging, the RNTIs may be an MTC-PI-F-RNTI for initial transmission and an MTC-PI-R-RNTI for repeated transmission. The LC-MTC UE may search for the EPDCCH using the MTC-PI-F-RNTI on a subframe for initial transmission, and the EPDCCH using the MTC-PI-R-RNTI on a subframe for repeated transmission to receive the respective paging DCI items.

Accordingly, the LC-MTC UE does not need to receive the PDSCH to which the pagings for the other UEs are mapped to obtain the pagings when no actual transmission is performed. Accordingly, increase in power consumption of the LC-MTC UE can be prevented. The other UEs are UEs excluding UEs to which the pagings are transmitted on the same PFs/POs as those of the own UE (hereinafter may be referred to as "intra paging group UEs").

The RNTIs may be provided as many as the number of the repetitions. When the number of the repetitions is 4, for examples, the RNTIs may be an MTC-PI-F-RNTI for initial transmission, an MTC-PI-R1-RNTI for the first repeated transmission, an MTC-PI-R2-RNTI for the second repeated transmission, an MTC-PI-R3-RNTI for the third repeated transmission, and an MTC-PI-R4-RNTI for the fourth repeated transmission. An upper limit of the number of the repetitions may be set, and the RNTIs may be determined according to the upper limit. These values of the RNTIs may be statically predetermined, for example, in a standard.

The resources of the EPDCCH may be different or identical between the initial transmission and the repeated transmission. Even when the resources of the EPDCCH are identical, the RNTI to be used for the EPDCCH for repeated transmission is made different from the RNTI to be used for the EPDCCH for initial transmission, and the DCI for repeated transmission and the DCI for initial transmission are masked by the different RNTIs.

Accordingly, when the paging DCI for the own LC-MTC UE exists, the LC-MTC UE can receive the DCI. Accordingly, since the LC-MTC UE can receive the PDSCH to which the paging for the own UE is mapped and does not have to receive the PDSCH to which the pagings for the other UEs are mapped, increase in power consumption of the LC-MTC UE can be prevented.

Figure 18:
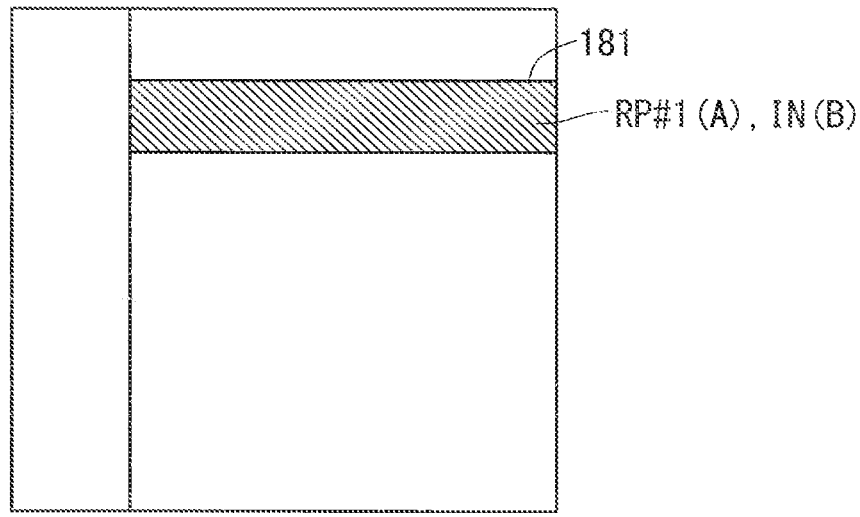
FIG. 18 illustrates an example configuration of a subframe including an initial transmission of an EPDCCH and the repeated transmission according to a first modification of the fourth embodiment.
Figure 19:
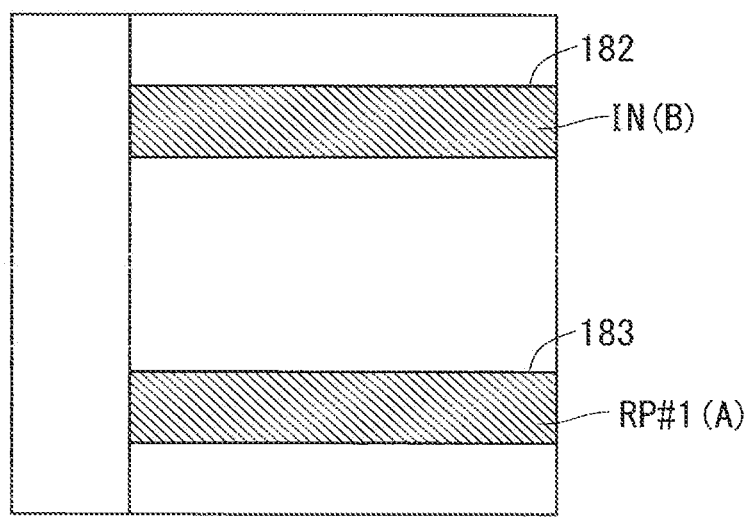
FIG. 19 illustrates an example configuration of a subframe including an initial transmission of an EPDCCH and the repeated transmission according to the first modification of the fourth embodiment.

FIGS. 18 and 19 are conceptual diagrams of subframes each including an initial transmission and the repeated transmission of the EPDCCH according to the first modification of the fourth embodiment. According to the example illustrated in FIG. 15, the subframes are subframes whose SFN is 26 and whose subframe number is 9. In FIGS. 18 and 19, the vertical side represents a frequency, and the horizontal side represents a time. The hatch lines represent the resources of the EPDCCH. FIG. 18 illustrates a case where a resource of the EPDCCH for initial transmission is identical to a resource of the EPDCCH for repeated transmission. FIG. 19 illustrates a case where the resource of the EPDCCH for initial transmission is different from the resource of the EPDCCH for repeated transmission.

In FIG. 18, initial DCI (IN(B)) and repeated DCI (RP #1(A)) are mapped to one EPDCCH resource (hereinafter may be referred to as an "EPDCCH for paging") 181. The DCI for initial transmission and the DCI for repeated transmission are separately masked by different RNTIs. The DCI for initial transmission is masked by the MTC-PI-F-RNTI. Since the repetition number is 1, the DCI for repeated transmission is masked by the MTC-PI-R1-RNTI.

The LC-MTC UE A recognizes that the transmission whose SFN is 26 and whose subframe number is 9 is a transmission with the repetition number 1. Thus, the LC-MTC UE A can detect the resource of the EPDCCH on the subframe with the MTC-PI-R1-RNTI, and receive the DCI for repeated transmission when the DCI for repeated transmission exists.

The LC-MTC UE A receives the PDSCH to which the paging for the own UE is mapped, according to the received DCI. Accordingly, the LC-MTC UE A does not have to receive the PDSCH to which the pagings for the other UEs, for example, the LC-MTC UE B are mapped. Thus, increase in power consumption of the LC-MTC UE can be prevented.

The LC-MTC UE B recognizes that the transmission whose SFN is 26 and whose subframe number is 9 is the initial transmission. Thus, the LC-MTC UE B can detect the resource of the EPDCCH on the subframe with the MTC-PI-F-RNTI, and receive the DCI for repeated transmission when the DCI for repeated transmission exists.

The LC-MTC UE B receives the PDSCH to which the paging for the own UE is mapped, according to the received DCI. Accordingly, the LC-MTC UE B does not have to receive the PDSCH to which the pagings for the other UEs, for example, the LC-MTC UE A are mapped. Thus, increase in power consumption of the LC-MTC UE can be prevented.

In FIG. 19, an EPDCCH resource for initial transmission (hereinafter may be referred to as an "initial paging transmission EPDCCH") 182 is different from an EPDCCH resource for repeated transmission (hereinafter may be referred to as a "repeated paging transmission EPDCCH") 183. The DCI for initial transmission (IN(B)) and the DCI for repeated transmission (RP #1(A)) may be separately masked by different RNTIs. The DCI for initial transmission is masked by the MTC-PI-F-RNTI. Since the repetition number is 1, the DCI for repeated transmission is masked by the MTC-PI-R1-RNTI.

The LC-MTC UE A can detect the resource of the EPDCCH for the repetition number 1 of the own UE on the subframe with the MTC-PI-R1-RNTI, and receive the DCI for repeated transmission when the DCI for repeated transmission exists. The LC-MTC UE A receives the PDSCH to which the paging for the own UE is mapped, according to the received DCI. Accordingly, the LC-MTC UE A does not have to receive the PDSCH to which the pagings for the other UEs, for example, the LC-MTC UE B are mapped. Thus, increase in power consumption of the LC-MTC UE can be prevented.

Thus, the LC-MTC UE B can detect the resource of the EPDCCH for initial transmission of the own UE on the subframe with the MTC-PI-F-RNTI, and receive the DCI for repeated transmission when the DCI for repeated transmission exists. The LC-MTC UE B receives the PDSCH to which the paging for the own UE is mapped according to the received DCI. Accordingly, the LC-MTC UE B does not have to receive the PDSCH to which the pagings for the other UEs, for example, the LC-MTC UE A are mapped. Thus, increase in power consumption of the LC-MTC UE can be prevented.

According to the method disclosed in the first modification, when the subframe for initial paging transmission is identical to the subframe for repeated transmission and only the transmissions for the own UE are performed, the LC-MTC UE receives the PDSCH to which the paging for the own UE is mapped. Thus, increase in power consumption of the LC-MTC UE can be prevented.

When the resources to which the EPDCCH is mapped for the initial transmission and the respective repetition numbers are clearly different from one another within a subframe, the number of the RNTIs may be one. Specifically, the RNTI may be an MTC-PI-RNTI. The LC-MTC UE may detect a predetermined resource of an EPDCCH for initial transmission with the MTC-PI-RNTI, and detect a predetermined resource of an EPDCCH for each of the repetition numbers with the MTC-PI-RNTI.

Since the resources to which the EPDCCH is mapped for the initial transmission and the respective repetition numbers are different from one another, the LC-MTC UE can receive the EPDCCH depending on reception of the initial transmission or the repeated transmission. Thus, only when the transmission for the own UE is performed, the UE can receive the PDSCH to which the paging for the own UE is mapped. Accordingly, increase in power consumption of the LC-MTC UE can be prevented.

The methods disclosed in the fourth embodiment and the first modification thereof may be applied to a case where repetitions are performed and an RNTI is used in common among the LC-MTC UEs. For example, the methods may be applied to notification of the SI, RAR, etc. Here, the same advantages as those according to the fourth embodiment and the first modification thereof may be produced.

The first modification will disclose another method for solving the problems. Although the RNTIs are provided as many as the number of the initial transmission and the number of repetitions in the disclosed method above, the RNTIs may be provided separately for the LC-MTC UEs as an alternative method. The DCI for initial transmission and the DCI for repeated transmission may be masked by an RNTI provided for each of the LC-MTC UEs. The LC-MTC UE may search for both the EPDCCH to which the DCI for initial transmission is mapped and the EPDCCH to which the DCI for repeated transmission is mapped, using the RNTI of the own UE, and receive the DCIs. Accordingly, the LC-MTC UE can obtain the pagings for the own UE by receiving the PDSCH according to the received DCIs.

In the pagings, there may be UEs having the same PFs/POs as those of the own UE. The UEs are the intra paging group UEs. Thus, the RNTI may be provided not for each of the LC-MTC UEs but for each paging group. The paging DCI for the paging group having the same PFs/POs may be masked by the RNTI.

The following two methods (1) and (2) will be disclosed as a method for recognizing the RNTI for each of the UEs or for each paging group by the LC-MTC UE.

(1) The RNTI is notified by RRC signaling; here, the RNTI may be notified in the initial access or in a TAU. The RNTI for each of the LC-MTC UEs or for each paging group may be common among cells in a TA.

Accordingly, even when the LC-MTC UE changes a cell to be camped on in RRC_Idle and selects a cell in the same TA, the RNTI can continue to be used. When the LC-MTC UE selects a cell in a different TA, the cell performs an initial access or a TAU process. Thus, a valid RNTI can be newly obtained in the TA.

(2) A method for deriving an RNTI for each of the UEs or for each paging group is predetermined; the deriving method may be predetermined, for example, in a standard. Specifically, a derivation function may be provided. The derivation function may be a function using at least one of a PF and a PO as an input parameter. Examples of the function may include functions using UE identifiers such as a UE-ID, an IMSI, and a s-TMSI as input parameters.

Accordingly, the LC-MTC UE can recognize the RNTI for each of the UEs or for each paging group. Thus, the LC-MTC UE may search for both the EPDCCH to which the DCI for initial transmission is mapped and the EPDCCH to which the DCI for repeated transmission is mapped, using the RNTI of the own UE, and receive the DCIs. Accordingly, the LC-MTC UE can obtain the pagings for the own UE by receiving the PDSCH according to the received DCIs.

Fifth Embodiment

The first embodiment describes the on-going study on the new methods for notifying the SI to the LC-MTC UEs that support the reduced bandwidth. Provision of an MTC-SIB that is an SIB for the LC-MTC UE has been proposed as a method for transmitting the SI for the LC-MTC UE (see Non-Patent Document 13). Moreover, determining six resource blocks at the center of the system bandwidth as resources to be used for transmitting an MTC-SIB has been proposed as a method for transmitting the MTC-SIB (see Non-Patent Documents 10 and 13).

However, transmission of the SI for the LC-MTC UE using a particular resource is susceptible to the frequency fading, thus causing a problem with degradation in reception quality.

The fifth embodiment will disclose another method for transmitting the SI for the LC-MTC UE.

An SIB including the SI for the LC-MTC UE is provided. Here, the SIB is referred to as an SIB-MTC. The SIB-MTC is mapped to a PDSCH. The control information for the PDSCH to which the SIB-MTC is mapped (hereinafter may be referred to as "SIB-MTC DCI") is mapped to an EPDCCH. Examples of the SIB-MTC DCI include the scheduling information on the PDSCH to which the SIB-MTC is mapped, etc.

An RNTI for masking the control information for the PDSCH to which the SIB-MTC is mapped on the EPDCCH may be an SI-RNTI. Alternatively, the RNTI may be newly provided for the LC-MTC UE. The RNTI may be, for example, an MTC-SI-RNTI. Distinction from the conventional UEs is enabled by newly providing the RNTI for the LC-MTC UE, for example, the MTC-SI-RNTI. Using the MTC-SI-RNTI in detecting control information, the control information can be identified as that for the LC-MTC UE, and a malfunction can be reduced.

A SIB DCI for the conventional UEs (legacy UEs) may be transmitted using the PDCCH, and a SIB-MTC DCI for the LC-MTC UE may be transmitted using the EPDCCH. Here, the SIB-MTC DCI to be mapped to the EPDCCH may be masked by the MTC-PI-RNTI.

When the EPDCCH is used for transmitting the SIB-MTC DCI, it is unclear by which radio frame, by which subframe, or on which resource of the subframe the EPDCCH is transmitted. Thus, the LC-MTC UE cannot receive the EPDCCH.

Non-Patent Document 12 discloses a method for solving this problem. Specifically, Non-Patent Document 12 discloses a method for scheduling the EPDCCH to which the SIB-MTC DCI is mapped. The method is a method for mapping, into six resource blocks at the center of the carrier, the EPDCCH for common message that includes SIBs, pagings, and an RAR, or a method for including, in an MIB, information indicating whether the resource blocks of the EPDCCH are allocated at predetermined positions or frequency hopping is performed.

However, when the resources to which the SIB-MTC EPDCCH is mapped are fixed to the six resource blocks at the center of the carrier, a problem with degradation in reception quality occurs due to the susceptibility to the frequency fading. Furthermore, when the frequency hopping is performed, how to notify a frequency hopping pattern comes into question.

When the information is included in the MIB and notified, an amount of information in the MIB increases. Furthermore, since the MIB is repeatedly notified, the amount of resources required for the notification will become excessive. Thus, a problem with decrease in efficiency of resource usage occurs.

The fifth embodiment will disclose a method for solving these problems. The resources on which the EPDCCH is transmitted are predetermined, for example, in a standard. Here, the SIB-MTC DCI is mapped to the EPDCCH.

The following nine examples (1) to (9) are disclosed as examples of information on the resources on which the EPDCCH is to be transmitted.
(1) A period; the period may be provided on a radio frame unit basis or on a subframe unit basis
(2) An offset; the offset may be an offset from a subframe number 0 in a radio frame number 0. The offset may be provided at least one of on a radio frame unit basis, on a subframe unit basis, and on a symbol unit basis.
(3) The number of resource blocks (RBs)
(4) Allocation of the RBs; the first RB number may be used.
(5) A configuration of a reference signal (RS); a sequence of the RSs or the sequence number thereof may be used.
(6) The number of repetitions
(7) The frequency hopping mode
(8) A frequency hopping pattern
(9) A combination of (1) to (8) above The information on the resources on which the EPDCCH is to be transmitted may be any as long as the LC-MTC UE can identify a resource to which the EPDCCH is mapped. The information may be scheduling information on the EPDCCH. As such, predetermining the information, for example, in a standard prevents increase in the amount of information in the MIB, and can prevent decrease in the efficiency of resource usage.

The information on the resources of the EPDCCH to which the SIB-MTC DCI is mapped may have multiple options. Information groups on the resources on which the EPDCCH is to be transmitted may have multiple options. The information on the resources of the EPDCCH to which the SIB-MTC DCI is mapped or the information groups on the resources on which the EPDCCH is to be transmitted are made to have multiple options, so that a cell can change a resource on which the EPDCCH is transmitted, depending on a radio propagation state. Here, the SIB-MTC DCI is mapped to the EPDCCH.

Accordingly, a communication system resilient to change in the radio propagation state can be built. Furthermore, when the repetition of reception of EPDCCH to which the SIB-MTC DCI is mapped is performed, the number of the repetitions can be reduced. Thus, the power consumption of the LC-MTC UE can be reduced.

However, mere provision of the groups does not allow the LC-MTC UE to recognize which group is to be used. Here, the LC-MTC UE may receive the resources on which the EPDCCH for all of the groups is transmitted and detect the SIB-MTC DCI with the MTC-PI-RNTI, according to the information on all of the groups. However, reception of the EPDCCHs for all of the groups complicates the operations of the LC-MTC UE and increases the power consumption.

In order to solve such a problem, an indicator associated with the information on the resource of each of the EPDCCHs may be provided. An indicator associated with each of the information groups on the resources on which the EPDCCH is transmitted may be provided. The indicators and information on the resources of the EPDCCH for each of the groups are predetermined in a table, for example, in a standard. The LC-MTC UE stores the table.

The method disclosed in the third modification of the third embodiment may be applied to a method for notifying, by a cell, the LC-MTC UE of which information on the resource of the EPDCCH is valid. The same advantages as those of the third modification of the third embodiment can be produced.

Furthermore, a method for deriving information on the resources on which the EPDCCH is transmitted may be predetermined as an alternative method. Here, the SIB-MTC DCI is mapped to the EPDCCH. The method disclosed in the third modification of the third embodiment may be applied to this method. Accordingly, the same advantages as those of the third modification of the third embodiment can be produced.

The fifth embodiment will disclose another method for obtaining, by the LC-MTC UE, information on the scheduling of the EPDCCH to which the SIB-MTC DCI is mapped. In the information on the scheduling of the EPDCCH, information on the scheduling in time direction and the other information on the scheduling will be treated separately.

The information on the scheduling in time direction may be statically predetermined, for example, in a standard. The information may have one option or multiple options. Alternatively, a cell may notify the information on the scheduling in time direction by an MIB. The method using the indicators as disclosed in the third modification of the third embodiment may be applied to the case where the information has multiple options.

The other information on the scheduling may be assumed to have multiple options and notified by the MIB. The method using the indicators as disclosed in the third modification of the third embodiment may be applied thereto. Alternatively, the method of determining the derivation method in advance may be applied thereto. The information may be derived using a UE identifier (UE-ID) of the LC-MTC UE as an input parameter of a derivation function. Examples of the information on the scheduling in time direction include a period and an offset.

Accordingly, the same advantages as those of the third modification of the third embodiment can be produced.

With the fifth embodiment, the LC-MTC UE can receive the EPDCCH to which the SIB-MTC DCI is mapped. Furthermore, it is possible to detect the presence or absence of the SIB-MTC DCI. If the SIB-MTC DCI exists, the LC-MTC UE can receive the SIB-MTC DCI.

Although mapping the SIB-MTC DCI for the LC-MTC UE to the EPDCCH is disclosed, the SIB-MTC DCI for the LC-MTC UE may be mapped not only to the EPDCCH but to a physical downlink control channel using a narrow-bandwidth resource. The physical downlink control channel may be any physical downlink control channel configured within a bandwidth at which the LC-MTC UEs that support the reduced bandwidth are capable of reception.

For the LC-MTC UEs that support the coverage enhancement, the method for repeatedly transmitting the PDCCH to which the paging downlink control information is mapped, the repeated paging transmission method, and a relationship between these methods may be applied to a method for repeatedly transmitting the EPDCCH to which the SIB-MTC DCI is mapped, a repeated SIB-MTC transmission method, and a relationship between these methods.

Accordingly, the LC-MTC UEs that support the coverage enhancement can receive the SIB-MTC downlink control information, and the SIB-MTC using the SIB-MTC downlink control information.

First Modification of Fifth Embodiment

A time resource of the EPDCCH to which the paging DCI is mapped may be identical to a time resource of the EPDCCH to which the SIB-MTC DCI is mapped. Examples of a method for indicating the time resource include using a radio frame number and a subframe number. The radio frame number and the subframe number of the EPDCCH to which the paging DCI is mapped are set identical to a radio frame number and a subframe number of the EPDCCH to which the SIB-MTC DCI is mapped, respectively.

Furthermore, the number of repetitions of the EPDCCH to which the paging DCI is mapped may be identical to the number of repetitions of the EPDCCH to which the SIB-MTC DCI is mapped. The number of repetitions for the LC-MTC UE supporting the coverage enhancement is determined depending on a location and a radio propagation environment of the LC-MTC UE.

Thus, when EPDCCHs are transmitted on the same subframe by the cell with the same number of repetitions, the LC-MTC UE can receive the EPDCCHs to which the respective DCIs are mapped without degradation in the reception quality.

Since the LC-MTC UE in the RRC_Idle state receives the EPDCCH to which the SIB-MTC DCI is mapped, accordingly, it can receive the EPDCCH to which the paging DCI is mapped. Thus, a period during which the LC-MTC UE performs a receiving operation can be shortened, and the power consumption can be reduced.

A period of an EPDCCH to which the paging DCI is mapped may be an integral submultiple or an integer multiple of a period of an EPDCCH to which the SIB-MTC DCI is mapped. Accordingly, the number of reception operations can be reduced more than that when the transmission timings of both of the EPDCCHs are not correlated with each other. Accordingly, the reception period can be shortened and the power consumption can be reduced.

Particularly, when the period of the EPDCCH to which the paging DCI is mapped is an integer multiple of the period of the EPDCCH to which the SIB-MTC DCI is mapped, the power consumption of the LC-MTC UE can be further reduced. The LC-MTC UE that has once received the SIB-MTC does not have to receive the SIB-MTC until SI modification is notified by the paging.

Thus, setting a paging cycle to the integer multiple of the period of the SIB-MTC eliminates the need for receiving the SIB-MTC between paging cycles. Furthermore, the reception of the SIB-MTC can be performed together with the reception of paging. Thus, the power consumption of the LC-MTC UE can be reduced.

The periods are statically predetermined, for example, in a standard. Alternatively, the periods may be notified by being included in the MIB. It is possible that values of the periods and indicators indicating the values are listed in a table, the table is statically predetermined, for example, in a standard, and an MIB including the indicators is notified. The method disclosed in the third modification of the third embodiment or the fifth embodiment may be applied thereto.

The paging DCI and the SIB-MTC DCI may be mapped within the same EPDCCH. The EPDCCH includes DCIs. The SIB-MTC DCI is masked by the MTC-SI-RNTI, and mapped to the EPDCCH. The paging DCI is masked by the MTC-PI-RNTI, and mapped to the EPDCCH.

The LC-MTC UE can obtain the SIB-MTC DCI by detecting the EPDCCH with the MTC-SI-RNTI. Furthermore, the LC-MTC UE can obtain the paging DCI by detecting the EPDCCH with the MTC-PI-RNTI.

Accordingly, only one resource for the EPDCCH may be detected by each RNTI with the timing of transmission of the EPDCCH. Thus, the reception period for the LC-MTC UE can be further shortened and the power consumption thereof can be reduced.

Here, the timing of the EPDCCH to which the paging DCI is mapped does not conform to the conventional PFs/POs. The timing of the EPDCCH to which the paging DCI is mapped may be predetermined, for example, in a standard. The time resource of the EPDCCH to which the paging DCI is mapped may be predetermined to be identical to the time resource of the EPDCCH to which the SIB-MTC DCI is mapped.

Accordingly, the LC-MTC UE can recognize the timing of the EPDCCH to which the paging DCI is mapped.

Alternatively, a function for deriving a radio frame (PF) and a subframe (PO) of the EPDCCH to which the paging DCI is mapped from the time resource of the EPDCCH to which the SIB-MTC DCI is mapped may be newly provided. The UE identifier (UE-ID) of the LC-MTC UE may be an input parameter of the derivation function. Accordingly, the subframes on which pagings are transmitted to a large number of the LC-MTC UEs can be dispersed.

Although the EPDCCH to which the paging DCI is mapped and the EPDCCH to which the SIB-MTC DCI is mapped are disclosed, the paging DCI and the SIB-MTC DCI may be mapped not only to the EPDCCH but any physical downlink control channel using a narrow-bandwidth resource. The physical downlink control channel may be any physical downlink control channel configured within a bandwidth at which the LC-MTC UEs that support the reduced bandwidth are capable of reception.

Sixth Embodiment

The transmission power of a conventional uplink channel (PUSCH, PUCCH) is derived using a path loss (PL) as indicated below (see Non-Patent Document 14).

Transmission power of uplink channel=$f(x)$, $x=PL$

The path loss (PL) is derived using information on the transmission power to be notified from a cell to a UE and the received power measured by the UE. The repeated transmission of the uplink channel by the LC-MTC UEs requiring the coverage enhancement is being studied. The sixth embodiment will disclose a method for deriving the transmission power of an uplink channel when the LC-MTC UE performs the repeated transmission.

A value obtained by dividing the PL derived by an LC-MTC UE by the total number of transmissions of an uplink channel is newly provided. The value is referred to as a PL-R herein. The total number of transmissions is a sum of the initial and repeated transmissions. The PL-R is used for deriving the transmission power of the uplink channel instead of the conventional PL. Thus, the transmission power of the uplink channel is derived as indicated below.

Transmission power of uplink channel=$f(x)$, $x=PL-R=PL$/the total number of transmissions When the PL is derived in the conventional method, for example, the value of the PL derived by an LC-MTC UE at an enhanced coverage edge is larger than the value of the PL derived by a UE at a normal coverage edge. Thus, when the transmission power of the uplink channel is derived using the PL derived in the conventional method, the transmission power of the uplink channel of the LC-MTC UE at the enhanced coverage edge is larger than that of the UE at the normal coverage edge. The repeated transmission with the larger transmission power of the uplink channel excessively increases the received power of a cell.

Thus, with the method disclosed in the sixth embodiment, when an LC-MTC UE performs the repeated transmission of an uplink channel, the received power of the cell can be proper. Furthermore, since the LC-MTC UE can reduce the transmission power of the uplink channel, the power consumption can be reduced.

When the LC-MTC UE performs the repeated transmission of the uplink channel, the next repeated transmission may be performed without receiving any acknowledgement of the uplink channel, for example, Ack or Nack, in response to the preceding transmissions. Since the repeated transmission of the uplink channel can be performed without receiving the acknowledgement on a per transmission basis, a control delay can be shortened. Here, a cell does not have to transmit the acknowledgement to the LC-MTC UE.

Here, the method for deriving the transmission power of the uplink channel disclosed in the sixth embodiment may be used. The LC-MTC UE performs all the transmissions including the initial and repeated transmissions. Thus, the LC-MTC UE can reduce the transmission power more than by the entire transmissions with a larger amount of power, and reduce the power consumption. Furthermore, the cell can obtain the proper received power by combination of the initial and repeated transmissions from the LC-MTC UE.

When the LC-MTC UE performs the repeated transmission of the uplink channel, it may receive acknowledgements of the uplink channel in response to the preceding transmissions. The cell transmits the acknowledgements in response to the transmissions of the uplink channel from the LC-MTC UE. Here, the LC-MTC UE may use a conventional method for deriving the transmission power of the uplink channel. Since the LC-MTC UE can perform the transmission with the transmission power matching the PL, the cell may receive the uplink channel with a fewer number of repetitions. Here, the cell transmits the acknowledgement to the LC-MTC UE. The LC-MTC UE that has received the acknowledgement stops the repeated transmission.

Thus, the LC-MTC UE can perform the uplink channel transmission with a fewer number of repetitions. Accordingly, the efficiency of resource usage can be improved.

An offset value may be newly provided to derive a path loss for the LC-MTC UE. When the LC-MTC UE derives the path loss, the offset value may be used. The offset value may be set for each cell or for each UE. When the offset value is set for each cell, the cell broadcasts it as the SI for the LC-MTC UE. Alternatively, the cell may notify the LC-MTC UEs separately of offset values using the RRC signaling. When the offset value is set for each UE, the cell may notify the LC-MTC UEs separately of offset values using the RRC signaling.

An offset value may be newly provided to derive the transmission power of an uplink channel for the LC-MTC UE as an alternative method. When the LC-MTC UE derives the transmission power of the uplink channel, the offset value may be used. The offset value may be set for each cell or for each UE. The notification method from the cell to the LC-MTC UE may be applied thereto. Furthermore, the two methods may be combined for use.

Accordingly, the settings on the LC-MTC UE can be changed differently from those of the conventional UEs. Furthermore, the transmission power of the LC-MTC UE can be flexibly set depending on a radio propagation environment and an interference condition. Accordingly, a stable communication system can be built even in a coexistence of the conventional UEs and the LC-MTC UEs.

Seventh Embodiment

Furthermore, the need for systems using an unlicensed spectrum that is a spectrum that has not been licensed as a tool for complementing a licensed spectrum that is a spectrum that has been licensed is increasing. Examples of the unlicensed spectrum include the ISM bands used for wireless LAN, etc. 3GPP is studying Licensed-Assisted Access (LAA) using the unlicensed spectrum as a tool for complementing the licensed spectrum, with the LTE. The unlicensed spectrum is only the DL, or UL and DL.

When an unlicensed spectrum is used, a fair coexistence method with the other systems using the unlicensed spectrum is necessary.

Thus, LAA needs to have at least the following five functions (1) to (5).
(1) Listen-before-talk (clear channel assessment)
(2) Discontinuous transmission on a carrier with a limited maximum transmission duration
(3) Dynamic frequency selection for radar avoidance in certain bands/regions
(4) Carrier selection
(5) Transmission power control (TPC)

3GPP is studying solutions for satisfying these requirements. Non-Patent Document 15 discloses, for example, two methods (1) and (2) below on the data transmission.
(1) Frame-based equipments (FBE)

The clear channel assessment (CCA) is performed with the frame boundary timing. When the channel is clear, data is transmitted. When the channel is busy, the CCA is again performed with the next frame boundary timing.
(2) Load-based equipments (LBE)

The CCA is consecutively performed. When the channel is clear a predetermined number of times, data is immediately transmitted.

Data cannot be consecutively transmitted for a long period over an unlicensed spectrum to ensure the fairness with the other systems to enable the coexistence. It has been proposed that a cell performs discontinuous transmission when data transmission is necessary and does not transmit any when the data transmission is unnecessary. However, when nothing is transmitted from the cell, the UE has a problem with incapability of synchronization or measurement of the unlicensed spectrum.

Thus, a signal for synchronizing with or measuring the unlicensed spectrum is necessary. A signal to be transmitted periodically on a fewer number of subframes is being studied as the signal for synchronizing with or measuring the unlicensed spectrum. For example, application of a discovery signal (DS) for a small cell has been proposed (see Non-Patent Document 16). The DS transmission is cyclical, and the transmission timing is determined on a subframe unit basis. Furthermore, an eNB notifies, in advance, a UE of settings for DS measurement, such as a DS measurement period and an offset. The UE receives the DS according to the settings for DS measurement notified from the eNB.

However, such transmission of the signal for synchronizing with or measuring the unlicensed spectrum requires avoidance of a collision and ensuring the fairness with the other systems to enable the coexistence. Although the fair coexistence method on the data transmission has been proposed as above, there is no fair coexistence method on the signal for synchronizing with or measuring such an unlicensed spectrum.

In the case where a cell does not transmit any, the UE does not receive a PDCCH every subframe and detect the presence or absence of the scheduling information on the PDSCH unlike in receiving data. Thus, the fair coexistence method in transmitting data cannot be applied as it is.

Without any ingenuity, the UE has a problem with incapability of synchronization or measurement of the unlicensed spectrum.

The method for solving this problem will be disclosed hereinafter. Before transmitting the signal for synchronizing with or measuring the unlicensed spectrum, a cell performs the CCA. The signal for synchronizing with or measuring the unlicensed spectrum may be the DS.

Figure 20:
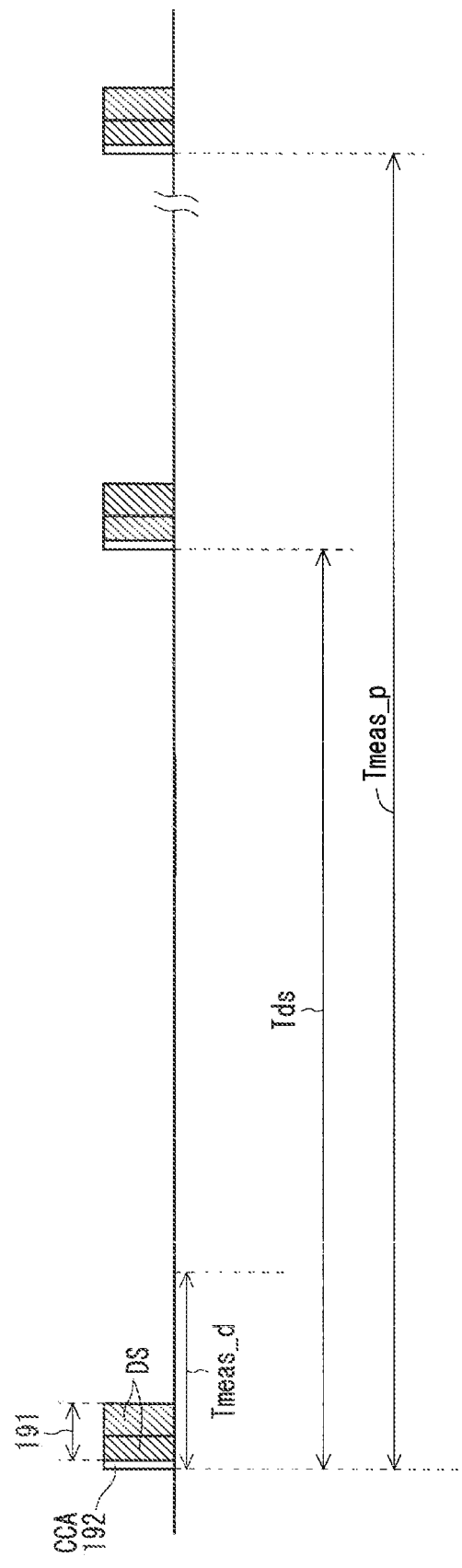
FIG. 20 illustrates an example state in which a cell transmits DSs and a UE measures the DSs over an unlicensed spectrum according to a seventh embodiment.

FIG. 20 is a conceptual diagram illustrating an example in which a cell transmits DSs and a UE measures the DSs over an unlicensed spectrum according to the seventh embodiment. The horizontal axis represents a time. A DS 191 represents a duration configured from one subframe or a combination of subframes (hereinafter may be referred to as a "DS transmission duration"). When a DS is configured from a combination of subframes, the DS on one of the subframes may be repeated.

FIG. 20 illustrates an example in which the DS transmission duration is configured from two subframes. The diagonally hatched subframes are subframes on which the DS is actually transmitted. A cell periodically transmits the DS at intervals of a transmission period (Tds) of the DS over the unlicensed spectrum.

A CCA 192 is certainly performed before the DS is transmitted. When the channel is clear through the CCA, the DS is transmitted. In FIG. 20, the blank CCA represents a clear channel. The CCA may be performed at a boundary of the subframe on which the DS starts to be transmitted. During the CCA, the DS may not be transmitted. Alternatively, the end timing of the CCA may be at the boundary of the subframe on which the DS starts to be transmitted. Accordingly, a cell can transmit the DS.

A cell notifies a UE configuring an unlicensed spectrum of the settings on measurement of the DS over the unlicensed spectrum. The settings on measurement of the DS include a DS measurement period (Tmeas_p), an offset (a measurement start timing), and a DS measurement duration (Tmeas_d).

A UE measures the DS in the DS measurement duration (Tmeas_d) from the offset. The UE repeatedly measures the DS in the DS measurement duration (Tmeas_d) at intervals of a measurement period (Tmeas_p) of the DS from the offset. A cell configures the settings on measurement of the DS over the unlicensed spectrum. The settings on measurement of the DS may be configured by a cell over the unlicensed spectrum or a cell connected to the UE over a licensed spectrum.

When the cell over the unlicensed spectrum configures the settings, the cell may notify the UE of the settings. Alternatively, the cell connected to the UE over the licensed spectrum may obtain the settings from a cell over the unlicensed spectrum and notify the UE of the settings.

When the cell connected to the UE over the licensed spectrum configures the settings, the cell may notify the UE of the settings. The cell may notify the UE of the settings together with information on the configuration of the unlicensed spectrum.

The cell may notify the UEs of the settings through dedicated signaling. The RRC signaling may be used. Thus, separate settings are made available for the UEs. Alternatively, the settings may be broadcasted as system information on the cell. The settings can be configured for each cell. When the settings are notified to a large number of the UEs, an amount of the information through the dedicated signaling can be reduced.

Accordingly, the UEs configuring the unlicensed spectrum can measure the DS, and synchronize with and measure the unlicensed spectrum.

However, when the channel is not clear through the CCA, the DS cannot be transmitted in the DS transmission duration. When the DS cannot be transmitted, the UE has problems with incapability of receiving the DS in the DS measurement duration (Tmeas_d) notified from the cell and of synchronizing with or measuring the unlicensed spectrum.

The method for solving these problems will be disclosed hereinafter. A second DS transmission period (DS transmission period 2 (Tds2)) is provided. When the channel is not clear through the CCA, a cell performs the CCA again with the DS transmission timing after the second DS transmission period.

The following five examples (1) to (5) are disclosed as specific examples of the DS transmission period 2.
(1) The DS transmission period 2 is identical to the DS transmission duration. At the end of the DS transmission duration, the CCA is again performed.
(2) The DS transmission period 2 is identical to a DS measurement duration configured for a UE.
When the UE cannot receive the DS after the DS measurement duration, it continuously measures the DS in the DS measurement duration again.
(3) The DS transmission period 2 is within the DS transmission period.
Furthermore, an upper limit of the number of the DS transmissions through the CCA may be provided. A period for the DS transmissions having the upper limit through the CCA may be within the DS transmission period. The DS transmission period 2 may be an integral submultiple of the DS transmission period.
(4) The DS transmission period 2 is identical to the DS transmission period.
(5) A combination of (1) to (4) above
The settings of the second DS transmission period may be configured by a cell over the unlicensed spectrum or a cell connected to the UE over the licensed spectrum. Accordingly, the settings can be flexibly configured in consideration of a radio propagation environment and the coexistence with the other systems.

A method for measuring the DS by the UE will be disclosed hereinafter. Since the UE does not know when the DS is transmitted due to the CCA, a DS measurement window for the CCA is provided. Assuming that the DS is transmitted during a period of the DS measurement window for the CCA, the UE measures the DS. Examples of the DS measurement window for the CCA may include a second measurement duration of the DS (a DS measurement duration 2 (Tmeas_d2)).

The DS measurement duration 2 may be configured according to the DS transmission period 2 and a setting of the number of the DS transmissions through the CCA. The DS measurement duration 2 may be configured longer than the period for the DS transmissions having the upper limit through the CCA. The UE receives the DSs during the DS measurement duration and the DS measurement duration 2.

If the UE cannot receive the DS, it repeatedly receives the DSs for the DS measurement duration during the DS measurement duration 2.

When the UE receives the DS, it may finish receiving the DS even in the middle of the reception. When the UE receives the DS and is able to perform at least one of the synchronization and measurement of the DS, it may finish receiving the DS even in the middle of the reception. The UE may finish receiving the DS even in the middle of the DS transmission duration (one set of the DS transmission). Furthermore, an offset (a measurement start timing) may be provided as the DS measurement window for the CCA. The offset may be an offset from the beginning of the DS measurement duration. The offset may be provided on a subframe unit basis.

A cell configures the DS measurement window for a UE configuring an unlicensed spectrum. The settings of the DS measurement window may be configured by a cell over the unlicensed spectrum or a cell connected to the UE over the licensed spectrum.

When the cell over the unlicensed spectrum configures the settings, the cell may notify the UE of the settings. Alternatively, the cell connected to the UE over the licensed spectrum may obtain the settings from a cell over the unlicensed spectrum and notify the UE of the settings. When the cell connected to the UE over the licensed spectrum configures the settings, the cell may notify the UE of the settings.

The cell may notify the settings including the setting on the measurement of the DS over the unlicensed spectrum. Furthermore, the cell may notify the UE of information on whether the CCA is performed on the DS over the unlicensed spectrum. The cell may notify the UE of information indicating in which method the CCA is performed. The cell may notify the settings including the setting on the measurement of the DS over the unlicensed spectrum.

The cell may notify the UEs of the settings through dedicated signaling. The RRC signaling may be used. Thus, separate settings are made available for the UEs. Alternatively, the settings may be broadcasted as system information on the cell. Settings can be configured for each cell. When the settings are notified to a large number of the UEs, an amount of information through the dedicated signaling can be reduced.

Although the seventh embodiment describes the DS, not limited to the DS but any signal for synchronizing with or measuring the unlicensed spectrum may be used.

Figure 21:
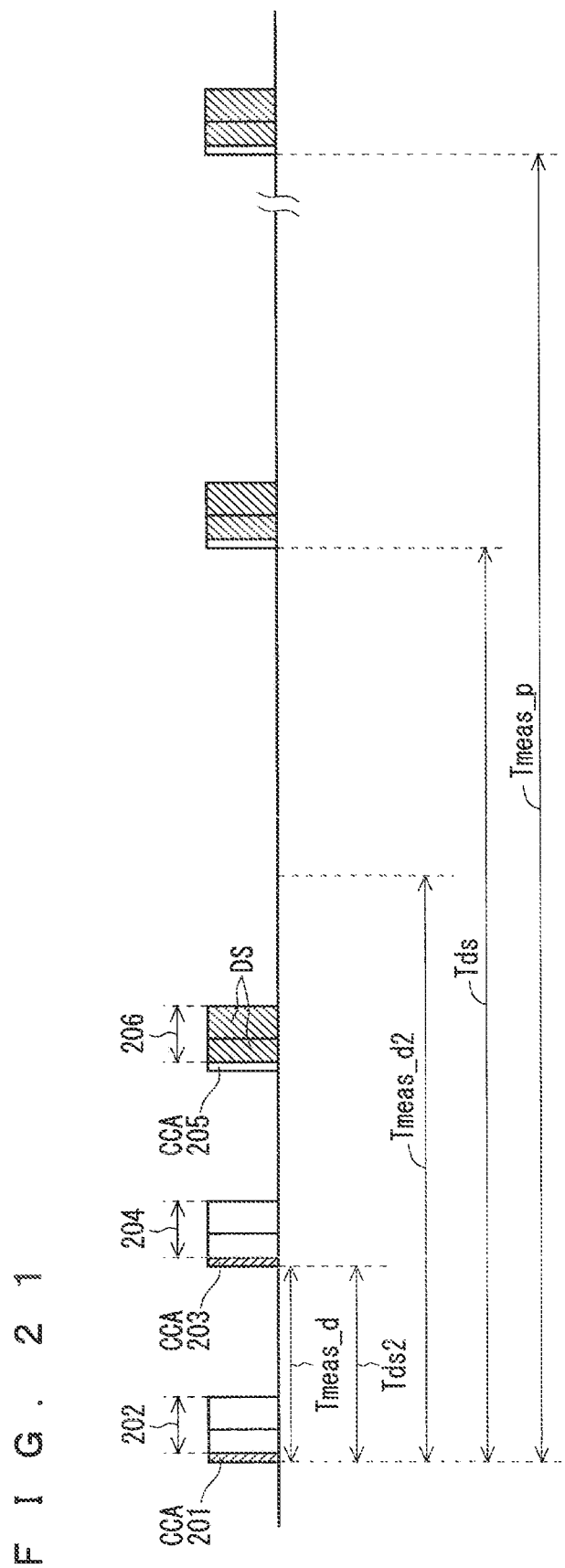
FIG. 21 illustrates an example state in which a cell transmits DSs and a UE measures the DSs over the unlicensed spectrum according to the seventh embodiment.

FIG. 21 is an example conceptual diagram illustrating that a cell transmits the DSs and the UE measures the DSs over the unlicensed spectrum according to the seventh embodiment. In CCAs 201, 203, and 205, diagonally hatched CCAs represent that the channel is not clear, and a CCA with no hatching represents that the channel is clear.

In DSs 202, 204, and 206, a diagonally hatched DS represents transmission of the DS, and DSs with no hatching represent no transmission of the DSs.

A cell performs the CCA 201, and does not transmit the DS 202 when the channel is not clear. When the channel is not clear through the CCA, the CCA 203 is performed again after the DS transmission period 2. When the cell performs the CCA 203 and the channel is not clear again, it does not transmit the DS 204 and performs the CCA 205 again after the DS transmission period 2. When the cell performs the CCA 205 and the channel is clear, it transmits the DS 206.

The cell periodically transmits the DS at intervals of the transmission period (Tds) of the DS over the unlicensed spectrum. The cell certainly performs the CCA before transmitting the DS, and follows the disclosed method.

The UE measures the DS during the DS measurement duration 2 that is the DS measurement window for the CCA. The UE that has been notified of the DS measurement duration 2 and the DS transmission period 2 may repeatedly measure the DS measurement duration and the DSs at the DS transmission period 2 during the DS measurement duration 2. When the UE receives the DS, it finishes receiving the DS even in the middle of the reception.

In FIG. 21, the UE receives the DS 206, performs at least one of the synchronization and the measurement, and finishes receiving the DSs. When the UE receives the DS, it measures the DS again after the DS measurement period (Tmeas_p). The UE periodically measures the DS at intervals of the DS measurement period (Tmeas_p). The DS is measured according to the disclosed method.

According to the method disclosed in the seventh embodiment, when a cell transmits at least one of a synchronization signal and a measurement signal over the unlicensed spectrum, even in the case where the channel is not clear, the cell can transmit the signal again. Furthermore, before the cell transmits the DS, even when the channel is not clear through the CCA, the UE can receive at least one of the synchronization signal and the measurement signal.

Thus, even in such a case, the UE can perform at least one of the synchronization and the measurement of the unlicensed spectrum. Accordingly, the CCA can be introduced to at least one of the synchronization signal and the measurement signal for the unlicensed spectrum. Accordingly, it is possible to avoid a collision with the other systems over the unlicensed spectrum, and ensure the fairness therewith to enable the coexistence.

First Modification of the seventh embodiment

When the channel is not clear through the CCA, transmission is performed on the DS transmission period 2 according to the method disclosed in the seventh embodiment. Thus, the DS is not transmitted during the DS transmission period 2. When the channel is not clear as a result of the CCA, a delay occurs until transmission of the DS. Thus, the UE has a delay in synchronization with and measurement of a cell over the unlicensed spectrum.

The method for solving this problem will be disclosed hereinafter. When the channel is not clear through the CCA, a cell continues to perform the CCA. When the channel is clear, the cell immediately transmits the DS. Alternatively, when the channel becomes clear a predetermined number of times through the CCA, the cell may immediately transmit the DS. An upper limit of the number of the DS transmissions through the CCA may be provided. A period for the DS transmissions having the upper limit through the CCA may be set within the DS transmission period.

The method disclosed in the seventh embodiment may be applied to a method for measuring the DS by the UE. Furthermore, the method disclosed in the seventh embodiment may be applied to a method, by a cell, for configuring the DS measurement window to a UE configuring the unlicensed spectrum and to a method for notifying the UE of the configuration.

Figure 22:
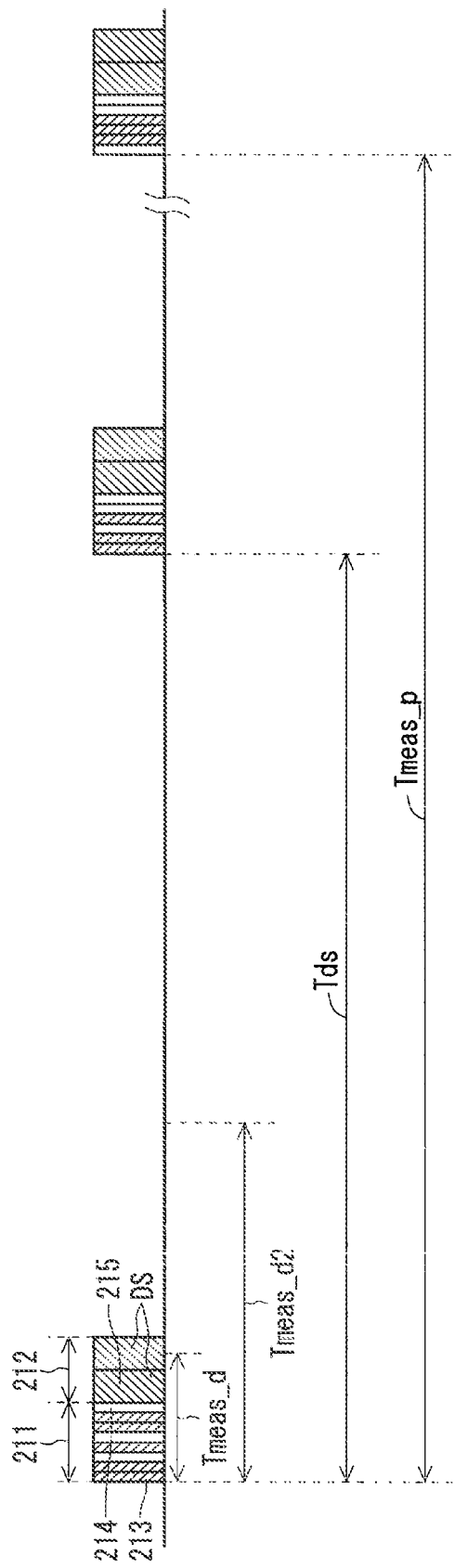
FIG. 22 illustrates an example state in which a cell transmits DSs and a UE measures the DSs over the unlicensed spectrum according to a first modification of the seventh embodiment.

FIG. 22 is an example conceptual diagram illustrating that a cell transmits the DSs and the UE measures the DSs over the unlicensed spectrum according to the first modification of the seventh embodiment. Since the conceptual diagram of FIG. 22 is similar to the conceptual diagram of FIG. 21, the same reference numerals will be assigned to the same structures and the common description thereof will be omitted.

In CCAs 211, diagonally hatched CCAs represent that the channel is not clear, and no hatched CCAs represents that the channel is clear. In DSs 212, diagonally hatched DSs represent transmission of the DSs, and DSs with no hatching represent no transmission of the DSs.

When the channel is not clear through a CCA 213, a cell continues to consecutively perform the CCA. When the channel becomes clear a predetermined number of times through the CCA, the cell immediately transmits the DS. The predetermined number of times may be statically predetermined, for example, in a standard. Alternatively, the predetermined number of times may be determined by a core network side or an operator, and notified to a cell in advance. The predetermined number of times is three herein. When the channel is clear for the third time through a CCA 214, the cell transmits a DS 215.

The cell periodically transmits the DS at intervals of the transmission period (Tds) of the DS over the unlicensed spectrum. The cell certainly performs the CCA before transmitting the DS, and follows the disclosed method.

The UE measures the DS during the DS measurement duration 2 that is the DS measurement window for the CCA. The UE may measure the DS during the DS measurement duration 2 even when the DS measurement duration is notified. Accordingly, even when the transmission of the DS exceeds a measurement duration of a UE through the CCA, the UE can measure the DS through its measurement during the second DS measurement duration. When the UE receives the DS, it finishes receiving the DS even in the middle of the reception.

In FIG. 22, the UE receives a DS 212, performs synchronization and measurement, and finishes receiving the DS. When the UE receives the DS, it measures the DS again after the DS measurement period (Tmeas_p). The UE periodically measures the DS at intervals of the DS measurement period (Tmeas_p). The DS is measured according to the disclosed method.

The method disclosed in the first modification can produce the same advantages as described in the seventh embodiment. Furthermore, the cell can perform the CCA on the DS transmission period 2, without waiting for the next DS transmission timing. Thus, when the channel is clear through the CCA, the cell can immediately transmit the DS. A delay until transmission of the DS can be reduced.

Furthermore, the UE can shorten a time for synchronizing with and measuring a cell over the unlicensed spectrum. Thus, a control delay can be reduced. Furthermore, the power consumption of the UE can be reduced.

Although the cell immediately transmits the DS when the channel is clear through the CCA, the cell may transmit the DS from the next subframe. The DS may be transmitted from the beginning of the next subframe or after a predetermined symbol. The predetermined symbol may be notified to the UE. The method disclosed in the seventh embodiment may be applied to a method for notifying the predetermined symbol. When there is a time between the end of the CCA and start of the transmission of the next DS, a signal indicating an occupied state may be transmitted during the time.

Accordingly, it is possible to prevent the other systems from using the unlicensed spectrum during the time. Thus, a cell can transmit the next DS without a collision with the other systems when starting to transmit the DS. Furthermore, a delay until transmission of the DS can be reduced.

Figure 23:
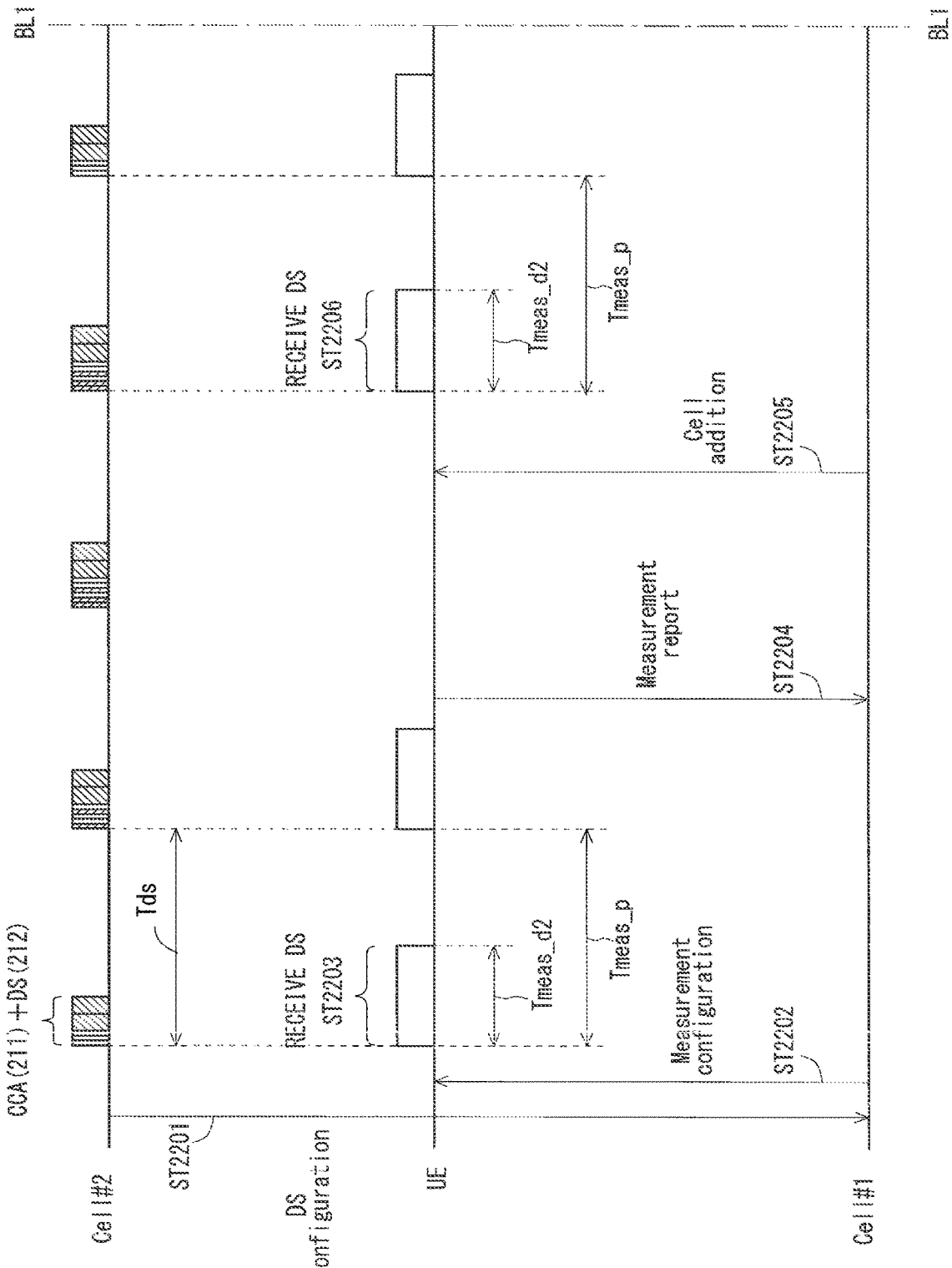
FIG. 23 illustrates example processes until data communication through transmission of DSs and measurement of a UE according to the first modification of the seventh embodiment.
Figure 24:
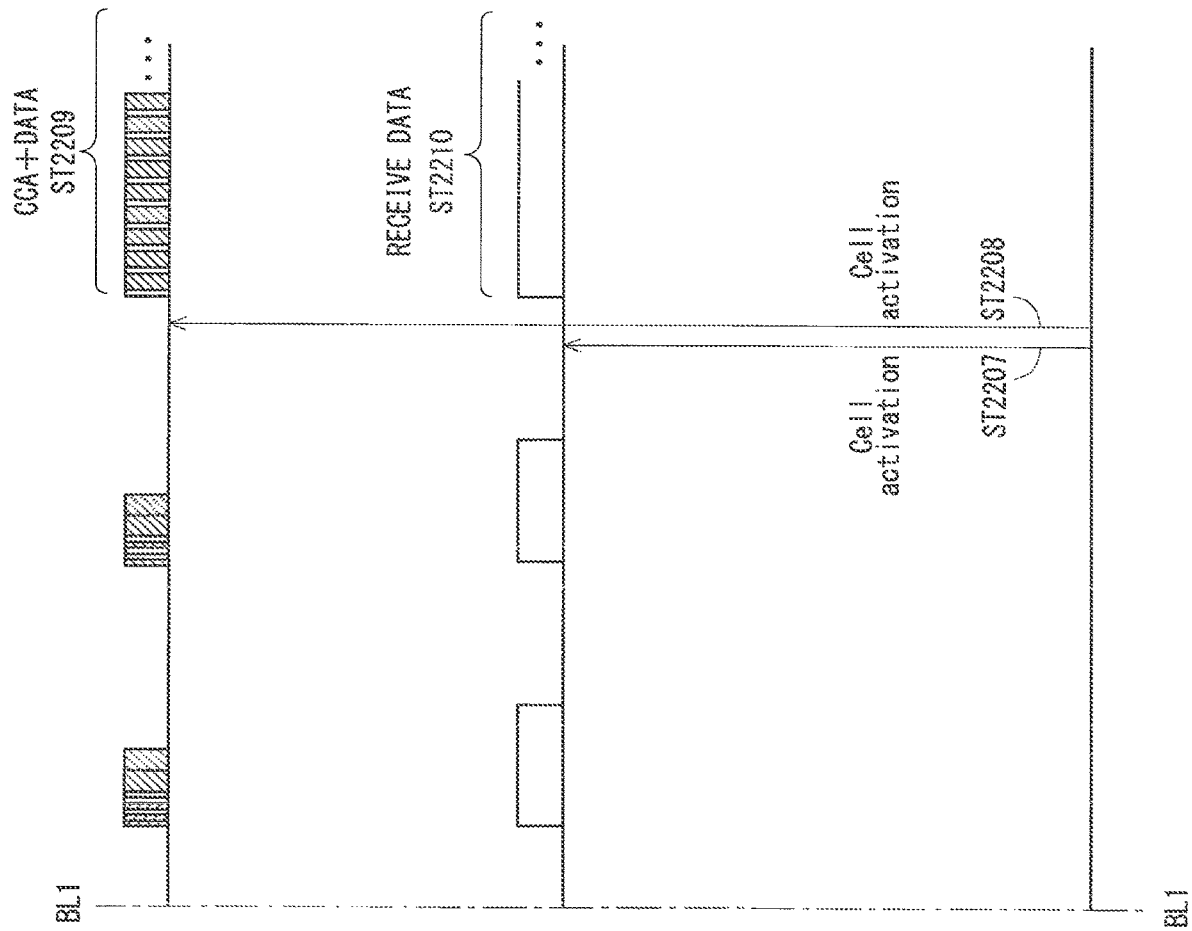
FIG. 24 illustrates example processes until data communication through transmission of DSs and measurement of a UE according to the first modification of the seventh embodiment.

FIGS. 23 and 24 illustrate example processes until data communication through transmission of the DSs and measurement by the UE as described in the first modification of the seventh embodiment. FIGS. 23 and 24 are connected across a border BL1. Since the conceptual diagram of FIGS. 23 and 24 is similar to the conceptual diagram of FIG. 22, the same reference numerals will be assigned to the same structures and the common description thereof will be omitted.

In CCAs 211, diagonally hatched CCAs represent that the channel is not clear, and CCAs with no hatching represent that the channel is clear. In DSs 212, diagonally hatched DSs represents transmission of the DSs, and DSs with no hatching represent no transmission of the DSs.

A cell #1 is a cell on a licensed spectrum and a cell to which a UE is RRC-connected. A cell #2 is a cell on an unlicensed spectrum. In the example of FIGS. 23 and 24, the cell #2 configures the DS transmission settings. The DS transmission settings include a DS transmission period, an offset (a measurement start timing), a sequence of the DSs, whether the CCA is performed, and in which method the CCA is performed.

In Step ST2201, the cell #2 notifies the cell #1 of the DS configuration. The cell #1 configures the measurement of the DS over the unlicensed spectrum using the notified DS configuration.

In Step ST2202, the cell #1 notifies the UE of the measurement configuration on the DS. The measurement configuration on the DS over the unlicensed spectrum includes a frequency (carrier frequency) of the unlicensed spectrum, a DS measurement period (Tmeas_p), an offset (a measurement start timing), and a DS measurement window for the CCA (DS measurement duration 2 (Tmeas_d2)). The measurement configuration may include the sequence of the DSs. The measurement configuration may include information on whether the CCA is performed and in which method the CCA is performed. Furthermore, the measurement configuration may include information on a measurement report.

The cell #2 transmits the DS according to the DS configuration when transmitting no data. The UE that has received the measurement configuration on the DS over the unlicensed spectrum from the cell #1 in Step ST2202 measures the DS at the frequency (carrier frequency) of the notified unlicensed spectrum in Step ST2203. The UE measures the DS during the DS measurement window for the CCA from the measurement start timing and repeats it at the DS measurement period at the frequency (carrier frequency) of the notified unlicensed spectrum.

When the UE has received one or more DSs and criteria on the measurement report is satisfied, the UE notifies the cell #1 of the measurement report in Step ST2204. Identification of a cell such as a PCI and the reception qualities such as the RSRP and the RSRQ are reported as the measurement report. The criteria on the measurement report may be predetermined, for example, in a standard. The criteria include a result of the measurement on the DSs of the cell #2.

The cell #1 that has received the measurement report from the UE determines to configure the cell #2 for the UE using the measurement report. In Step ST2205, the cell #1 notifies the UE of cell addition. The cell addition includes a cell identifier and a carrier frequency of a cell to be added that is the cell #2. Furthermore, the cell #1 notifies settings on the measurement of the DS of the cell to be added. The settings may be omitted when they are the same as the settings on the measurement of the DS notified in Step ST2202.

The UE that has received the settings on the measurement of the DS in Step ST2205 measures the DS of the cell #2 using the settings and synchronizes with the cell #2 in Step ST2206. The UE continues to synchronize with the cell #2 until the cell #1 notifies releasing of the cell #2 to the UE. Furthermore, the measurement may be performed.

In Step ST2207, the cell #1 that has determined the communication with the UE through the cell #2 notifies the UE that the cell #2 is active (cell activation). The UE that has received the notification starts receiving the data from the cell #2 in Step ST2210. Since the data may be transmitted from the cell #2 every subframe, the UE continues to receive the data until the cell #1 notifies that the cell #2 is deactivated.

Furthermore, the cell #1 that has determined the communication with the UE through the cell #2 notifies the cell #2 of the instruction to activate the data transmission (cell activation) in Step ST2208. The cell #2 that has received the instruction transmits data to the UE in Step ST2209. The UE receives the data from the cell #2.

Accordingly, when at least one of the synchronization signal and the measurement signal is transmitted over the unlicensed spectrum in a state where a cell over the unlicensed spectrum does not transmit data, the CCA can be introduced before the transmission. Furthermore, even when the CCA is introduced, the UE can receive at least one of the synchronization signal and the measurement signal over the unlicensed spectrum.

Furthermore, the UE can synchronize with and measure a cell over the unlicensed spectrum, and a cell over a licensed spectrum can add a cell over the unlicensed spectrum and set the cell active. Thus, data communication using the cell over the unlicensed spectrum can be performed.

Furthermore, the LAA using a cell on a licensed spectrum and a cell over an unlicensed spectrum becomes possible. Furthermore, it is possible to avoid a collision with the other systems over the unlicensed spectrum, and ensure the fairness therewith to enable the coexistence.

The embodiments and the modifications herein are merely illustrations of the present invention and can be freely combined within the scope of the invention. Also, any constituent elements of the embodiments and the modifications thereof can be appropriately modified or omitted. Accordingly, even when the various services including a support of the MTC and the use of the unlicensed spectrum are supported, a communication system that enables improvement in communication performance of a communication terminal device can be provided.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

1301 coverage of a macro eNB (macro cell), 1302 coverage of a small eNB (small cell).

The invention claimed is:

1. A communication system, comprising:
a communication terminal; and
a base station configuring at least one cell configured to perform radio communication with the communication terminal,
wherein the communication terminal includes a narrow-bandwidth terminal having a narrower communication bandwidth narrower than a system bandwidth that can be used by the cell,
the narrow-bandwidth terminal is configured to recognize a cell reselection process parameter through a predetermined method, and
the predetermined method includes reception of system information (SI) for the narrow-bandwidth terminal including the cell reselection process parameter, the SI including intra-frequency communication parameters and not including inter-frequency parameters.

2. The communication system according to claim 1, wherein the system information does not include at least one of:
a parameter on speed;
a parameter on inter radio access technology (inter-RAT);
a parameter on priority;
a parameter on measurement bandwidth; and
a parameter on reference signal received quality (RSRQ).

3. A communication terminal configured to perform radio communication with at least one cell configured by a base station,
wherein the communication terminal includes a narrow-bandwidth terminal having a narrower communication bandwidth narrower than a system bandwidth that can be used by the cell,
the narrow-bandwidth terminal is configured to recognize a cell reselection process parameter through a predetermined method, and
the predetermined method includes reception of system information (SI) for the narrow-bandwidth terminal including the cell reselection process parameter, the SI including intra-frequency communication parameters and not including inter-frequency parameters.

4. The communication system according to claim 1, wherein the predetermined method further includes at least one of:
acquisition of a parameter predetermined in a standard as the cell reselection process parameter,
reception of a master information block (MIB) including the cell reselection process parameter,
reception of a radio resource control (RRC) signaling including the cell reselection process parameter, and
acquisition of an indication indicating one of plurality of candidates each predetermined in a standard as the cell reselection process parameter.

5. The communication terminal according to claim 3, wherein the predetermined method includes at least one of:
acquisition of a parameter predetermined in a standard as the cell reselection process parameter,
reception of a master information block (MIB) including the cell reselection process parameter,
reception of a radio resource control (RRC) signaling including the cell reselection process parameter, and
acquisition of an indication indicating one of plurality of candidates each predetermined in a standard as the cell reselection process parameter.

* * * * *